United States Patent
Cheng et al.

(10) Patent No.: US 12,069,763 B2
(45) Date of Patent: Aug. 20, 2024

(54) SECONDARY CELL GROUP CONFIGURATION IN MULTI-RADIO ACCESS TECHNOLOGY-DUAL CONNECTIVITY AND CARRIER AGGREGATION

(71) Applicant: Qualcomm Incorporated, San Diego, CA (US)

(72) Inventors: Peng Cheng, Beijing (CN); Huichun Liu, Beijing (CN); Ozcan Ozturk, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/425,729

(22) PCT Filed: Jan. 22, 2020

(86) PCT No.: PCT/CN2020/073713
§ 371 (c)(1),
(2) Date: Jul. 25, 2021

(87) PCT Pub. No.: WO2020/151735
PCT Pub. Date: Jul. 30, 2020

(65) Prior Publication Data
US 2024/0032135 A1    Jan. 25, 2024

(30) Foreign Application Priority Data

Jan. 25, 2019   (WO) ................ PCT/CN2019/073123
Jan. 28, 2019   (WO) ................ PCT/CN2019/073431

(51) Int. Cl.
*H04W 76/27*    (2018.01)
*H04W 24/08*    (2009.01)
(Continued)

(52) U.S. Cl.
CPC ........... *H04W 76/27* (2018.02); *H04W 24/08* (2013.01); *H04W 24/10* (2013.01); *H04W 76/15* (2018.02); *H04W 76/34* (2018.02)

(58) Field of Classification Search
CPC ..... H04W 76/27; H04W 76/34; H04W 76/15; H04W 24/08; H04W 24/10
See application file for complete search history.

(56) References Cited

U.S. PATENT DOCUMENTS

2018/0278357 A1   9/2018  Kim et al.
2019/0182881 A1*  6/2019  Teyeb ..................... H04L 5/001
(Continued)

FOREIGN PATENT DOCUMENTS

CN   107666692 A   2/2018
CN   107690154 A   2/2018
(Continued)

OTHER PUBLICATIONS

Interdigital., "Dual Connectivity Configuration in INACTIVE for MR-DC", 3GPP TSG-RAN WG2 Meeting# 103, R2-1811461, Aug. 24, 2018 (Aug. 24, 2018), 5 pages, sections 1-5.
(Continued)

*Primary Examiner* — Ronald B Abelson
(74) *Attorney, Agent, or Firm* — Holland & Hart LLP/Qualcomm Incorporated

(57) ABSTRACT

Methods, systems, and devices for wireless communications are described. A user equipment (UE) and/or a master node may use configurations to resume communications with one or more cells of a dual connectivity (DC) or carrier aggregation (CA) scheme. In some cases, the configuration may be used for a secondary cell group (SCG) of the DC scheme. This configuration may include the UE applying a previously stored configuration for the SCG (e. g., including higher-layer and lower-layer configurations of a last serving
(Continued)

SN of the DC scheme) if it determines the previously stored configuration is valid. Additionally or alternatively, the configuration may include the network using a previous SCG configuration or reconfiguring the SCG and transmitting this indication in a resume communications message to the UE. In some cases, the network may determine this configuration based on assistance information or reports generated from the UE.

28 Claims, 34 Drawing Sheets

(51) Int. Cl.
*H04W 24/10* (2009.01)
*H04W 76/15* (2018.01)
*H04W 76/34* (2018.01)

(56) References Cited

U.S. PATENT DOCUMENTS

| | | | |
|---|---|---|---|
| 2021/0274587 A1* | 9/2021 | Jung | H04W 76/30 |
| 2021/0352750 A1* | 11/2021 | Cheng | H04W 56/0045 |
| 2021/0410216 A1 | 12/2021 | Liu | |

FOREIGN PATENT DOCUMENTS

| | | |
|---|---|---|
| CN | 108924949 A | 11/2018 |
| CN | 109246824 A | 1/2019 |
| WO | WO-2018182224 A1 | 10/2018 |
| WO | WO-2018227461 A1 | 12/2018 |

OTHER PUBLICATIONS

Interdigital: "Summary of [103#50][NR late drop]—MR-DC Configuration in INACTIVE (Interdigital)", R2-1814021, 3GPP TSG-RAN WG2 Meeting #103bis, Chengdu, China, Oct. 8-12, 2018, Oct. 12, 2018, 18 Pages, Section 2, Section, 1-3, the whole document.
International Search Report and Written Opinion—PCT/CN2020/073713—ISA/EPO—Apr. 22, 2020 (191135WO2).
International Search Report and Written Opinion—PCT/CN2019/073123—ISA/EPO—Oct. 16, 2019 (191135WO1).
Qualcomm Incorporated: "MR-DC in RRC_INACTIVE State", 3GPP TSG-RAN2#103bis, R2-1813600, Chengdu, China, Oct. 8-12, 2018, Oct. 12, 2018, pp. 1-7, the Whole Document.
Qualcomm Incorporated: "RRC_INACTIVE with MR_DC", 3GPP TSG-RAN WG3 Meeting #97, R3-172739, Aug. 25, 2017, Sections 1-2, 6 pages.
Supplementary European Search Report—EP20744866—Search Authority—Berlin—Sep. 14, 2022 (191135EP).

* cited by examiner

SECONDARY CELL GROUP CONFIGURATION IN MULTI-RADIO ACCESS TECHNOLOGY-DUAL CONNECTIVITY AND CARRIER AGGREGATION

CROSS REFERENCE TO RELATED APPLICATIONS

The present Application for Patent claims priority to International Patent Application No. PCT/CN2020/073713 by CHENG et al., entitled "SECONDARY CELL GROUP CONFIGURATION IN MULTI-RADIO ACCESS TECHNOLOGY-DUAL CONNECTIVITY AND CARRIER AGGREGATION," filed Jan. 22, 2020; and to PCT Application No. PCT/CN2019/073431 by CHENG et al., entitled "MEASUREMENT-BASED DUAL CONNECTIVITY AND CARRIER AGGREGATION ACTIVATION," filed Jan. 28, 2019, and to PCT Application No. PCT/CN2019/073123 by CHENG et al., entitled "BLIND SECONDARY CELL GROUP CONFIGURATION IN MULTI-RADIO ACCESS TECHNOLOGY-DUAL CONNECTIVITY," filed Jan. 25, 2019, each of which is assigned to the assignee hereof, and each of which is expressly incorporated by reference in its entirety herein.

BACKGROUND

The following relates generally to wireless communications, and more specifically to measurement based and blind secondary cell group (SCG) configuration in multi-radio access technology-dual connectivity (MR-DC) and carrier aggregation (CA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In dual connectivity (DC) and CA configurations, a UE may simultaneously connect to and communicate with a network using multiple cells. In some cases, the UE may resume communications with one or more of the cells after a period of inactivity. Techniques to more efficiently resume communications between the UE and network are desired.

SUMMARY

The described techniques relate to improved methods, systems, devices, and apparatuses that support measurement based and blind secondary cell group (SCG) configuration in multi-radio access technology-dual connectivity (MR-DC) and carrier aggregation (CA) activation. Generally, the described techniques provide for the storage of one or more lower-layer configurations for use in re-establishing communications when a user equipment (UE) transitions from an inactive communications state. For example, a UE may communicate with a network using a communications scheme (e.g., dual connectivity (DC), CA, etc.) and subsequently transition to the inactive communication state (e.g., a radio resource control (RRC) inactive state). The UE and the network may store a set of lower-layer configurations. For instance, the UE and the network may store a lower-layer master cell group (MCG) configuration and/or a lower-layer secondary cell group (SCG) configuration of a DC deployment when the UE enters the inactive communication state. In other examples, the UE and the network may store lower-layer configurations for CA operations when the UE enters the inactive communication state.

For example, a UE may be operating in a DC configuration with a master node (MN) and a secondary node (SN). In some cases, the MN may transmit a release message to transition the UE into an inactive communication state (e.g., an RRC inactive state) with the SN. The UE, the MN, or both may store a set of lower-layer SCG configurations used for the DC communication scheme. The UE may determine whether to use a previously stored lower-layer SCG configuration to resume communications with the SN.

If the UE stores the set of lower-layer SCG configurations, the UE may determine to use the configurations when resuming communications with the SN based on a set of validation factors included in the release message from the MN. For example, the UE may check whether it is in a cell of a validity area associated with the previously stored lower-layer SCG configuration, whether a validity timer has expired for the previously stored lower-layer SCG configuration, whether a measurement for the previously stored lower-layer SCG configuration is above a threshold value, or a combination thereof. If the UE determines the previously stored lower-layer SCG configuration is no longer valid, the UE may discard the previously stored lower-layer SCG configuration and work with the MN to determine a new configuration to resume communications with the SN. If the UE determines the previously stored lower-layer SCG configuration is still valid, the UE may use the stored configuration as the UE transitions back to a connected mode with the SN. The UE may notify, the MN that the stored SCG configuration is valid.

In some cases, if the UE is unable to store a lower-layer SCG configuration, the MN may store a context of the SN with a lower-layer SCG configuration (e.g., a previously stored lower-layer SCG configuration stored at the MN). The MN may transmit a measurement configuration to the UE to perform one or more cell measurements on the SCG while in the inactive state. In some cases, when the UE is performing a state transition from the inactive communication state (e.g., to a connected communication state), the UE may transmit assistance information or measurement reports generated in the inactive state to the MN. Based on the assistance information or measurement reports, the MN may signal to the UE to use the stored lower-layer SCG configuration or an updated lower-layer SCG configuration. The updated lower-layer SCG configuration may correspond to a difference between a current lower-layer configuration indicated in the measurement reports and the stored lower-layer configuration(s). In other cases, the MN may blindly choose the lower-layer SCG configuration based on the assistance information. Using the signaling from the MN, the UE may resume communications on one or more cells (e.g., the SN) according to the communication scheme. As a result, the UE may efficiently resume communications with the one or more cells with minimized signaling after exiting the inactive communication state (e.g., as compared to when the UE and network drop the lower-layer configurations upon entering the inactive communication state).

A method of wireless communications at a UE is described. The method may include identifying that the UE is operating in a DC configuration with an MN and an SN, where the UE is in an inactive communications state with the SN, determining that SN communications are to resume, determining whether a previously stored lower-layer SCG configuration can be used for the resumption of SN communications, and transmitting an indication to the MN indicating whether the previously stored lower-layer SCG configuration can be used to resume the SN communications.

An apparatus for wireless communications at a UE is described. The apparatus may include a processor, memory in electronic communication with the processor, and instructions stored in the memory. The instructions may be executable by the processor to cause the apparatus to identify that the UE is operating in a DC configuration with an MN and an SN, where the UE is in an inactive communications state with the SN, determine that SN communications are to resume, determine whether a previously stored lower-layer SCG configuration can be used for the resumption of SN communications, and transmit an indication to the MN indicating whether the previously stored lower-layer SCG configuration can be used to resume the SN communications.

Another apparatus for wireless communications at a UE is described. The apparatus may include means for identifying that the UE is operating in a DC configuration with an MN and an SN, where the UE is in an inactive communications state with the SN, determining that SN communications are to resume, determining whether a previously stored lower-layer SCG configuration can be used for the resumption of SN communications, and transmitting an indication to the MN indicating whether the previously stored lower-layer SCG configuration can be used to resume the SN communications.

A non-transitory computer-readable medium storing code for wireless communications at a UE is described. The code may include instructions executable by a processor to identify, that the UE is operating in a DC configuration with an MN and an SN, where the UE is in an inactive communications state with the SN, determine that SN communications are to resume, determine whether a previously stored lower-layer SCG configuration can be used for the resumption of SN communications, and transmit an indication to the MN indicating whether the previously stored lower-layer SCG configuration can be used to resume the SN communications.

Some examples of the method, apparatuses, and non-transitory computer-readable medium described herein may further include operations, features, means, or instructions for storing, based at least in part on being in the inactive communication state with the secondary node, a first lower-layer configuration for a first cell of the master node and a second lower-layer configuration for a second cell of the secondary node, the second lower-layer configuration comprising the previously-stored lower-layer secondary cell group configuration, transmitting, based at least in part on the determination that secondary node communications are to resume, an indication of whether one or more measurement reports are available for the first cell or the second cell, and receiving, in response to the indication of whether the one or more measurement reports are available for the first cell or the second cell, a reconfiguration message that indicates a difference between a current lower-layer configuration and at least one of the stored first lower-layer configuration or the second lower-layer configuration.

Some examples of the method, apparatuses, and non-transitory computer-readable medium described herein may further include operations, features, means, or instructions for receiving, with a release message instructing the UE to enter the inactive communications state, an indication that the UE may be to store a lower-layer SCG configuration, and storing the lower-layer SCG configuration such that the lower-layer SCG configuration becomes the previously stored lower-layer SCG configuration.

In some examples of the method, apparatuses, and non-transitory computer-readable medium described herein, determining whether the previously stored lower-layer SCG configuration can be used for the resumption of SN communications may include operations, features, means, or instructions for identifying, from information included with the release message, a validity area which defines one or more cells in which the previously stored lower-layer SCG configuration may be valid for use, and determining whether the UE may be within the one or more cells defined by the validity area.

In some examples of the method, apparatuses, and non-transitory computer-readable medium described herein, the validity area includes a list of the one or more cells, a physical cell identifier (PCI) list of the one or more cells, a radio access network (RAN) notification area (RNA) list of the one or more cells, a timing advance (TA) list of the one or more cells, or a combination thereof.

In some examples of the method, apparatuses, and non-transitory computer-readable medium described herein, determining whether the previously stored lower-layer SCG configuration can be used for the resumption of SN communications may include operations, features, means, or instructions for identifying, from information included with the release message, a validity time which defines a period in which the previously stored lower-layer SCG configuration may be valid, and determining whether the previously stored lower-layer SCG configuration may be valid based on the validity timer.

In some examples of the method, apparatuses, and non-transitory computer-readable medium described herein, determining whether the previously stored lower-layer SCG configuration can be used for the resumption of SN communications may include operations, features, means, or instructions for identifying, from information included with the release message, a threshold measurement value, measuring signal reception conditions for comparison with the threshold measurement value, and determining whether the previously stored lower-layer SCG configuration may be valid based on the UE measurements satisfying the threshold measurement value.

In some examples of the method, apparatuses, and non-transitory computer-readable medium described herein, the threshold measurement value includes a reference signal received power (RSRP) measurement, a reference signal received quality (RSRQ) measurement, or a combination thereof.

Some examples of the method, apparatuses, and non-transitory computer-readable medium described herein may further include operations, features, means, or instructions for discarding the previously stored lower-layer SCG configuration based on determining that the SCG configuration not being valid.

Some examples of the method, apparatuses, and non-transitory computer-readable medium described herein may further include operations, features, means, or instructions for receiving, with a release message instructing the UE to enter the inactive communications state, a measurement configuration for an SCG including the SN of the DC configuration.

In some examples of the method, apparatuses, and non-transitory computer-readable medium described herein, determining whether the previously stored lower-layer SCG configuration can be used for the resumption of SN communications may include operations, features, means, or instructions for performing measurements in accordance with the measurement configuration, and determining whether to include the indication that the previously stored lower-layer SCG configuration may be available for resuming the SN communications based on the measurements.

Some examples of the method, apparatuses, and non-transitory computer-readable medium described herein may further include operations, features, means, or instructions for receiving, from the MN and in response to the indication, a lower-layer secondary cell configuration to be used by the UE for SN communications, where the lower-layer secondary cell configuration may be either the previously stored lower-layer SCG configuration, as stored by the MN, or an updated lower-layer SCG configuration.

In some examples of the method, apparatuses, and non-transitory computer-readable medium described herein, receiving the lower-layer SCG configuration may include operations, features, means, or instructions for receiving the lower-layer SCG configuration in a resume communications message or a reconfiguration message.

Some examples of the method, apparatuses, and non-transitory computer-readable medium described herein may further include operations, features, means, or instructions for transmitting, to the MN and in addition to transmission of the indication, assistance information based on the measurements made in accordance with the measurement configuration, where the assistance information includes information to assist the MN in determining whether to apply the previously stored lower-layer SCG configuration or the updated lower-layer SCG configuration.

Some examples of the method, apparatuses, and non-transitory computer-readable medium described herein may further include operations, features, means, or instructions for storing a higher-layer SCG configuration based on receiving a release message.

In some examples of the method, apparatuses, and non-transitory computer-readable medium described herein, the MN operates in a first radio access technology (RAT) and the SN operates in a second RAT.

In some examples of the method, apparatuses, and non-transitory computer-readable medium described herein, the lower-layer SCG configuration includes at least one of an identifier for the SN of the DC configuration, parameters for the SN communications, or configuration information for one or more cells of the SCG.

A method of wireless communications at a base station is described. The method may include identifying that the base station is operating in a DC configuration with a UE, where the base station is an MN with respect to DC communications with the UE, transmitting, to the UE, a release message indicating a suspension of SN communications for the UE, storing, at the MN, a lower-layer SCG configuration used for the SN communications by the UE, receiving a message from the UE that the SN communications are to resume, and receiving an indication from the UE whether the stored lower-layer SCG configuration is to be used for the SN communications.

An apparatus for wireless communications at a base station is described. The apparatus may include a processor, memory in electronic communication with the processor, and instructions stored in the memory. The instructions may be executable by the processor to cause the apparatus to identify that the base station is operating in a DC configuration with a UE, where the base station is an MN with respect to DC communications with the UE, transmit, to the UE, a release message indicating a suspension of SN communications for the UE, store, at the MN, a lower-layer SCG configuration used for the SN communications by the UE, receive a message from the UE that the SN communications are to resume, and receive an indication from the UE whether the stored lower-layer SCG configuration is to be used for the SN communications.

Another apparatus for wireless communications at a base station is described. The apparatus may include means for identifying that the base station is operating in a DC configuration with a UE, where the base station is an MN with respect to DC communications with the UE, transmitting, to the UE, a release message indicating a suspension of SN communications for the UE, storing, at the MN, a lower-layer SCG configuration used for the SN communications by the UE, receiving a message from the UE that the SN communications are to resume, and receiving an indication from the UE whether the stored lower-layer SCG configuration is to be used for the SN communications.

A non-transitory computer-readable medium storing code for wireless communications at a base station is described. The code may include instructions executable by a processor to identify that the base station is operating in a DC configuration with a UE, where the base station is an MN with respect to DC communications with the UE, transmit, to the UE, a release message indicating a suspension of SN communications for the UE, store, at the MN, a lower-layer SCG configuration used for the SN communications by the UE, receive a message from the UE that the SN communications are to resume, and receive an indication from the UE whether the stored lower-layer SCG configuration is to be used for the SN communications.

Some examples of the method, apparatuses, and non-transitory computer-readable medium described herein may further include operations, features, means, or instructions for storing, at the master node, a first lower-layer configuration for a first cell of the master node based at least in on the suspension of the secondary node communications by the UE, receiving, from the UE, a request to resume the secondary node communications, the request comprising an indication of whether one or more measurement reports are available at the UE, determining a current lower-layer configuration for at least one of the first cell or a second cell of a secondary node used for the secondary node communications, and transmitting, to the UE, a reconfiguration message that indicates a difference between a current lower-layer configuration and at least one of the stored first lower-layer configuration or the lower-layer secondary cell group configuration.

In some examples of the method, apparatuses, and non-transitory computer-readable medium described herein, transmitting the release message may include operations, features, means, or instructions for transmitting, to the UE, an indication to store the lower-layer SCG configuration.

Some examples of the method, apparatuses, and non-transitory computer-readable medium described herein may further include operations, features, means, or instructions for transmitting with the indication to store the lower-layer SCG configuration, information including a validity area which defines one or more cells in which the UE may be to be located if the stored lower-layer SCG configuration may be to be valid.

In some examples of the method, apparatuses, and non-transitory computer-readable medium described herein, the validity area of the one or more cells in the SCG includes a list of the one or more cells, a PCI list of the one or more cells, an RNA list of the one or more cells, a TA list of the one or more cells, or a combination thereof.

Some examples of the method, apparatuses, and non-transitory computer-readable medium described herein may further include operations, features, means, or instructions for transmitting with the indication to store the lower-layer SCG configuration, information including a validity timer which defines a timing for when the stored lower-layer SCG configuration may be valid.

Some examples of the method, apparatuses, and non-transitory computer-readable medium described herein may further include operations, features, means, or instructions for transmitting with the indication to store the lower-layer SCG configuration, information including a threshold measurement value to allow the UE to determine whether the stored lower-layer SCG configuration may be to be applied.

In some examples of the method, apparatuses, and non-transitory computer-readable medium described herein, the threshold measurement value includes an RSRP measurement, an RSRQ measurement, or a combination thereof.

Some examples of the method, apparatuses, and non-transitory computer-readable medium described herein may further include operations, features, means, or instructions for discarding the stored lower-layer SCG configuration based on receiving the indication from the UE that the stored SCG configuration may be not to be used.

In some examples of the method, apparatuses, and non-transitory computer-readable medium described herein, transmitting the release message may include operations, features, means, or instructions for transmitting, to the UE, a measurement configuration for an SCG including an SN of the DC configuration, where the indication from the UE whether the stored lower-layer SCG configuration may be to be used for the SN communications may be received based on the measurement configuration.

Some examples of the method, apparatuses, and non-transitory computer-readable medium described herein may further include operations, features, means, or instructions for receiving, from the UE, assistance information based on transmitting the measurement configuration, where the assistance information includes an indication to apply the stored lower-layer SCG configuration for the UE to use for SN communications or an identifier of a primary secondary cell (PSCell) for the UE to use for the SN communications, and transmitting, to the UE, a lower-layer configuration for the SCG for the SN communications based on the assistance information.

In some examples of the method, apparatuses, and non-transitory computer-readable medium described herein, the lower-layer configuration for the SCG may be transmitted in a resume communications message or a reconfiguration message.

Some examples of the method, apparatuses, and non-transitory computer-readable medium described herein may further include operations, features, means, or instructions for transmitting, to an SN of the DC configuration, an activation request message for the SN communications based on receiving the message from the UE that the SN communications may be to resume, and transmitting, to the UE, a resume communications message for the SN communications based on receiving the indication from the UE whether the stored lower-layer SCG configuration may be to be used for the SN communications, where the resume communications message and the activation request message may be transmitted simultaneously.

Some examples of the method, apparatuses, and non-transitory computer-readable medium described herein may further include operations, features, means, or instructions for initiating a validity timer based on transmitting the release message, determining that the validity timer expires prior to receiving the message from the UE that the SN communications may be to resume, and discarding the stored lower-layer SCG configuration used for the SN communications by the UE based on the validity timer expiring.

In some examples of the method, apparatuses, and non-transitory computer-readable medium described herein, the MN operates in a first RAT and the SN operates in a second RAT.

DETAILED DESCRIPTION

Figure 1:
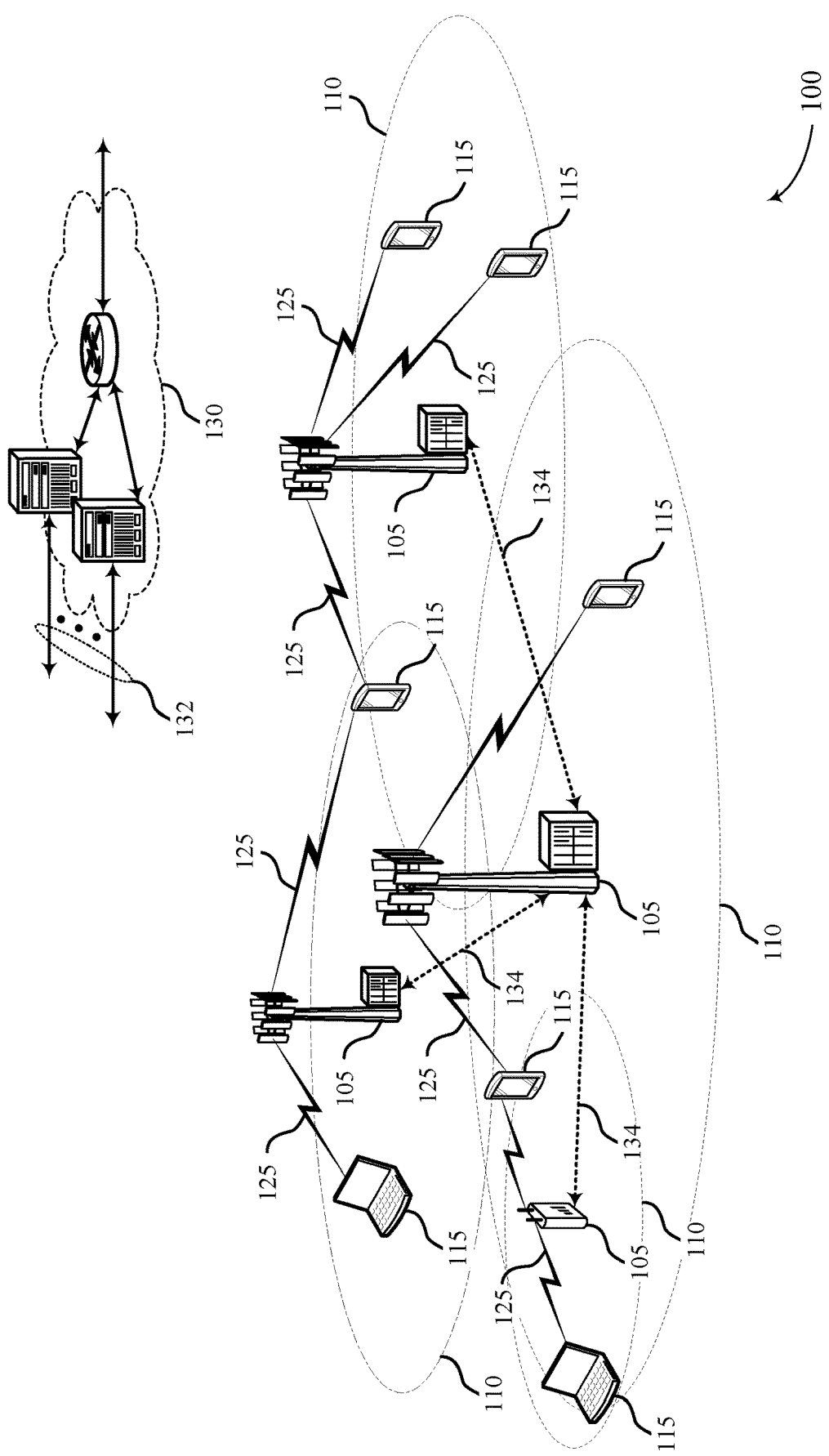
FIG. 1 illustrates an example of a system for wireless communications that supports secondary cell group (SCG) configuration in multi-radio access technology-dual connectivity (MR-DC) and carrier aggregation (CA) in accordance with aspects of the present disclosure.

In some wireless communications systems, a user equipment (UE) may communicate with a network using dual connectivity (DC). In such cases, the UE may simultaneously communicate with different base stations, where a first base station may provide a first cell and be referred to as a master node (MN). Likewise, a second base station providing a second cell of the DC deployment may be referred to as a secondary node (SN), and the first and second cells may each be associated with a same or different radio access technology (RAT). As such, various DC deployments may be referred to as evolved universal terrestrial radio access (E-UTRA) new radio (NR)-dual connectivity (EN-DC), NR E-UTRA-DC (NE-DC), NR NR-DC, Long Term Evolution (LTE) LTE-DC, or may include other types of multi-radio access technology-dual connectivity (MR-DC) deployments based on the RAT implemented by each cell. In any case, the different cells a UE communicates on for DC may use the same or different radio frequency (RF) spectrum bands.

Additionally or alternatively, a UE may communicate with a single base station using multiple carriers (e.g., component carriers (CCs)). In such cases, a CC may refer to each of the carriers used by a UE in carrier aggregation (CA) operations. Further, a serving cell of a base station may correspond to each CC used in CA operation, where each serving cell may be different (e.g., based on the path loss experienced by different CCs on different RF spectrum bands). In some examples, one carrier may be designated as a primary carrier, or primary CC (PCC), for the UE, which may be served by a primary cell (PCell). Additional carriers may be designated as secondary carriers, or secondary CCs (SCCs), which may be served by secondary cells (SCells) of the base station. CA operations may also use the same or different RF bands for communications.

In some cases, a UE may not continuously communicate with one or more base stations, and the UE may accordingly operate in various communication states, for example, to save power w % ben not transmitting or receiving data. For instance, the UE may operate in an idle communication state (e.g., a radio resource control (RRC) idle state), where the UE may be "on standby" and thus, may not be assigned to a particular serving base station. Additionally, the UE may operate in a connected communication state (e.g., an RRC connected state) where the UE may be "active" and transmit data to/receive data from a serving cell. The UE may accordingly transition from the RRC idle state to the RRC connected state, and vice versa, based on activity.

In some systems, a UE may support additional communication states. For example, a UE may use an inactive communication state (e.g., an RRC inactive state) between the connected communication state and the idle communication state to reduce latency in transitions from the inactive communication state to the connected communication state (e.g., as compared to the transition from the idle communication state to the connected communication state). When transitioning to the inactive communication state, the UE and the network (e.g., radio access network (RAN)) may retain a UE context (e.g., an access stratum (AS) context) at the UE and the network. Both the UE and network may store higher-layer configurations while simultaneously releasing lower-layer configurations. For example, the UE and network may store higher-layer configurations for respective cells of DC/CA deployments and release lower-layer configurations as the lower-layer configurations change due to the UE's mobility. Subsequently, the UE may apply the stored higher-layer configurations to resume communications with the network when moving out of the inactive communication state.

Because the UE and the network release lower-layer configurations as they change, the UE may not be able to operate using the previously established DC and/or CA schemes when leaving the inactive communication state. For example, a UE in a DC deployment that leaves the inactive communication state may receive multiple reconfiguration messages to obtain a full configuration, including the lower-layer configurations for different cells (and any updates thereto), to establish communication with multiple nodes of the DC deployment. Such signaling overhead may reduce efficiency in the system and cause delays in configuring a UE for CA/DC communications.

As described herein, techniques for storing lower-layer configurations may reduce latency and signaling overhead when the UE leaves the inactive communication state. For example, the UE and network may use stored lower-layer configurations to efficiently re-establish communications with nodes of a DC deployment (or re-establish a CA configuration) with minimal signaling (e.g., as compared to performing multiple handshakes when the UE and network do not store the lower-layer configurations). In some cases, the UE may receive signaling from the network that indicates a difference between a current lower-layer configuration and the stored lower-layer configuration. In some aspects, the signaling indicating differences between the current and stored lower-layer configurations may be based on measurement reporting provided by the UE. The UE may perform the measurements used to generate the measurement reporting while in the inactive communication state.

In some cases, the UE and network may blindly configure the UE to resume or establish communications with one or more cells of a communication scheme (e.g., a DC communication scheme) based on assistance information from the UE. In some cases, the UE may use a blind configuration for a secondary cell group (SCG) of the communication scheme. The blind configuration may include the UE applying a previously stored context for the SCG (e.g., including higher-layer and lower-layer configurations of a last serving SN of the DC scheme). Additionally or alternatively, the blind configuration may include the network blindly reconfiguring the SCG and transmitting this indication to the UE in a resume communications message (e.g., RRC resume message). Accordingly, the assistance information from the UE may include an indication of whether the UE can apply a stored configuration of the last serving SN or whether the network can blindly reconfigure the SCG for the UE with a last serving SCG configuration for the UE (e.g., if the UE has not stored the SCG configuration). As such, in some cases, the network may store a context for the SN (e.g., including a lower-layer configuration for the SCG), enabling the network to simultaneously transmit the resume communications message to the UE and an SN activation request message to the SN.

The storage of the lower-layer configurations, the use of signaling that indicates one or more parameters that may have changed, and the use of the blind configurations may reduce signaling overhead used to fully configure one or more cells for a UE. The described techniques may accordingly be applicable for DC configurations (e.g., NE-DC. EN-DC, and the like) and CA configurations when the UE resumes from an inactive communication state. Additionally or alternatively, the described techniques may be applicable to scenarios where a UE is connected to a single base station and may be used to efficiently set up DC or CA when the UE resumes communications from the inactive communication state.

Particular aspects of the subject matter described herein may be implemented to realize one or more advantages. The described techniques may support improvements in measurement based and blind SCG configuration in MR-DC and CA, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Additional aspects of the disclosure are illustrated through an additional wireless communications system and examples of process flows. Aspects of the disclosure are further illustrated by and described with reference to apparatus diagrams, system diagrams, and flowcharts that relate to SCG configuration in MR-DC and CA.

FIG. 1 illustrates an example of a wireless communications system 100 that supports measurement based and SCG configuration in MR-DC and CA in accordance with aspects of the present disclosure. The wireless communications system 100 includes base stations 105. UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal with a highest signal quality or otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

A service data application protocol (SDAP) may be associated with mapping bearers of a network. For example, the SDAP may map radio bearers based on quality of service (QoS) requirements. In such cases, packets (e.g., IP packets) may be mapped to different radio bearers in accordance with the QoS of the packets. Following the mapping to a radio bearer, the packets may be passed to the PDCP protocol layer. In some examples, the SDAP protocol layer may indicate a QoS flow identifier for uplink and downlink packets.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink component carriers and one or more uplink component carriers according to a CA configuration. Carrier aggregation may be used with both FDD and TDD component carriers.

Wireless communications system 100 may support the storage of lower-layer configurations used in DC and/or CA deployments to enable the efficient transition from an RRC inactive state. Further, signaling that indicates a difference between the stored lower-layer configurations and updated lower-layer configurations (e.g., delta signaling) after exiting the RRC inactive state may reduce signaling overhead in the system.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases. PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, sounding reference signal (SRS), and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame. The MIB may use the middle 6 RBs (72 subcarriers) in the frequency domain. The MIB carries a few important pieces of information for UE initial access, including downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading an MIB (e.g., either a new version or a copy), the UE 115 may try different phases of a scrambling code until getting a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, such as cell identity information, and may indicate whether a UE is allowed to camp on a cell. SIB1 also includes cell selection information (or cell selection parameters). Additionally, SIB1 includes scheduling information for other SIBs. SIB2 may be scheduled dynamically according to information in SIB1 and includes access information and parameters related to common and shared channels. The periodicity of SIB2 can be set to 8, 16, 32, 64, 128, 256 or 512 radio frames.

After synchronizing (e.g., the connecting device decodes SIB2), the connecting device may perform a random access channel (RACH) procedure to further establish the connection to the wireless access network through the serving device. The RACH procedure may involve the connecting device transmitting a message including a RACH preamble (e.g., a message 1 (Msg1)) on a set of selected resources to inform the serving device about the presence of the connecting device. For example, the RACH preamble may be randomly selected from a set of 64 predetermined sequences. This may enable the serving device to distinguish between multiple connecting devices trying to access the system simultaneously. Additionally, the connecting device may receive uplink synchronization and may request resources for further communications in Msg1. After receiving Msg1 and in response to Msg1, the serving device may transmit a random access response (RAR) (e.g., a message 2 (Msg2)) to the connecting device, where the serving device identifies the connecting device based on the RACH preamble transmitted. Msg2 may provide an uplink resource grant, a timing advance, and a temporary cell radio network temporary identity (C-RNTI).

The connecting device may then transmit an RRC connection request, or RACH message 3 (Msg3), along with a temporary mobile subscriber identity (TMSI) (e.g., if the connecting device has previously been connected to the same wireless network) or a random identifier, after receiving the RAR. The RRC connection request may also indicate the reason the connecting device is connecting to the network (e.g., emergency, signaling, data exchange). The serving device may respond to the connection request with a contention resolution message, or RACH message 4 (Msg4), addressed to the connecting device, which may provide a new C-RNTI. If the connecting device receives a contention resolution message with the correct identification, the connecting device may proceed with RRC setup. If the connecting device does not receive a contention resolution message (e.g., if there is a conflict with another connecting device), the connecting device may repeat the RACH process by transmitting a message with a new RACH preamble. Such exchange of messages between the UE 115 and base station 105 for random access may be referred to as a four-step RACH procedure.

In some wireless communications systems, a UE 115 may be in various states (e.g., RRC states) of being connected to a base station 105 or the network. For example, the UE 115 may operate in an idle communication state (e.g., a radio resource control (RRC) idle state). In an idle communication state, the UE 115 may be "on standby" and thus may not be assigned to a serving base station. Alternatively, the UE 115 may operate in a connected communication state (e.g., an RRC connected state). In a connected communication state, the UE 115 may be "active" and transmit data to/receive data from a serving cell. The UE 115 may accordingly transition from the RRC idle state to the RRC connected state, and vice versa, based on activity.

In some cases, the UE 115 may use an additional state, referred to as an inactive communication state (e.g., an RRC inactive state) that is an intermediary between the idle communication state and the connected communication state. For example, the UE 115 may use an inactive communication state to reduce latency in transitions to the connected communication state (e.g., as compared to the transition from the idle communication state to the connected communication state).

Wireless communications system 100 may support the storage of one or more lower-layer configurations for use in re-establishing communications when a UE 115 transitions from an inactive communications state. For example, a UE 115 may communicate with a network (e.g., via one or more base station 105) using a communications scheme (e.g., DC, CA, etc.) and subsequently transition to the inactive communication state (e.g., an RRC inactive state). The UE 115 and the network may store a set of lower-layer configurations used for the communications scheme. For instance, the UE 115 and the network may store a lower-layer MCG configuration and/or a lower-layer SCG configuration of a DC deployment when the UE 115 enters the inactive communication state. Additionally or alternatively, the UE 115 and network may store lower-layer configurations for CA operations when the UE 115 enters the inactive communication state.

Upon performing a state transition from the inactive communication state (e.g., to a connected communications state), the UE 115 may indicate an availability of measurement reports to a base station 105. The UE 115 may perform one or more cell measurements while in the inactive communication state and generate measurement reports based on the measurements. Further, the UE 115 may resume communications on one or more cells based on signaling from the network that indicates a difference between a current lower-layer configuration and the stored lower-layer configuration(s). In such cases, the indicated difference may be based on the measurement reports provided by the UE 115. Additionally, the network may efficiently modify the cells used, for example, in DC or CA operation, based on the signaling of the changes from the stored lower-layer configuration. As a result, the UE 115 may efficiently resume communications with the network (e.g., using the same communications scheme as before entering the RRC inactive state) with minimized signaling after exiting the inactive communication state (e.g., as compared to when lower-layer configurations are dropped upon entering the inactive communication state).

Wireless communications system 100 may support efficient techniques for using blind configurations to resume or establish communications with one or more cells of a DC scheme based on assistance information from the UE 115. In some cases, the UE 115 may use the blind configuration for an SCG (e.g., cells associated with an SN) of the DC scheme. This blind configuration may include the UE 115 applying a previously stored context for the SCG (e.g., including higher-layer and lower-layer configurations of a last serving SN of the DC scheme). Additionally or alternatively, the blind configuration may include the network blindly reconfiguring the SCG and transmitting this indication in a resume communications message (e.g., RRC resume message) to the UE 115. Accordingly, the assistance information from the UE 115 may include an indication of whether the UE 115 can apply a stored configuration of the last serving SN or whether the network can blindly reconfigure the SCG for the UE 115 with a last serving SCG configuration for the UE 115 (e.g., if the UE 115 has not stored the SCG configuration). As such, in some cases, the network may store a context for the SN (e.g., including a lower-layer configuration for the SCG) which may enable the network to simultaneously transmit the resume communications message to the UE 115 and an SN activation request message to the SN.

Figure 2:
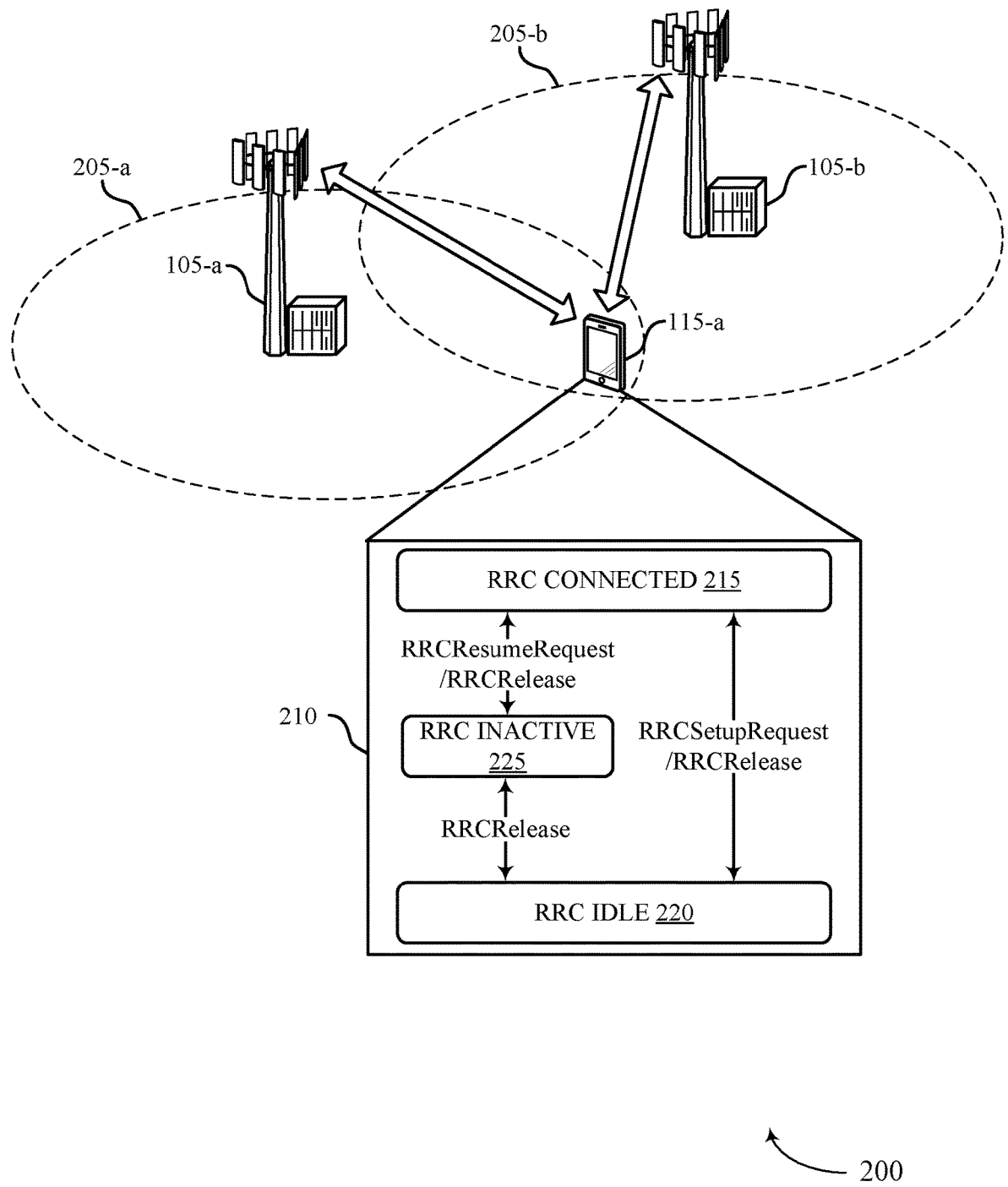
FIG. 2 illustrates an example of a wireless communications system that supports SCG configuration in MR-DC and CA in accordance with aspects of the present disclosure.

FIG. 2 illustrates an example of a wireless communications system 200 that supports measurement-based and SCG configuration in MR-DC and CA in accordance with aspects of the present disclosure. In some examples, wireless communications system 200 may implement aspects of wireless communications system 100. For example, wireless communications system 200 includes a first base station 105-a, a second base station 105-b, and a UE 115-a, which may be examples of the corresponding devices described with reference to FIG. 1. Wireless communications system 200 may support the use of techniques that enhance the resumption of communications in CA and DC deployments after UE 115-a leaves an RRC inactive state.

In wireless communications system 200, a UE 115-a may communicate with a network using a DC configuration. In such cases, UE 115-a may simultaneously communicate with different base stations 105 (e.g., first base station 105-a and second base station 105-b). First base station 105-a may provide coverage to a first cell 205-a. First base station 105-a may be referred to as an MN. First cell 205-a may correspond to a PCell in the DC deployment. Additionally, second base station 105-b may provide coverage to a second cell 205-b of the DC configuration. Second base station 105-b may be referred to as an SN. In some cases, second cell 205-b may correspond to a PSCell in the DC deployment. Each base station 105 may use additional SCells, where cells associated with the MN may correspond to a master cell group (MCG) and cells associated with the SN may correspond to an SCG.

In some cases, each of the cells 205 of the DC deployment may be associated with a same or different RAT. For instance, first base station 105-*a* and second base station 105-*b* may communicate using a first RAT and a second RAT, respectively. The first RAT and/or the second RAT may include, for example, LTE, NR, or another RAT. As such, various DC deployments may sometimes be referred to as EN-DC, NE-DC, NR NR-DC, LTE LTE-DC, enhanced LTE (eLTE) eLTE-DC, or may include other types of MR-DC deployments based on the RAT that is used by each base station 105. In any case, the different cells of a DC deployment may use the same or different RF spectrum bands for communication with UE 115-*a*.

In some cases, DC deployments may use different radio bearers for transmitted messages for each cell. For instance, first base station 105-*a* may be configured as an MN and may provide a set of serving cells that correspond to an MCG. First base station 105-*a* may use a first set of signaling radio bearers (SRBs) (e.g., SRB1, SRB2) to transport messages for the MCG, such as RRC messages. Additionally, second base station 105-*b* may be configured as an SN and may provide another set of serving cells that correspond to an SCG, and second base station 105-*b* may use a second set of SRBs (e.g., SRB3) to transport messages for the SCG. In some examples, a split bearer configuration may result in the MN and SN using a particular protocol layer (e.g., a PDCP layer) to route data streams to/from UE 115-*a*. Here, an SRB (e.g., SRB1/SRB2) may be split between the MN and the SN, and the MN may send downlink messages to UE 115-*a* via lower layers (RLC, MAC, PHY, etc.) of the MN, the SN, or both. In uplink, the UE 115-*a* may transmit RRC messages to the MN via the SN using the split bearer (e.g., via a "leg" associated with the SN). The MCG and SCG may use respective data radio bearers (DRBs) for signaling data in the user plane.

UE 115-*a* may communicate with a single base station 105 (e.g., first base station 105-*a*) using multiple carriers (e.g., CCs, which may also be referred to as layers, channels, etc.). In such cases, a CC may refer to each of the carriers used by UE 115-*a* in CA operations. Further, a serving cell of first base station 105-*a* may correspond to each CC used in CA operation, where each serving cell may be different (e.g., based on the path loss experienced by different CCs on different RF spectrum bands). In some examples, one carrier may be a primary carrier, or primary CC (PCC), for UE 115-*a*, which may be served by a PCell. Additional carriers may be secondary carriers, or secondary CCs (SCCs), which may be served by SCells of first base station 105-*a*. CA operations may use the same or different RF bands for communications.

In wireless communications system 200, UE 115-*a* may operate in different RRC states when communicating with one or more of the base stations 105. For instance, as illustrated by state diagram 210, UE 115-*a* may operate in an RRC connected state 215 (e.g., RRC_CONNECTED) where UE 115-*a* may be "active" and transmit data to/receive data from a serving cell. Additionally, UE 115-*a* may operate in an RRC idle state 220 (e.g., RRC_IDLE), in which case UE 115-*a* may be "on standby" and thus, not assigned to a serving base station 105. In RRC idle state 220, the system may release radio bearers (e.g., to avoid re-routing should UE 115-*a* move to another cell). UE 115-*a* may still perform various functions, including but not limited to cell reselection and discontinuous reception (DRX) for page messages. UE 115-*a* may accordingly transition from RRC idle state 220 to RRC connected state 215, and vice versa, based on activity. When transitioning to RRC connected state 215 from RRC idle state 220, UE 115-*a* may transmit a setup request message (e.g., RRCSetupRequest) to a base station 105. Alternatively, when transitioning from RRC connected state 215 to RRC idle state 220, UE 115-*a* may receive a release message (e.g., RRCRelease).

In wireless communications system 200, UE 115-*a* may support an additional RRC state. For example, an RRC inactive state 225 between RRC connected state 215 and RRC idle state 220 may enable a faster transition to RRC connected state 215 (e.g., as compared to the transition from RRC idle state 220 to RRC connected state 215). In an RRC inactive state 225, UE 115-*a* may receive system information, perform cell measurements, and perform other functions. UE 115-*a* may transition to RRC connected state 215 from RRC inactive state 225 when downlink data is available for UE 115-*a*, UE 115-*a* has uplink data to transmit, or both. UE 115-*a* may transmit a resume request message (e.g., RRCResumeRequest) to resume communications with a base station 105. When transitioning from RRC connected state 215 to RRC inactive state 225, UE 115-*a* may receive a release message (e.g., RRCRelease) from a base station 105. Likewise, when moving from RRC inactive state 225 to RRC idle state 220, UE 115-*a* may receive a release message from the base station 105.

When entering into RRC inactive state 225, UE 115-*a* and the network may retain a UE context (e.g., an AS context). The UE 115-*a* and the network may store higher-layer configurations (e.g., for a DC/CA deployment) while simultaneously releasing lower-layer configurations (as the lower-layer configurations change, for example, due to the mobility of UE 115-*a*). More specifically. UE 115-*a*, first base station 105-*a* (e.g., providing the MCG), and second base station 105-*b* (e.g., providing the SCG) may store PDCP/SDAP configurations (e.g., for both MCG and SCG) when UE 115-*a* transitions to RRC inactive state 225. Additionally, UE 115-*a* may release lower-layer configurations for both the MCG and SCG when in RRC inactive state 225. Then, when resuming communications with either first base station 105-*a* or second base station 105-*b* when moving out of RRC inactive state 225 to RRC connected state 215, UE 115-*a* may apply the stored upper-layer (PDCP and/or SDAP) configurations of the MCG and SCG.

Due to the release of the lower-layer configurations. UE 115-*a* may not operate immediately using DC (or CA) communications after transitioning from RRC inactive state 225. For example, when leaving RRC inactive state 225, UE 115-*a* may receive multiple reconfiguration messages (e.g., RRC Reconfiguration messages) to obtain a full configuration, including the lower-layer configurations for the MCG and SCG (and any updates thereto), to establish communication with first base station 105-*a* and/or second base station 105-*b* (or another, different, base station 105) of the DC deployment. This signaling overhead may reduce efficiency in the system through added delays in resuming and/or modifying the DC configuration that UE 115-*a* operated with prior to entering RRC inactive state 225. CA operations may be similarly affected when transitioning out of RRC inactive state 225.

As described herein, techniques for storing lower-layer configurations (e.g., when UE 115-*a* transitions into RRC inactive state 225) may reduce latency and signaling overhead when UE 115-*a* leaves RRC inactive state 225. For example, a UE 115 may store lower-layer configurations to efficiently re-establish communications with the nodes that were previously serving as master node and secondary node (e.g., first base station 105-*a*, second base station 105-*b*) of a DC deployment. The stored lower-layer configurations may allow CA operations to resume with minimal signaling (e.g., as compared to performing multiple handshakes when the lower-layer configurations are not stored).

In some cases. UE 115-*a* may receive signaling from first base station 105-*a* or second base station 105-*b* that indicates a difference between a current lower-layer configuration (e.g., a configuration based on present cell conditions after UE 115-*a* leaves the RRC inactive state 225) and the stored lower-layer configuration. As such, the differences in configurations signaled (e.g., via delta signaling) by a base station 105 may be based on the stored lower-layer configurations that are known by both UE 115-*a* and the network. The delta signaling that indicates the difference between the lower-layer configurations may be based on measurement reporting provided by UE 115-*a*, where the corresponding measurements (e.g., of surrounding or nearby cells) are performed while UE 115-*a* is in RRC inactive state 225. In such cases, and as described in further detail below, measurement reporting configurations may be signaled to UE 115-*a* via UE-specific RRC messaging (e.g., an RRC release message that includes a suspension configuration) or via system information (e.g., a common system information block (SIB)).

In some cases, the network may use blind configurations to resume or establish communications with one or more cells of a DC scheme based on assistance information from UE 115-*a*. In some cases, the blind configuration may be used for the SCG (e.g., cells associated with the SN, second base station 105-*b*, etc.) of the DC scheme. This blind configuration may include UE 115-*a* applying a previously stored context for the SCG (e.g., including higher-layer and lower-layer configurations of a last serving SN of the DC scheme). Additionally or alternatively, the blind configuration may include the network (e.g., MN, first base station 105-*a*, a cell in the MCG, etc.) blindly reconfiguring the SCG and transmitting an indication of this reconfiguration in a resume communications message (e.g., RRC resume message) to UE 115-*a*. Accordingly, the assistance information from UE 115-*a* may include an indication of whether UE 115-*a* can apply a stored configuration of the last serving SN or whether the network can blindly reconfigure the SCG for UE 115-*a* with a last serving SCG configuration for UE 115-*a* (e.g., if UE 115-*a* has not stored an SCG configuration). As such, in some cases, the network may store a context for the SN (e.g., including a lower-layer configuration for the SCG), enabling the network to simultaneously transmit the resume communications message to UE 115-*a* and an SN activation request message to the SN (e.g., second base station 105-*b*).

In some cases, with respect to wireless communications system 200, when UE 115-*a* receives the release message (e.g., RRCRelease message) from the base station 105 to transition to RRC idle state 220, the release message may further include an indication for UE 115-*a* to suspend communications with second base station 105-*b* (e.g., SCG, SN, etc.). The base station 105 may transmit various information elements (IEs) within the release message to enable communications with second base station 105-*b* (e.g., or an additional base station 105 for the SCG) to resume. These IEs may include an indication for UE 115-*a* to store a lower-layer configuration for the SCG (e.g., an indication-store-SCG-configuration IE), a list of cells for which the stored SCG configuration is valid (e.g., a validity-area IE), a timer for how long the stored SCG configuration is valid (e.g., a validity-timer IE), and a threshold quality measurement for which the stored SCG configuration is valid (e.g., threshold IE). Accordingly, based on the indication to store the lower-layer SCG configuration, UE 115-*a* may store both the lower-layer configuration and the higher-layer configuration when entering RRC inactive state 225.

After being in RRC inactive state 225, UE 115-*a* may perform a RACH procedure to re-enter RRC connected state 215 (e.g., with second base station 105-*b*). For example, UE 115-*a* may initiate the RACH procedure by transmitting a Msg1 of a four-step RACH procedure as described above to first base station 105-*a*. After receiving a Msg2 (e.g., RAR message), UE 115-*a* may validate the stored lower-layer SCG configuration (e.g., based on the validity-are, validity-timer, and threshold IEs). Subsequently, in a Msg3 of the RACH procedure. UE 115-*a* may indicate whether the stored lower-layer SCG configuration can be resumed for DC communications with second base station 105-*b* (e.g., or another SN).

First base station 105-*a* may then transmit a Msg4 of the RACH procedure to resume the RRC connection with UE 115-*a*. Base station 105-*a* may simultaneously transmit an activation request to second base station 105-*b* based on storing the context of second base station 105-*b* (e.g., including the SCG lower-layer configuration). After receiving Msg4 and transmitting Msg5 to resume the RRC connection with first base station 105-*a*, UE 115-*a* may perform a RACH procedure with a PSCell of second base station 105-*b*. Upon a successful RACH procedure at the PSCell, UE 115-*a* may resume connection with both first base station 105-*a* (e.g., MN) and second base station 105-*b* (e.g., SN). In some cases, UE 115-*a* may apply or replace some lower-layer configuration parameter for the SCG based on broadcasted information in SIBs from second base station 105-*b*.

In some cases. UE 115-*a* may be unable to store the SCG lower-layer configuration internally (e.g., due to memory limitations). Based on this limitation, first base station 105-*a* may include an additional SCG measurement configuration IE when transmitting the release message to transition to RRC connected state 215. UE 115-*a* may measure one or more cells associated with second base station 105-*b* (e.g., SN) based on the SCG measurement configuration. In some cases, first base station 105-*a* may set the indication for UE 115-*a* to store the lower-layer SCG configuration to false when transmitting the SCG measurement configuration IE (e.g., to indicate to UE 115-*a* to not store the lower-layer SCG configuration). Based on the SCG measurement configuration, UE 115-*a* may then measure and validate one or more of the cells based on the additional IEs included with the release message (e.g., validity-are, validity-timer, and threshold IEs). In the Msg3 of a RACH procedure with first base station 105-*a*, UE 115-*a* may include UE assistance information based on the measurements according to the SCG measurement configuration. The assistance information may indicate to base station 105-*a* whether to apply a stored, previously used lower-layer SCG configuration or a suggested PSCell identifier for second base station 105-*b* for subsequent communications.

According to the UE assistance information (e.g., from the SCG measurement information), first base station 105-*a* may transmit an SN activation request to second base station 105-*b*. If second base station 105-*b* acknowledges the SN activation request, first base station 105-*a* may consequently transmit a lower-layer SCG configuration for second base station 105-*b* to UE 115-*a* in the Msg4 of the RACH procedure. Additionally or alternatively, first base station 105-*a* may transmit the lower-layer SCG configuration to UE 115-*a* in a reconfiguration message (e.g., RRCReconfiguration message). Based on this lower-layer SCG configuration, UE 115-*a* may perform a RACH procedure with second base station 105-*b* and, if successful, may resume communications with first base station 105-*a* (e.g., MN) and second base station 105-*b* (e.g., SN).

In some cases, the blind configurations may be used for additional cells outside of the SCG. The described techniques may accordingly be applicable for DC configurations (e.g., NE-DC, EN-DC, or the like) when UE 115-*a* resumes communications from RRC inactive state 225. Similarly, the described techniques may be applied to CA configurations when UE 115-*a* transitions out of RRC inactive state 225. Additionally or alternatively, the described techniques may be applicable to scenarios where UE 115-*a* is connected with a single base station to efficiently set up DC or CA when UE 115-*a* resumes communications from an RRC inactive state 225.

In wireless communications system 200, the storage of the lower-layer configurations, the use of signaling that indicates difference between current configurations and the stored MCG and/or SCG configurations, and the use of blind configurations may reduce signaling overhead needed to fully configure one or more cells for the DC deployment. Such overhead may result from UE 115-*a* receiving reconfiguration messages that provide the full configuration information (e.g., versus parts of the configuration that have changed). Decoding and processing the full configurations may cause latency in the system. As a result, the described techniques may provide for enhanced operation that enables UE 115-*a* to quickly resume communications when exiting RRC inactive state 225.

Figure 3:
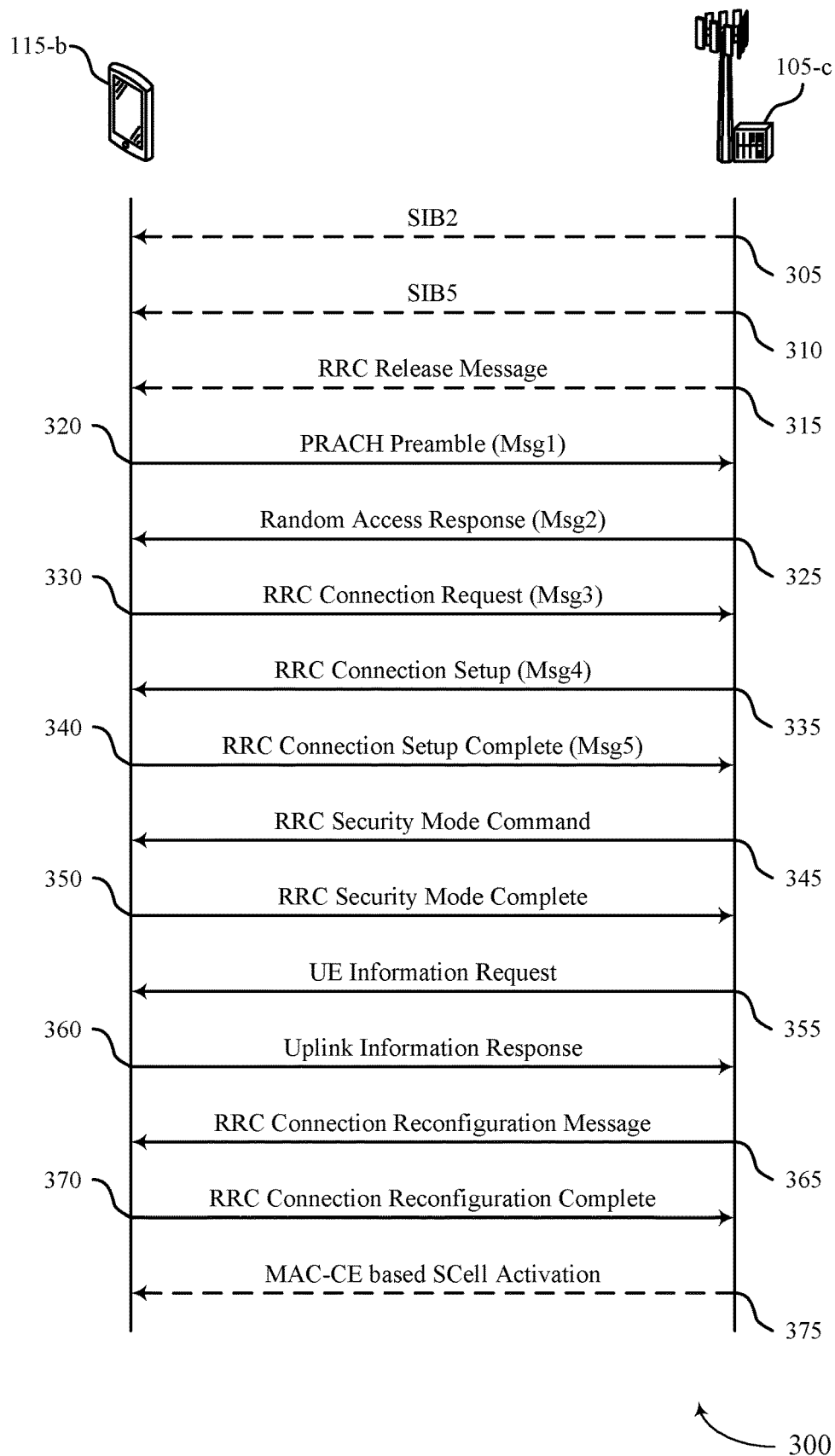
FIGS. 3 through 9 illustrate examples of process flows that support SCG configuration in MR-DC in accordance with aspects of the present disclosure.

FIG. 3 illustrates an example of a process flow 300 that supports SCG configuration in MR-DC in accordance with aspects of the present disclosure. In some examples, process flow 300 may implement aspects of wireless communications systems 100 and/or 200. Process flow 300 may include a UE 115-*b* and a base station 105-*c* (e.g., network), which may be examples of corresponding devices as described above with reference to FIGS. 1 and 2. In some cases, process flow 300 may illustrate signaling back and forth between UE 115-*b* and base station 105-*c* for a CA configuration that includes two RATs for the different cells (e.g., LTE euCA). For example, base station 105-*c* may include a PCell for UE 115-*b* according to the CA configuration. Additionally, the signaling as shown between UE 115-*b* and base station 105-*c* may reduce latency for configuring an SCell (e.g., associated with base station 105-*c* or with another base station 105) for the CA configuration. For example, process flow 300 may include early measurement reporting that enable the SCell configuration faster for the CA configuration (e.g., compared with previous CA configuration setups). Additionally, this SCell configuration may be implemented for a UE 115 that is in an idle communication state as described above.

At 305, base station 105-*c* may transmit a SIB2 to UE 115-*b* as part of the synchronization process as described above. In some cases, the SIB2 may also indicate for UE 115-*b* to perform measurements when in the idle communication state. For example, this indication to perform the measurements may be included in an idle mode measurements message (e.g., idleModeMeasurements message set to 'true') in the SIB2.

At 310, base station 105-*c* may transmit a SIB5 to UE 115-*b* that provides a measurement configuration of a potential SCell(s) for the CA configuration. In some cases, this measurement configuration may include an EARFCN and/or a cell list with the potential SCells.

Additionally or alternatively to transmitting the SIB5 at 310, at 315, base station 105-*c* may transmit an RRC release message to UE 115-*b* that includes a dedicated measurement configuration for UE 115-*b* to measure potential SCell(s) for the CA configuration. In some cases, based on the RRC release message, UE 115-*b* may be configured with a new timer (e.g., a timer 331) with a duration (e.g., up to five (5) minutes) to control how long UE 115-*b* can perform measurements while in the idle communication state (e.g., idle mode measurements). The timer may reduce power consumption at UE 115-*b* by limiting how long UE 115-*b* performs idle mode measurements. In some cases, UE 115-*b* may receive and use the dedicated measurement configuration included in the RRC release message. UE 115-*b* may use the measurement configuration included in the SIB5 at 310 as a fallback. For example, if UE 115-*b* moves to a cell different from the one sending the RRC release message (e.g., base station 105-*c*), UE 115-*b* may not receive the RRC release message. Instead, UE 115-*b* may receive the SIB5 based on synchronizing with the new cell and use that measurement configuration rather than the dedicated measurement configuration.

UE 115-*b* may then transition from the idle communication state to a connected communication state as described above with reference to FIG. 2. As such, UE 115-*b* may perform a RACH procedure with base station 105-*c* based on entering the connected communication state. For example, at 320, UE 115-*b* may transmit a Msg1 of the RACH procedure, including a physical RACH (PRACH) preamble. At 325, base station 105-*c* may then transmit Msg2 of the RACH procedure, including the RAR to the Msg1. Then, at 330, UE 115-*b* may transmit a Msg3 of the RACH procedure to request an RRC connection, and at 335, base station 105-*c* may transmit a Msg4 of the RACH procedure to setup an RRC connection with UE 115-*b*. In some cases, Msg4 may be transmitted on an SRB1 for the RACH procedure.

While UE 115-*b* is in the idle communication state prior to and during the RACH procedure, UE 115-*b* may perform measurements for the potential SCell(s) based on the configuration received in either the SIB5 or the RRC release message. Accordingly, when transmitting a fifth message (Msg5) of the RACH procedure to complete the RRC connection setup with base station 105-*c*, UE 115-*b* may also provide an indication of the availability of measurement reports to base station 105-*c*. For example, UE 115-*b* may transmit the indication of the availability of the measurement reports in an idle measurements available message (e.g., idleMeasAvailable message set to 'true').

At 345 and 350, base station 105-*c* and UE 115-*b* may establish and activate an AS security context based on an RRC security mode command transmitted by base station 105-*c* and an RRC security mode complete message transmitted by UE 115-*b* in response. These two security mode messages may be referred to as a security mode command (SMC) for the AS security activation.

Once the AS security is established between base station 105-*c* and UE 115-*b*, base station 105-*c* may request for UE 115-*b* to report the measurements for the potential SCell(s) at 355. For example, base station 105-*c* may include the request to report the measurements in an idle mode measurement request message (e.g., idleModeMeasurementReq message set to 'true'). Accordingly, at 360, UE 115-*b* may transmit the measurement reports in an uplink information response message. For example, UE 115-*b* may include the measurement reports in an idle measurement results message (e.g., MeasResultsIdle message). In some cases, this measurement reporting may occur after the SMC is completed.

After receiving the measurement reports, at 365, base station 105-c may transmit an RRC connection reconfiguration message that includes a configuration for an SCell to establish the CA configuration. In some cases, the SCell configuration may include further configurations for an SRB2 or DRB for communications with the SCell. Subsequently, at 370, UE 115-b may transmit an RRC connection re-establishment reconfiguration complete message to complete the reconfiguration in order to communicate according to the CA configuration. At 375, base station 105-c may transmit a MAC-CE based SCell activation message to complete the CA setup and activate communications with a PCell on base station 105-c and an SCell (e.g., on base station 105-c or another base station 105) for the CA configuration.

Figure 4:
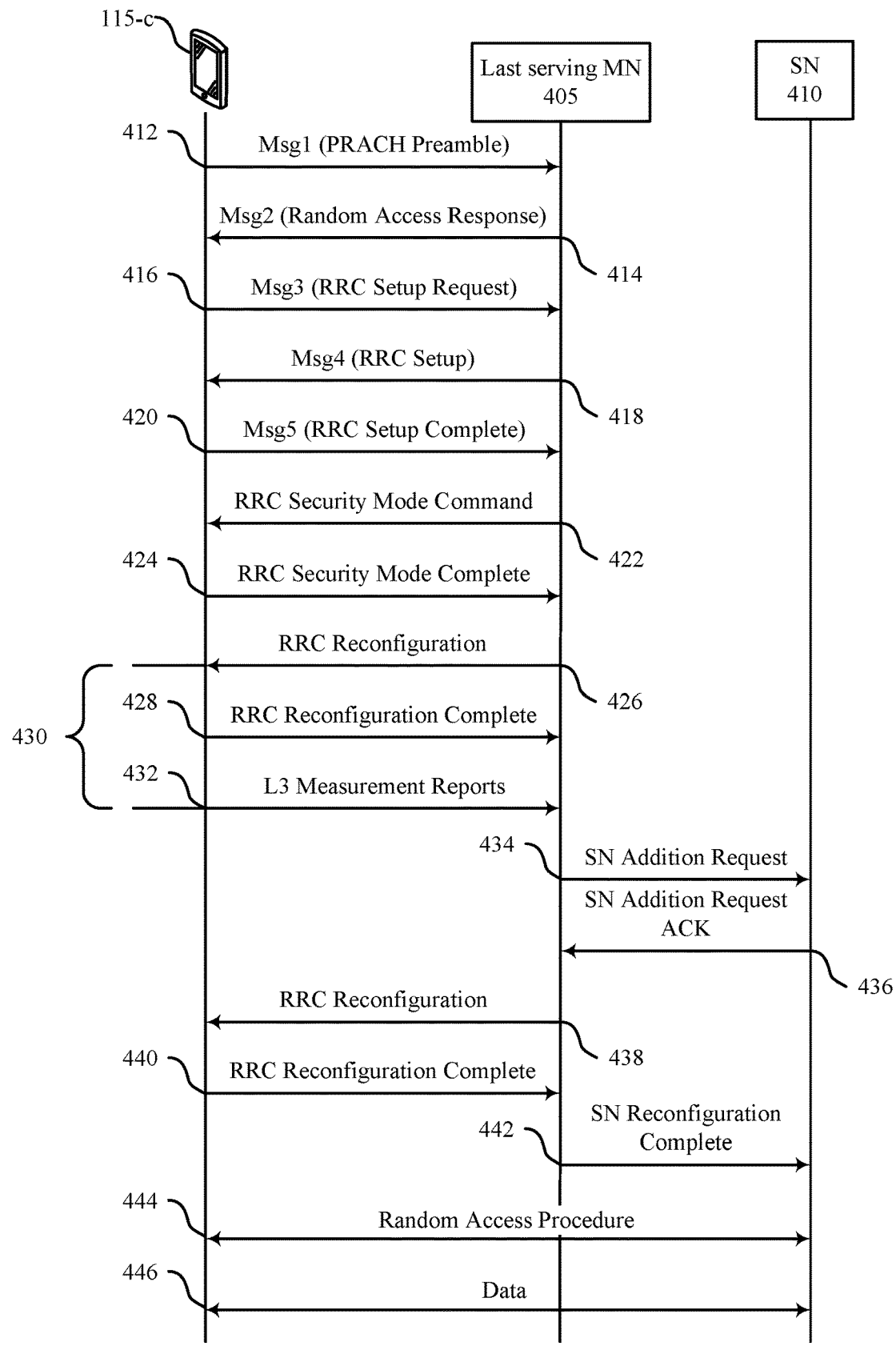

FIG. 4 illustrates an example of a process flow 400 that supports blind SCG configuration in MR-DC in accordance with aspects of the present disclosure. In some examples, process flow 400 may implement aspects of wireless communications systems 100 and/or 200. Process flow 400 may include a UE 115-c, a last serving MN 405, and an SN 410. UE 115-c may be an example of a UE 115 as described above with reference to FIGS. 1 through 3. Last serving MN 405 may be an example of a base station 105, MN, MCG, PCell, etc., as described above with reference to FIGS. 1 through 3. Additionally, SN 410 may be an example of a base station 105, SN, SCG, SCell, PSCell, etc., as described above with reference to FIGS. 1 through 3. Process flow 400 may include signaling between UE 115-c, last serving MN 405, and SN 410 for an initial cell setup according to a DC configuration when UE 115-c is initially in an idle communication state as described above with reference to FIG. 2. In some cases, last serving MN 405 may operate in a first RAT, and SN 410 may operate in a second RAT, which may be different or the same as the first RAT, indicating an MR-DC configuration for communications between UE 115-c, last serving MN 405, and SN 410.

At 412, UE 115-c may transition from the idle communication state to a connected communication state and initiate a RACH procedure with last serving MN 405. For example, UE 115-c may transmit a Msg1 of the RACH procedure that includes a PRACH preamble as described above. In some cases, last serving MN 405 may represent an MN that UE 115-c was connected to prior to entering the idle communication state. Assuming UE 115-c has not moved a significant distance between entering the idle communication state and exiting the idle communication state, UE 115-c and last serving MN 405 may continue communications (e.g., by indicating each other's contexts). In some cases, Msg1 of the RACH procedure may include a latency of three (3) TTIs, which includes two (2) TTIs as a worst case delay due to a RACH scheduling period and one (1) TTI for the transmission of the PRACH preamble.

At 414, last serving MN 405 may transmit a Msg2 of the RACH procedure that includes the RAR to the Msg1. In some cases, Msg2 of the RACH procedure may also include a latency of three (3) TTIs, which includes one (1) TTI for a preamble detection at last serving MN 405, one (1) TTI for downlink slot alignment, and one (1) TTI for the RAR transmission. At 416, UE 115-c may transmit a Msg3 of the RACH procedure to request an RRC setup with last serving MN 405. In some cases, Msg3 of the RACH procedure may also include a latency of three (3) TTIs, which includes one (1) TTI for processing Msg2 at UE 115-c, one (1) TTI for uplink slot alignment, and one (1) TTI for the Msg3 transmission.

At 418, last serving MN 405 may transmit a Msg4 of the RACH procedure to setup the RRC connection with UE 115-c. In some cases, Msg4 of the RACH procedure may include a latency of three (3) ms and two (2) TTIs, which includes the three (3) ms for layer 2 (L2)/RRC processing at last serving MN 405, one (1) TTI for downlink slot alignment, and one (1) TTI for the Msg4 transmission. At 420, UE 115-c may transmit a Msg5 of the RACH procedure to indicate the RRC setup is complete with last serving MN 405. In some cases, Msg5 of the RACH procedure may include a latency of 10 ms and two (2) TTIs, which includes 10 ms for L2/RRC processing at UE 115-c, one (1) TTI for uplink slot alignment, and one (1) TTI for the Msg5 transmission.

At 422 and 424, last serving MN 405 and UE 115-c may establish an RRC security mode through an RRC SMC message and an RRC security mode complete message. The RRC, SMC, and RRC security mode complete messages may include a latency of eight (8) ms and four (4) TTIs, which includes five (5) ms for RRC processing at UE 115-c, three (3) ms for RRC processing at last serving MN 405, one (1) TTI for downlink slot alignment at last serving MN 405, one (1) TTI for transmitting the RRC SMC message, one (1) TTI for uplink slot alignment at UE 115-c, and one (1) TTI for transmitting the RRC security mode complete message.

At 426 and 428, last serving MN 405 and UE 115-c may reconfigure the RRC connection to include SN 410 for a DC configuration through an RRC reconfiguration message and an RRC reconfiguration complete message. In some cases, the RRC reconfiguration message and the RRC reconfiguration complete message may include a latency of 13 ms and two (2) is, which includes 10 ms for RRC processing at UE 115-c, three (3) ms for RRC processing at last serving MN 405, one (1) TTI for downlink slot alignment at last serving MN 405, one (1) TTI for transmitting the RRC SMC message, and over-the-air (OTA) latency to send the RRC reconfiguration complete message is ignored. Additionally, in the RRC reconfiguration message, last serving MN 405 may transmit a measurement configuration for UE 115 to perform measurements on one or more cells of an SCG to establish communications with SN 410 according to the DC configuration. Accordingly, at 430, UE 115-c may perform Layer 3 (L3) measurements on the one or more cells of the SCG.

At 432, UE 115-c may transmit L3 measurement reports based on the measurements performed on the one or more cells of the SCG at 430. UE 115-c may transmit these L3 measurement reports periodically or based on an event trigger. In some cases, the L3 measurement reports may include a latency of greater than or equal to 120 ms based on 120 ms being a shortest measurement duration from a log in UE 115-c.

At 434 and 436, last serving MN 405 and SN 410 may perform an SN addition establishment based on an SN addition request message and an SN addition request acknowledgement (ACK) message. In some cases, the SN addition request message and the SN addition request ACK message may include a latency of 10 ms, which includes an assumption of a five (5) ms latency for backhaul signaling of the SN addition request message and a five (5) ms latency for backhaul signaling of the SN addition request ACK message.

At 438 and 440, last serving MN 405 and UE 115-c may establish the SCG connection for UE 115-c based on an additional RRC reconfiguration message and an additional RRC reconfiguration complete message. For example, the additional RRC reconfiguration message may carry an RRC configuration for SN 410 based on the SN addition establishment performed at 434 and 436. In some cases, the additional RRC reconfiguration message and the additional RRC reconfiguration complete message may include a latency of 19 ms and four (4) TTIs, which includes 16 ms for RRC processing at UE 115-*c*, three (3) ms for RRC processing at last serving MN 405, one (1) TTI for downlink slot alignment at last serving MN 405, one (1) TTI for transmitting the additional RRC reconfiguration message, one (1) TTI for uplink slot alignment at UE 115-*c*, and one (1) TTI for transmitting the additional RRC reconfiguration complete message.

At 442, last serving MN 405 may transmit an SN reconfiguration complete message to SN 410 based on the SCG connection established at 438 and 440. In some cases, the SN reconfiguration complete message may include a latency of five (5) ms for backhaul signaling of the SN reconfiguration complete message.

At 444, UE 115-*c* and SN 410 may perform a RACH procedure (e.g., random access procedure) to establish a connection for completing the DC configuration. In some cases, this RACH procedure may include a latency of three (3) ms and 11 TTIs based on a contention-based random access (CBRA) procedure assuming worst case delays.

At 446, if the RACH procedure is successful, SN 410 and UE 115-*c* may transmit data between each other. In total, the initial cell setup as shown in process flow 400 for establishing a DC configuration between UE 115-*c*, last serving MN 405, SN 410 may include a latency of 201 ms and 36 TTIs. The latency may be greater depending on the subcarrier spacing (SCS) used (e.g., 237 ms for a 15 kHz SCS). As can be seen, the measurement reporting for the one or more cells of the SCG to identify and connect with SN 410 takes up a majority of the latency for the initial cell setup (e.g., at least 120 ms of the total 201 ms). Accordingly, as described herein, the use of a blind SCG configuration may reduce the latency, in part, by eliminating the L3 measurement reporting as described in process flow 400.

Figure 5:
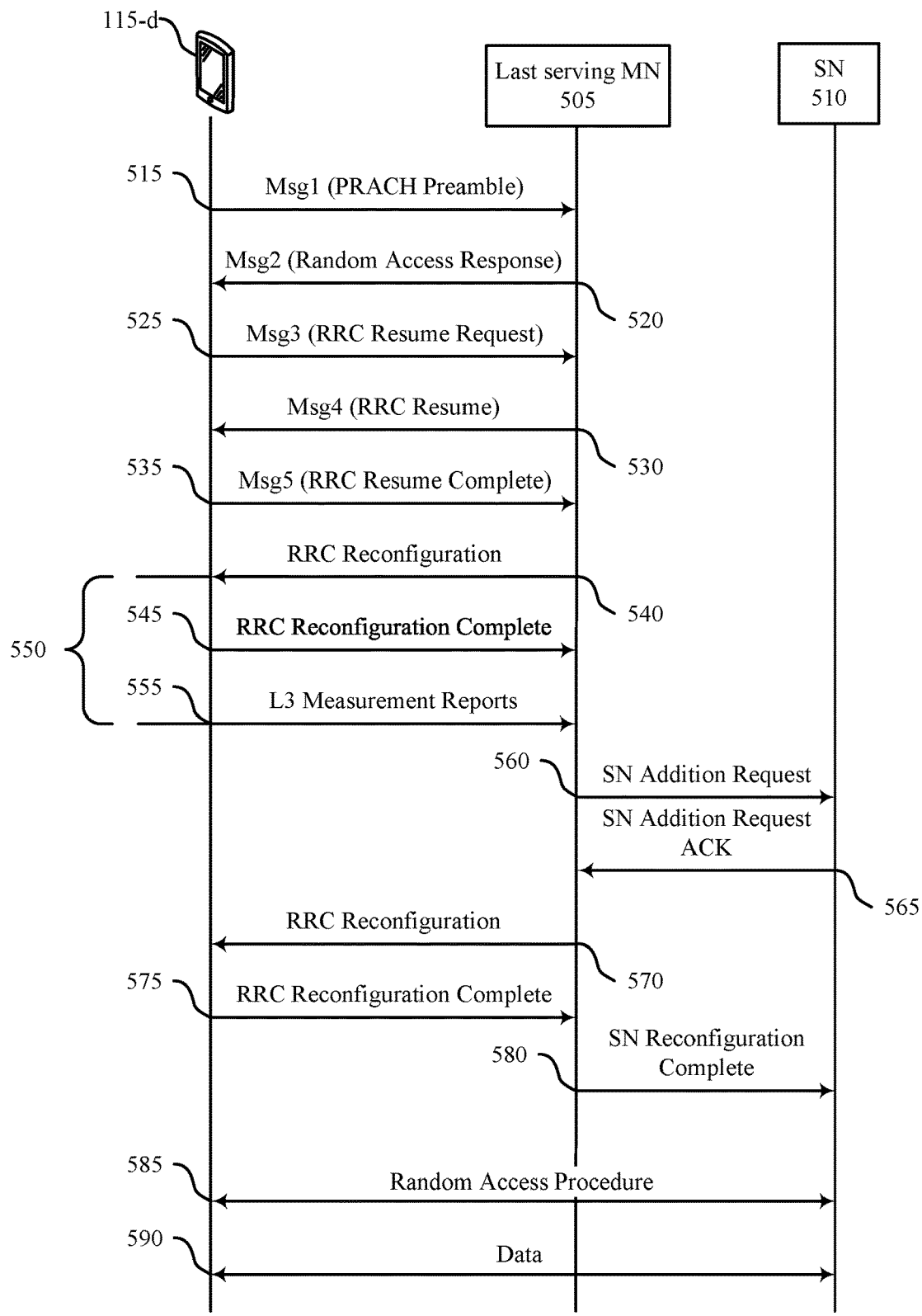

FIG. 5 illustrates an example of a process flow 500 that supports SCG configuration in MR-DC in accordance with aspects of the present disclosure. In some examples, process flow 500 may implement aspects of wireless communications systems 100 and/or 200. Process flow 500 may include a UE 115-*d*, a last serving MN 505, and an SN 510. UE 115-*d* may be an example of a UE 115 as described above with reference to FIGS. 1 through 4. Last serving MN 505 may be an example of a base station 105, MN, MCG, PCell, etc., as described above with reference to FIGS. 1 through 4. Additionally, SN 510 may be an example of a base station 105, SN, SCG, SCell, PSCell, etc., as described above with reference to FIGS. 1 through 4. Process flow 500 may include signaling between UE 115-*d*, last serving MN 505, and SN 510 for an initial cell setup according to a DC configuration when UE 115-*d* is initially in an inactive communication state as described above with respect to FIG. 2. In some cases, last serving MN 505 may operate in a first RAT, and SN 510 may operate in a second RAT, which may be different or the same as the first RAT, indicating an MR-DC configuration for communications between UE 115-*d*, last serving MN 505, and SN 510.

Process flow 500 may include a number of the same messages transmitted between UE 115-*d* and last serving MN 505 as the messages transmitted between UE 115-*c* and last serving MN 405 as described above with reference to process flow 400 of FIG. 4. For example, at 515, 520, 525, 530, 535, UE 115-*d* and last serving MN 505 may perform a RACH procedure, including the respective RACH messages (e.g., Msg1, Msg2, Msg3, Msg4, Msg5) as described above with reference to 412, 414, 416, 418, and 420. However, based on UE 115-*d* initially being in the inactive communication state rather than the idle communication state that UE 115-*c* was initially in, the RRC setup messages described in process flow 400 may be RRC resume messages based on UE 115-*d* and last serving MN 405 storing higher-layer configurations. Additionally, if UE 115-*d* is in an inactive communication state rather than an idle communication state, UE 115-*d* and last serving MN 505 may not perform the SMC messaging based on the stored higher-layer configurations.

The rest of process flow 500 may correspond to the same types of messages transmitted as described with reference to process flow 400. For example, the RRC reconfiguration (e.g., 540 and 545), the L3 measurement reporting (e.g., 550 and 555), the SN addition establishment (e.g., 560 and 565), the SCG connection establishment (e.g., 570 and 575), the SN reconfiguration complete message (e.g., 580), the RACH procedure with SN 510 (e.g., 585), and transmitting data based on the RACH (e.g., 590) may correspond to the same messages as shown and described in process flow 400.

In some cases, UE 115-*d* and last serving MN 505 may not perform SMC messaging, which may reduce latency in the system (e.g., the latency of the two (2) SMC messages as described in process flow 400). For example, the total latency of the initial cell setup when UE 115-*d* is in the inactive communication state may be 183 ms (or 213 ms for an SCS of 15 kHz) and 40 TTIs. Additionally, UE 115-*d* may start L3 measurements earlier (e.g., right after transmitting Msg5 of the RACH procedure with last serving MN 405) w % ben UE 115-*d* receives the RRC reconfiguration message. The RRC reconfiguration message may include the measurement configuration for the one or more cells of the SCG. As such, UE 115-*d* may establish the DC configuration for communicating with both last serving MN 505 and SN 510 faster when compared with the setup described with reference to process flow 400. However, UE 115-*d* may still wait for security (e.g., AS security) to be established before performing the L3 measurements.

UE 115-*d* and MN 505 may further reduce latency in process flow 500 if UE 115-*d* and/or last serving MN 505 stored a lower-layer configuration of a last serving SN (e.g., SN 510). With the stored lower-layer configuration, UE 115-*d* and MN 505 may not transmit the additional RRC reconfiguration messages at 570 and 575, reducing latency that may result from that transmission time. As described herein, the use of blind SCG configurations may allow for UE 115-*d* and/or last serving MN 505 to store a previously used SCG configuration and determine whether the stored SCG configuration can be used for the DC configuration.

Figure 6:
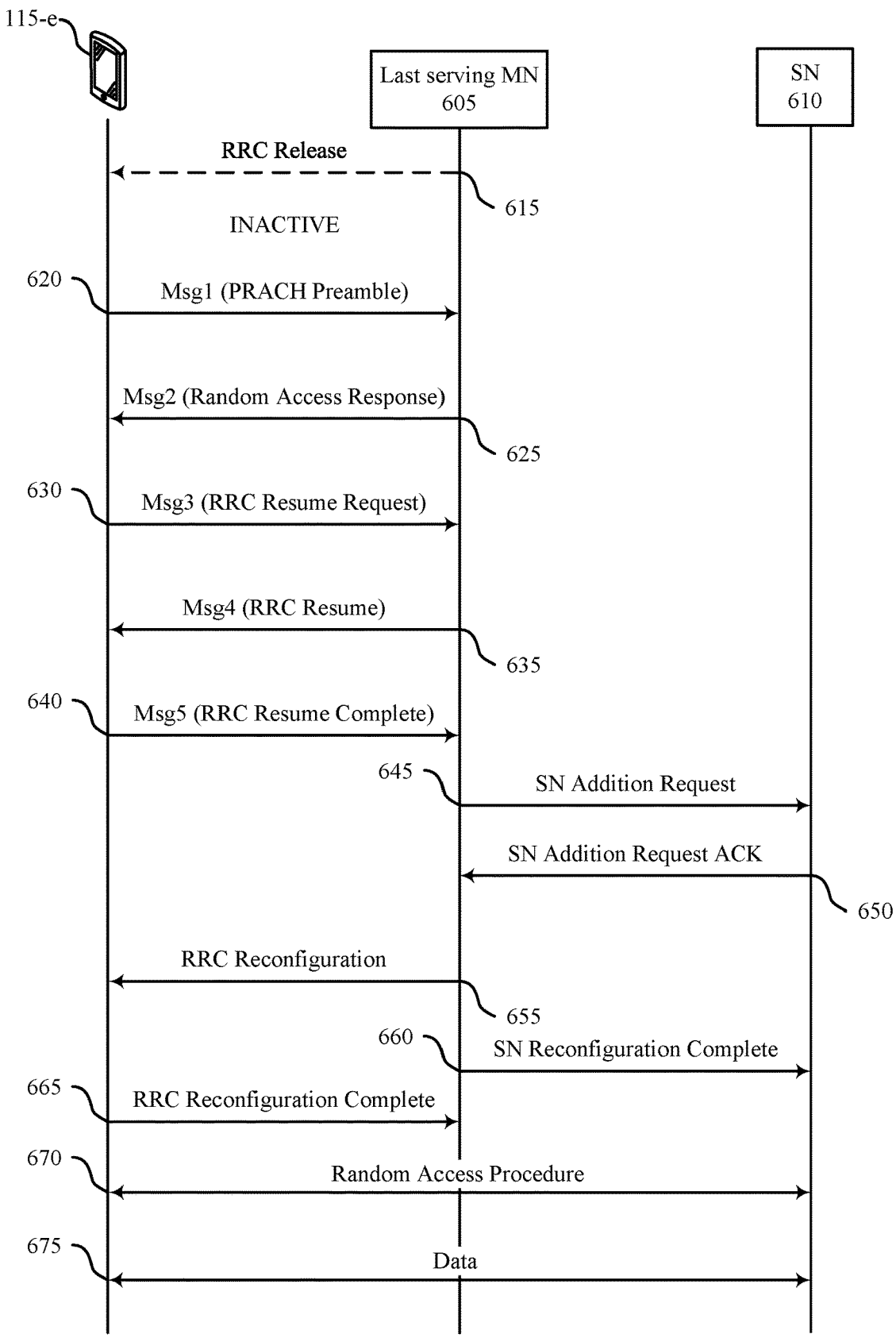

FIG. 6 illustrates an example of a process flow 600 that supports SCG configuration in MR-DC in accordance with aspects of the present disclosure. In some examples, process flow 600 may implement aspects of wireless communications systems 100 and/or 200. Process flow 600 may include a UE 115-*e*, a last serving MN 605, and an SN 610. UE 115-*e* may be an example of a UE 115 as described above with reference to FIGS. 1 through 5. Last serving MN 605 may be an example of a base station 105, MN, MCG. PCell, etc., as described above with reference to FIGS. 1 through 5. Additionally, SN 610 may be an example of a base station 105, SN, SCG, SCell, PSCell, etc., as described above with reference to FIGS. 1 through 5. In some cases, last serving MN 605 may operate in a first RAT, and SN 610 may operate in a second RAT, which may be different or the same as the first RAT, indicating an MR-DC configuration for communications between UE 115-*e*, last serving MN 605, and SN 610.

Process flow 600 may include signaling between UE 115-*e*, last serving MN 605, and SN 610 for an early measurement reporting scheme when UE 115-*e* is initially in an inactive communication state as described above with respect to FIG. 2. Based on UE 115-*e* being in the inactive communication state, security (e.g., AS security) may be activated between UE 115-*e* and last serving MN 605 upon UE 115-*e* receiving a resume communications message (e.g., RRC resume communications message). The resume communications message may enable earlier measurements of cells in an SCG for resuming communications with an SN (e.g., SN 610).

At 615, last serving MN 605 may transmit an RRC release message. The RRC release message may be similar to the RRC release message as described with reference to process flow 300. For example, UE 115-*e* may obtain a measurement configuration of potential SCell frequencies in the RRC release message. Additionally, based on receiving the RRC release message, UE 115-*e* may enter the inactive communication state, dropping any lower-layer SCG configurations for SN 610. However, the measurement configuration of potential SCell frequencies may enable UE 115-*e* to perform L3 measurements of the different SCell frequencies while in the inactive communication state after receiving the RRC release message.

At 620, UE 115-*e* may transition from the inactive communication state to a connected communication state. As such, UE 115-*e* may send a Msg1, which may include a PRACH preamble, to last serving MN 605 to initiate a RACH procedure. Subsequently, at 625, last serving MN 605 may transmit a Msg2 of the RACH procedure, including an RAR At 630, when transmitting a Msg3 of the RACH procedure to request to resume an RRC connection with last serving MN 605, UE 115-*e* may also indicate an availability of early measurement based on the L3 measurements performed for the different SCell frequencies while in the inactive communication state. For example, UE 115-*e* may include a one (1) bit indication in the Msg3 for the availability of early measurements.

At 635, last serving MN 605 may include a request for measurement reporting when transmitting a Msg4 of the RACH procedure to resume the RRC connection with UE 115-*e*. The request for measurement reporting may be based on the indication for the availability of early measurements in the Msg3.

Accordingly, at 640, when transmitting a Msg5 of the RACH procedure to resume the RRC connection with last serving MN 605, UE 115-*e* may report the L3 measurement results based on receiving the request in the Msg4. Based on this early reporting, UE 115-*e* and last serving MN 605 may skip the RRC reconfiguration messaging as described above with reference to process flows 400 and 500, thereby further reducing the latency of establishing the DC configuration between UE 115-*e*, last serving MN 605, and SN 610.

In some cases, if UE 115-*e* resumes the RRC connection with last serving MN 605, UE 115-*e* may still determine and establish a lower-layer SCG configuration for SN 610. Accordingly, the messages transmitted at 645, 650, 655, 660, and 665 may correspond to similar messages as described above with reference to process flows 400 and 500. For example, last serving MN 605 and SN 610 may perform the SN additional establishment (e.g., 645 and 650) and then may perform the SCG connection establishment with the SN reconfiguration complete message (e.g., 655, 660, and 665). UE 115-*e* may initiate a RACH procedure with SN 610 using the lower-layer SCG configuration at 670 based on last serving MN 605 determining the lower-layer SCG configuration through the SN additional establishment and then signaling the determined lower-layer SCG configuration to UE 115-*e* in the SCG connection establishment. If the RACH procedure is successful, at 675, UE 115-*e* may resume connection with SN 610 and they may begin transmitting data back and forth.

As described herein, the use of blind SCG configurations may allow for UE 115-*e* and/or last serving MN 605 to store a previous SCG configuration and determine whether to use the stored SCG configuration for the DC configuration, thereby further reducing latency and amount of signaling to determine a lower-layer SCG configuration for SN 610.

Figure 7:
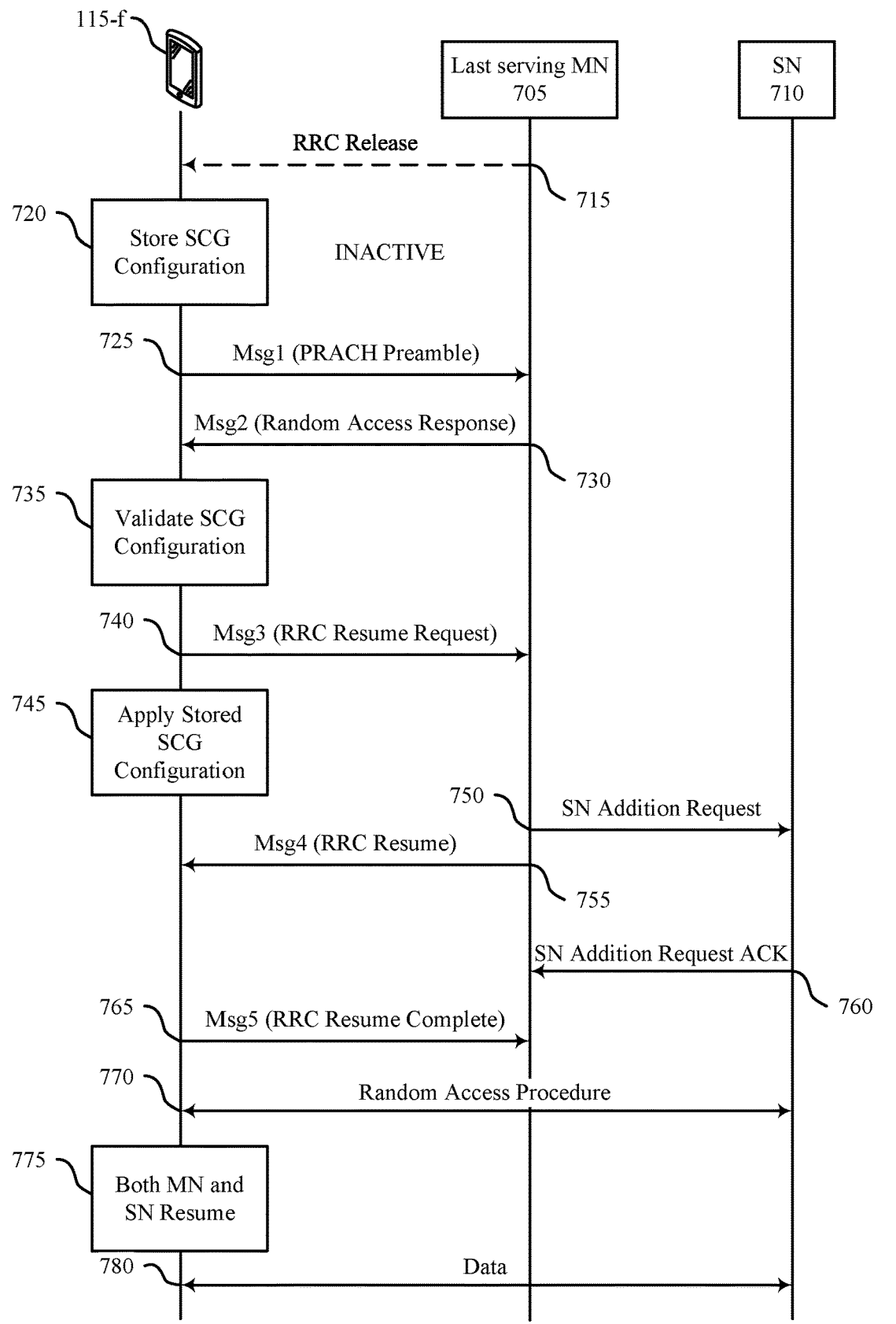

FIG. 7 illustrates an example of a process flow 700 that supports SCG configuration in MR-DC in accordance with aspects of the present disclosure. In some examples, process flow 700 may implement aspects of wireless communications systems 100 and/or 200. Process flow 700 may include a UE 115-*f*, a last serving MN 705, and an SN 710. UE 115-*f* may be an example of a UE 115 as described above with reference to FIGS. 1 through 6. Last serving MN 705 may be an example of a base station 105, MN, MCG, PCell, etc., as described above with reference to FIGS. 1 through 6. Additionally, SN 710 may be an example of a base station 105, SN, SCG. SCell, PSCell, etc., as described above with reference to FIGS. 1 through 6. UE 115-*f* may be operating in a DC configuration with last serving MN 705 and SN 710. In some cases, last serving MN 705 may operate in a first RAT, and SN 710 may operate in a second RAT, which may be different or the same as the first RAT, indicating an MR-DC configuration for communications between UE 115-*f*, last serving MN 705, and SN 710.

At 715, UE 115-*f* may receive a release message (e.g., an RRC release message as described above with reference to process flows 300 and 600) from last serving MN 705 instructing UE 115-*f* to enter an inactive communications state with SN 710. For example, the release message may include a configuration for UE 115-*f* to suspend communications with an SCG that includes SN 710 (e.g., a suspend-Config message). Additionally. UE 115-*f* may receive an indication to store a lower-layer SCG configuration. In some cases, this stored lower-layer SCG configuration may be a previous lower-layer SCG configuration used for communicating with SN 710 prior to receiving the release message and suspending the SN communications. Additionally or alternatively, the lower-layer SCG configuration may include at least one of an identifier for SN 710 of the DC configuration, parameters for SN communications, or configuration information for one or more cells of an SCG. Last serving MN 705 may include the indication to store the lower-layer SCG configuration with an IE on the release message (e.g., an indication-store-SCGconfiguration IE).

In some cases, when UE 115-*f* attempts to resume SN communications (e.g., resume SCG communications), last serving MN 705 may add IEs to the release message such that UE 115-*f* may determine whether to use previously stored lower-layer SCG configurations. For example, UE 115-*f* may use information included with the release message (e.g., the additional IEs) to identify a validity area (e.g., a validity-area IE) and determine whether it is within the one or more cells defined by the validity area. The validity area may define one or more cells in which the previously stored lower-layer SCG configuration may be valid for use. Accordingly, if UE 115-*f* reselects a cell outside of this validity area list of one or more cells, UE 115-*f* may determine that the previously stored lower-layer SCG configuration is no longer valid. In some cases, the validity area may include a list of the one or more cells, a physical cell identifier (PCI) list of the one or more cells, a RAN notification area (RNA) list of the one or more cells, a timing advance (TA) list of the one or more cells, or a combination thereof.

Additionally, UE 115-*f* may identify a validity time (e.g., a validity-timer IE) from information included with the release message (e.g., the additional IEs) and determine whether the previously stored lower-layer SCG configuration is valid based on the validity time. The validity time may define a period in which the previously stored lower-layer SCG configuration is valid. For example, when the time expires, UE 115-*f* may regard the previously stored SCG configuration as outdated and discard it. Accordingly, the validity time may start when UE 115-*f* receives the release message and stop if UE 115-*f* transmits a request to resume communications with last serving MN 705. In some cases, last serving MN 705 may start a validity timer after transmitting the release message and may discard a stored lower-layer SCG configuration at itself (i.e., the last serving MN 705) when the timer expires. The validity timer for last serving MN 705 may stop upon reception of a Msg3 (e.g., request to resume an RRC connection) from UE 115-*f* as part of a RACH procedure.

In some cases. UE 115-*f* may identify a threshold measurement value (e.g., threshold IE) from information included with the release message (e.g., the additional IEs). UE 115-*f* may measure signal reception conditions for comparison with the threshold measurement value and determine whether the previously stored lower-layer SCG configuration is valid based on the measurements satisfying the threshold measurement value. For example, after receiving a Msg2 of a RACH procedure, UE 115-*f* may compare a quality of a PSCell included in the previously stored SCG configuration with the configured threshold measurement value. If the quality of the PSCell is lower than the threshold, then UE 115-*f* regards the previously stored SCG configuration outdated and discards it. In some cases, the threshold measurement value may include a reference signal received power (RSRP) measurement, a reference signal received quality (RSRQ) measurement, or a combination thereof Any additional examples of IEs not described above that may enable UE 115-*f* to determine whether to use previously stored lower-layer secondary cell group configuration for the resumption of SN communications may be defined and included in the release message.

At 720, UE 115-*f* may store the lower-layer SCG configuration based on receiving the indication to store the lower-layer SCG configuration with the release message. Additionally. UE 115-*f* may store a higher-layer SCG configuration based on receiving the release message. For example, as described above with reference to FIG. 2, when transitioning to an inactive communication state, UE 115-*f* and last serving MN 705 may store higher-layer SCG configurations.

At 725, UE 115-*f* may transition to a connected communication state as described above with reference to FIG. 2. Accordingly, UE 115-*f* may initiate a RACH procedure to resume communications with last serving MN 705. For example, UE 115-*f* may transmit a Msg1 of the RACH procedure that includes a PRACH preamble. In some cases, UE 115-*f* may initiate the RACH procedure based on determining that SN communication are to resume. At 730, last serving MN 705 may transmit a Msg2 of the RACH procedure including an RAR based on the Msg1.

At 735, UE 115-*f* may determine to use the previously stored lower-layer SCG configuration for the resumption of SN communications with SN 710 based on the additional IEs as described above (e.g., validity area, validity timer, threshold measurement value, etc.). For example, UE 115-*f* may check that the validity area and validity time match in a cell for resuming the SN communications (e.g., SN 710) and that the quality of a corresponding PSCell included in the previously stored lower-layer SCG configuration is higher than the configured threshold. Accordingly, UE 115-*f* may discard the previously stored lower-layer SCG configuration based on determining the SCG configuration is invalid.

At 740, UE 115-*f* may transmit a Msg3 of the RACH procedure to request to resume a connection with last serving MN 705 (e.g., an RRCResumeRequest message). If UE 115-*f* confirms the previously stored SCG configuration is valid, UE 115-*f* may include an indication with the Msg3 that the previously stored SCG configuration can resume. Accordingly, at 745. UE 115-*f* may apply the previously stored SCG configuration if the configuration is validated at 735.

At 750, last serving MN 705 may transmit an activation request message for the SN communications to SN 710 of the DC configuration based on receiving the message from the UE that the secondary node communications are to resume (e.g., Msg3). At 755, last serving MN 705 may transmit a resume communications message (e.g., Msg4 of the RACH procedure or RRCResume message) for the SN communications to UE 115-*f* based on receiving the indication from UE 115-*f* to use the stored lower-layer SCG configuration for the SN communications. In some cases, 750 and 755 may happen at the same time, where last serving MN 705 transmits the resume communications message and the activation request message simultaneously based on last serving MN 705 storing a context for SN 710 (e.g., including a lower-layer SCG configuration that can be used for SN 710). Additionally, at 760, SN 710 may transmit an SN addition request ACK message based on receiving the activation request message, where the SN addition request ACK message confirms that UE 115-*f* can initiate communications with SN 710 for the DC configuration.

At 765, UE 115-*f* may transmit a Msg5 of the RACH procedure to complete the resuming of communications with last serving MN 705 (e.g., RRCResumeComplete message). At 770, after transmitting the Msg5, UE 115-*f* may perform an additional RACH procedure with a PSCell of SN 710. Subsequently, at 775, upon the additional RACH procedure being successful at the PSCell, UE 115-*f* may resume connections with both last serving MN 705 and SN 710. In some cases. UE 115-*f* may apply or replace one or more parameters for the previously stored lower-layer SCG configuration based on information broadcasted in SIBs from SN 810 after resuming connection with SN 810. Accordingly, at 780, UE 115-*f* may transmit data back and forth with SN 710 based on resuming the connections.

Figure 8:
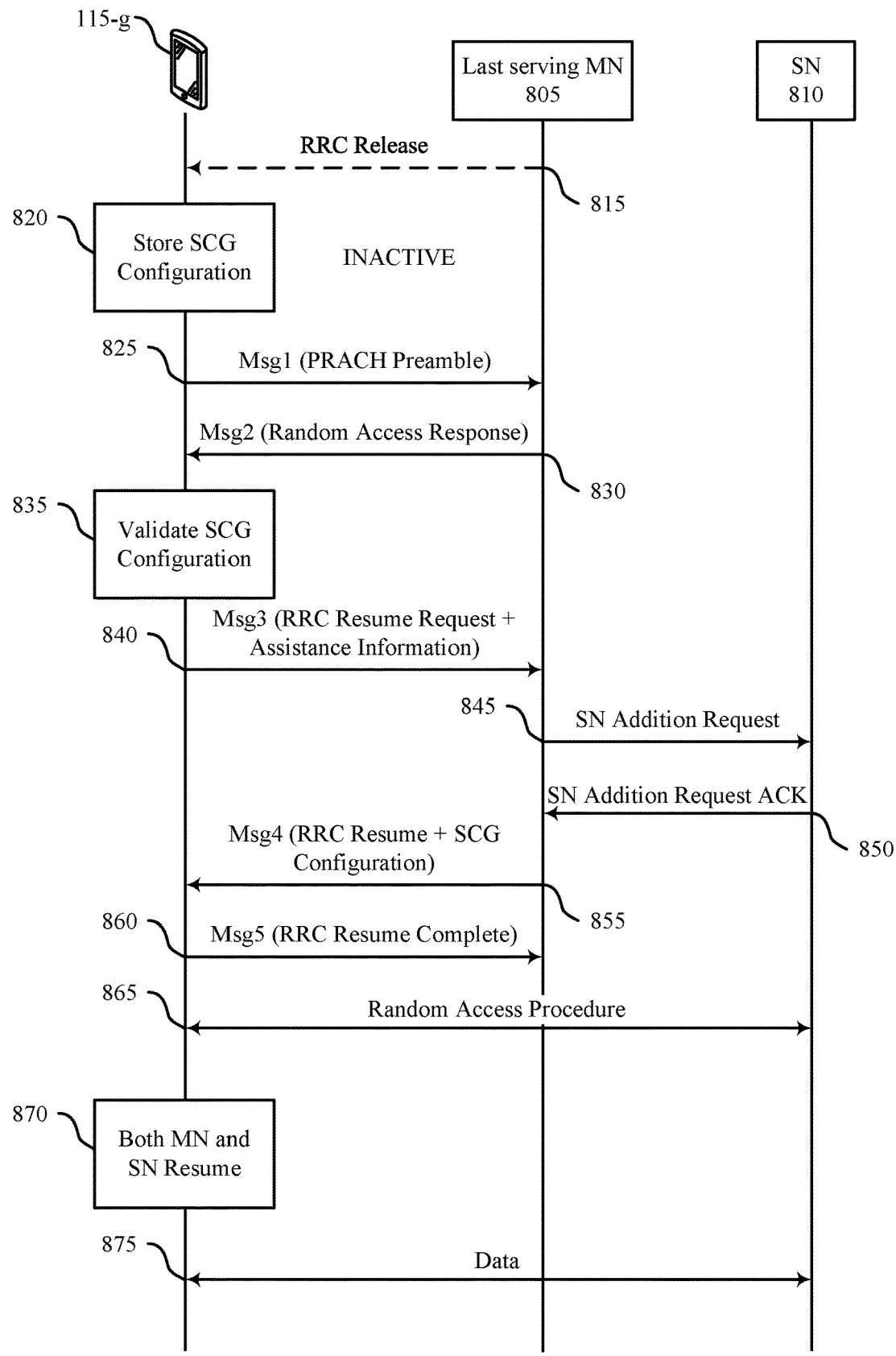

FIG. 8 illustrates an example of a process flow 800 that supports SCG configuration in MR-DC in accordance with aspects of the present disclosure. In some examples, process flow 800 may implement aspects of wireless communications systems 100 and/or 200. Process flow 800 may include a UE 115-*g*, a last serving MN 805, and an SN 810. UE 115-*g* may be an example of a UE 115 as described above with reference to FIGS. 1 through 7. Last serving MN 805 may be an example of a base station 105, MN, MCG, PCell, etc., as described above with reference to FIGS. 1 through 7. Additionally, SN 810 may be an example of a base station 105, SN, SCG, SCell, PSCell, etc., as described above with reference to FIGS. 1 through 7. UE 115-g may be operating in a DC configuration with last serving MN 805 and SN 810. In some cases, last serving MN 805 may operate in a first RAT, and SN 810 may operate in a second RAT, which may be different or the same as the first RAT, indicating an MR-DC configuration for communications between UE 115-g, last serving MN 805, and SN 810.

Process flow 800 may include similar messages as described and transmitted in process flow 700. In some cases, UE 115-g may be unable to store a previously used lower-layer SCG configuration (e.g., due to memory limitations). In some cases, last serving MN 805 may store a lower-layer SCG configuration for SN 810.

Accordingly, at 815, when transmitting a release message to suspend communications between UE 115-g and SN 810 (e.g., for UE 115-g to enter an inactive communication state), last serving MN 805 may include a measurement configuration for an SCG (e.g., SN 810) of the DC configuration. In some cases, last serving MN 805 may transmit additional IEs for determining whether an SCG configuration is valid with the release message (e.g., the validity area, validity time, and threshold measurement value). In some cases, last serving MN 805 may set an IE for storing the lower-layer SCG configuration to false before transmitting.

As such, at 820, UE 115-g may enter the inactive communication state and store the higher-layer SCG configuration while refraining from storing any lower-layer SCG configuration. At 825 and 830, UE 115-g and last serving MN 805 may transmit similar RACH messages as described above with reference to process flow 700.

At 835, UE 115-g may determine whether to use one or more cells in the SCG for resumption of the SN communication based on the measurement configuration. For example, UE 115-g may perform measurements in accordance with the measurement configuration and determine whether to include an indication that a previously stored lower-layer secondary cell group configuration is available for resuming the SN communications. In some cases, UE 115-g may perform measurements on cells included in the validity area. If UE 115-g reselects to a cell or RNA outside a list of cells indicated by the validity area, UE 115-g may no longer measure for that cell/RNA. Additionally or alternatively, if the validity time expires, UE 115-g may regard the measurement configuration for the SCG as invalid and may stop performing the measurements. In some cases, UE 115-g may stop performing measurements for a particular SCell if a cell quality for that SCell falls below the threshold measurement value.

At 840, when transmitting a Msg3 of the RACH procedure, UE 115-g may also transmit assistance information to last serving MN 805 based on the measurements performed at 835. For example, the assistance information may include information to assist last serving MN 805 in determining whether to apply the previously stored lower-layer SCG configuration at the last serving MN 805 or an updated lower-layer SCG configuration. In some cases, UE 115-g may include a suggested PSCell identifier with the assistance information.

At 845 and 850, last serving MN 805 and SN 810 may confirm that SN 810 is added to the DC configuration based on an SN addition request message and an SN addition request ACK message, which may be similar to the messages as described above with reference to process flows 400, 500, 600, and 700.

At 855, when transmitting a Msg4 of the RACH procedure, last serving MN 805 may transmit a lower-layer SCG configuration based on the assistance information received in the Msg3 of the RACH procedure. This lower-layer SCG configuration may enable UE 115-g to resume a connection with SN 810 according to the DC configuration.

At 860, 865, 870, and 875, UE 115-f may perform similar steps as described in process flow 700 to resume a connection with last serving MN 805 (e.g., 860), perform an additional RACH with SN 810 (e.g., 865), resume connections with both last serving MN 805 and SN 810 (e.g., 870), and transmitting data back and forth with SN 810 based on resuming the connections (e.g., 875).

Figure 9:
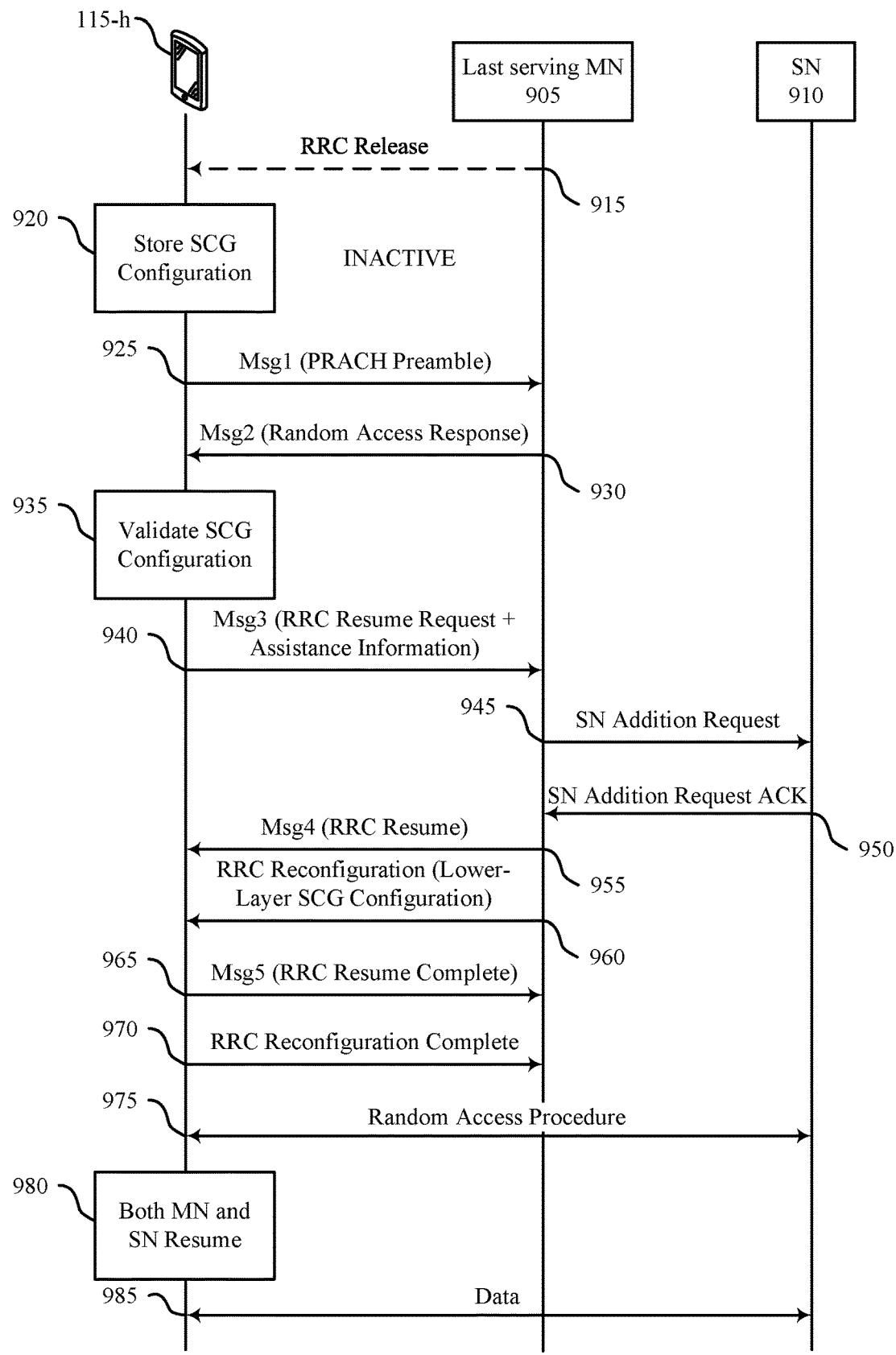

FIG. 9 illustrates an example of a process flow 900 that supports SCG configuration in MR-DC in accordance with aspects of the present disclosure. In some examples, process flow 900 may implement aspects of wireless communications systems 100 and/or 200. Process flow 900 may include a UE 115-h, a last serving MN 905, and an SN 910. UE 115-h may be an example of a UE 115 as described above with reference to FIGS. 1 through 8. Last serving MN 905 may be an example of a base station 105, MN, MCG, PCell, etc., as described above with reference to FIGS. 1 through 8. Additionally, SN 910 may be an example of a base station 105, SN, SCG, SCell, PSCell, etc., as described above with reference to FIGS. 1 through 8. UE 115-h may be operating in a DC configuration with last serving MN 905 and SN 910. In some cases, last serving MN 905 may operate in a first RAT, and SN 910 may operate in a second RAT, which may be different or the same as the first RAT, indicating an MR-DC configuration for communications between UE 115-h, last serving MN 905, and SN 910.

Process flow 900 may include similar messages and measurement configurations as described above with reference to process flow 800. For example, 915, 920, 925, 930, 935, 940, 945, 950, 955, 965, 975, 980, and 985 may correspond to similar messages and processes as described above with reference to process flow 800. However, rather than transmitting a lower-layer SCG configuration in a Msg4 of a RACH procedure, last serving MN 905 may transmit, at 960, the lower-layer SCG configuration based on the measurement configuration in a reconfiguration message (e.g., RRCReconfiguration message) following the Msg4 transmission at 955. Accordingly. UE 115-h may also transmit a reconfiguration complete message at 970 based on receiving the reconfiguration message.

Figure 10:
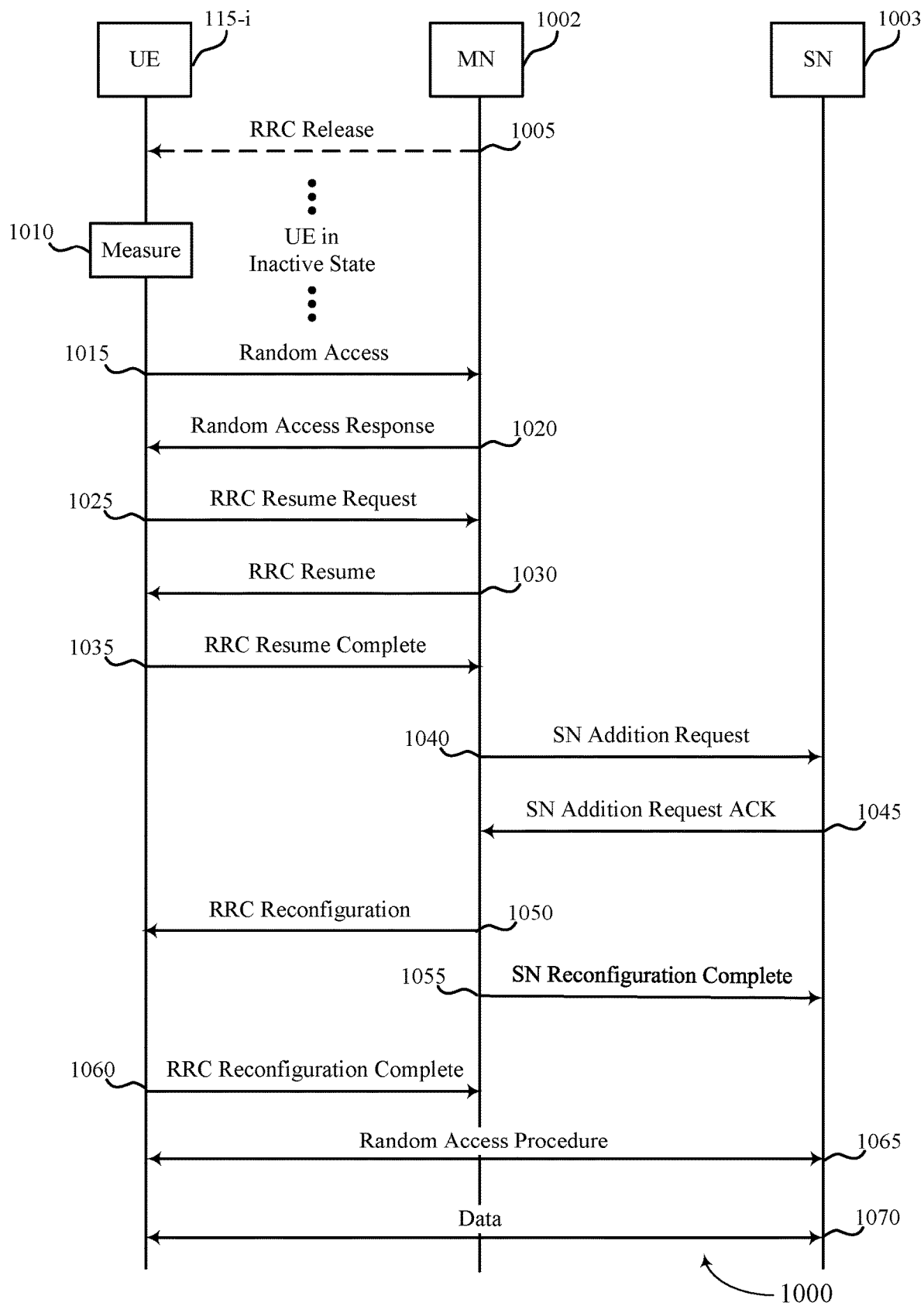
FIGS. 10 through 20 illustrate examples of process flows in a system that supports measurement-based dual connectivity (DC) and CA activation in accordance with aspects of the present disclosure.

FIG. 10 illustrates an example of a process flow 1000 in a system that supports measurement-based DC and CA activation in accordance with aspects of the present disclosure. In some examples, process flow 1000 may implement aspects of wireless communications system 100. For instance, process flow 1000 includes UE 115-i, which may be an example of a UE 115 described with reference to FIGS. 1 through 9. Further, process flow 1000 includes an MN 1002 and an SN 1003 which may be configured for operation in a DC deployment with UE 115-i. MN 1002 and SN 1003 may each be an example of a base station 105 as described with reference to FIGS. 1 and 2. Process flow 1000 may illustrate a UE 115 transitioning from an inactive communication state (e.g., RRC inactive) and resuming communications within a DC deployment.

In process flow 1000, UE 115-i may operate in a DC configuration with MN 1002 providing an MCG and SN 1003 providing an SCG. In some cases, UE 115-i may move into the RRC inactive state to save power, for example, based on communication activity with a network. In such cases, UE 115-*i* may transition into the RRC inactive state based on signaling received from the network. For instance, at 1005, MN 1002 may transmit a message that includes an indication of an RRC release to UE 115-*i*, and UE 115-*i* may move into the RRC inactive state (e.g., from an RRC connected state) based on the received signaling. In some cases, UE 115-*i* may obtain, from the RRC release message, a measurement configuration for potential frequencies of SN 1003.

Upon transitioning to the RRC inactive state, UE 115-*i* may store higher-layer configurations used to communicate with MN 1002 and SN 1003 (e.g., higher-layer MCG configurations and higher-layer SCG configurations, respectively) while simultaneously releasing lower-layer configurations for MN 1002 and SN 1003. Similarly, MN 1002 and SN 1003 may store the higher-layer configurations and release the lower-layer configurations. That is, both UE 115-*i* and the network may store higher-layer MCG and SCG configurations and release lower-layer MCG and SCG configurations. Additionally, both UE 115-*i* as well as MN 1002 and/or SN 1003 may store an AS context for UE 115-*i*.

At 1010, UE 115-*i* may perform measurements of one or more cells following reception of the RRC release message at 1005. For instance, the measurements may include layer 3 (L3) measurements for one or more cells. As such, UE 115-*i* may perform the measurements at 1010 while in the RRC inactive state. UE 115-*i* may perform the measurements to determine a quality of each of the frequencies associated with SN 1003 based on the information included in the RRC release message at 1005. Additionally, UE 115-*i* may perform measurements of other cells, including measurements of frequencies associated with MN 1002 and one or more additional cells that are near UE 115-*i*. For example, UE 115-*i* may be mobile while in the inactive communication state and may move to a cell that is different from the respective cells provided by MN 1002 and SN 1003.

After operating in the RRC inactive state, UE 115-*i* may later transition to the RRC connected state to communicate uplink and/or downlink data with the network. As such, UE 115-*i* may perform a random access procedure (e.g., RACH procedure) to re-establish a connection with a cell that UE 115-*i* was previously communicating on (e.g., for either MN 1002 or SN 1003). As an example, at 1015, UE 115-*i* may transmit a first random access message (e.g., message 1. Msg1, or other like terminology) including a PRACH preamble to MN 1002 when initiating the RACH procedure. MN 1002 may have been configured as a previously serving MN 1002 prior to UE 115-*i* operating in the inactive communication state, and at 1020, MN 1002 may transmit a second message (e.g., Msg2) to UE 115-*i* that may include a random access response.

At 1025, UE 115-*i* may transmit a third message (e.g., Msg3) to MN 1002 that may include an RRC resume request. In some cases, the resume request sent at 1025 may include an indication of the availability of one or more measurement reports corresponding to measurements performed by UE 115-*i* while in the RRC inactive state. As an example, UE 115-*i* may add one (1) bit to the RRC resume request to indicate whether measurement results are available for transmission to a base station 105. At 1030, MN 1002 may transmit a fourth message (e.g., Msg4) to UE 115-*i* that may include an indication of RRC resumption. In some examples, MN 1002 may include a request for the measurement reporting in the RRC resume message, which may be based on UE 115-*i* indicating that the measurement reporting was available via the RRC resume request. In other examples, and as discussed below, UE 115-*i* may not have any available measurement reports and may indicate that no measurement reporting is available in the RRC resume request at 1025. In such cases, MN 1002 may refrain from requesting the measurement reports in the RRC resume request at 1030. Additionally, while FIG. 10 illustrates a four-step RACH procedure, UE 115-*i* may perform other RACH procedures (such as two-step RACH procedures).

At 1035, UE 115-*i* may acknowledge the RACH procedure is complete by transmitting a message to MN 1002 indicating RRC resumption is complete at UE 115-*i*. In some examples, the RRC resume complete message may include measurement reports (e.g., L3 measurement reports) requested by MN 1002 and based on the measurements UE 115-*i* performed while in the RRC inactive state.

At 1040, MN 1002 may transmit a message to SN 1003 that indicates an SN addition request. For instance, based on measurements provided by UE 115-*i* at 1035, MN 1002 may determine that SN 1003 may still provide a secondary cell with the best signal quality for UE 115-*i* (e.g., as compared to measured signal quality for other nearby cells) for DC communications. Accordingly, MN 1002 may signal to SN 1003 the addition of (or re-establishment of) SN 1003 in the DC deployment for UE 115-*i*. At 1045, SN 1003 may transmit a message that indicates an SN addition request acknowledgment (ACK) to MN 1002.

At 1050, MN 1002 may transmit an RRC reconfiguration message to UE 115-*i* and, at 1055, MN 1002 may further signal to SN 1003 that the SN reconfiguration is complete. Additionally, after processing the configuration(s) included in the RRC reconfiguration message at 1050, UE 115-*i* may indicate that the RRC reconfiguration is complete at 1060. As such, UE 115-*i* may perform a random access procedure with SN 1003 at 1065, and may proceed to communicate data at 1070.

However, as mentioned above, UE 115-*i* and the network may have released the lower-layer configurations previously used to communicate with MN 1002 and SN 1003 in the DC deployment (e.g., the SCG lower-layer configuration and/or the MCG lower-layer configuration used prior to the suspension of communications for the RRC inactive state). As a result, UE 115-*i* and the network may have no knowledge of the configurations in use prior to UE 115-*i* entering the RRC inactive state. So, even when UE 115-*i* is configured with DC before entering the RRC inactive state, UE 115-1 may receive one or more RRC connection reconfiguration messages to enable communications with MN 1002 and for the addition of SN 1003, resulting in signaling overhead in the system. At 1050, MN 1002 may transmit at least one RRC reconfiguration messages to UE 115-*i* that includes the full lower-layer configuration information for each of the nodes in the DC deployment. The RRC reconfiguration sent at 1050 may include, for example, resource configurations, MAC configurations, and the like. The signaling of the full lower-layer configurations may add delays in UE 115-*i* resuming communications in accordance with the previously-established DC scheme, for example, due to latency involved when decoding and processing the information received from the network in multiple RRC reconfiguration messages. Further, without the lower-layer configurations, UE 115-*i* may not be able to resume communications until receiving the RRC reconfiguration messages.

As described herein, storing the lower-layer configurations at UE 115-*i* and the network when UE 115-*i* transitions into the RRC inactive state may reduce or minimize signaling overhead and latency. Such techniques may enable UE 115-*i* to resume communications more quickly when compared with waiting for the lower-layer configurations. For instance, UE 115-*i* may store one or more MCG and SCG lower-layer configurations upon entering the RRC inactive state (e.g., when UE 115-*i* receives the RRC release message at 1005). Likewise, MN 1002 and SN 1003 may store the lower-layer MCG and SCG configurations based on UE 115-*i* entering the RRC inactive state. Then, upon UE 115-*i* leaving the RRC inactive state, UE 115-*i* may use the stored lower-layer configurations to resume communications and to determine a difference between current MCG/SCG lower-layer configurations. As such, UE 115-*i* may receive the difference upon resuming from the RRC inactive state, for example, in an RRC reconfiguration message including delta signaling. Such delta signaling may provide a more efficient means for UE 115-*i* to resume communications with a cell in a DC deployment (or in a CA scheme), which may reduce processing times, decrease signaling overhead, and enable UE 115-*i* to resume operations more quickly in the system.

Figure 11:
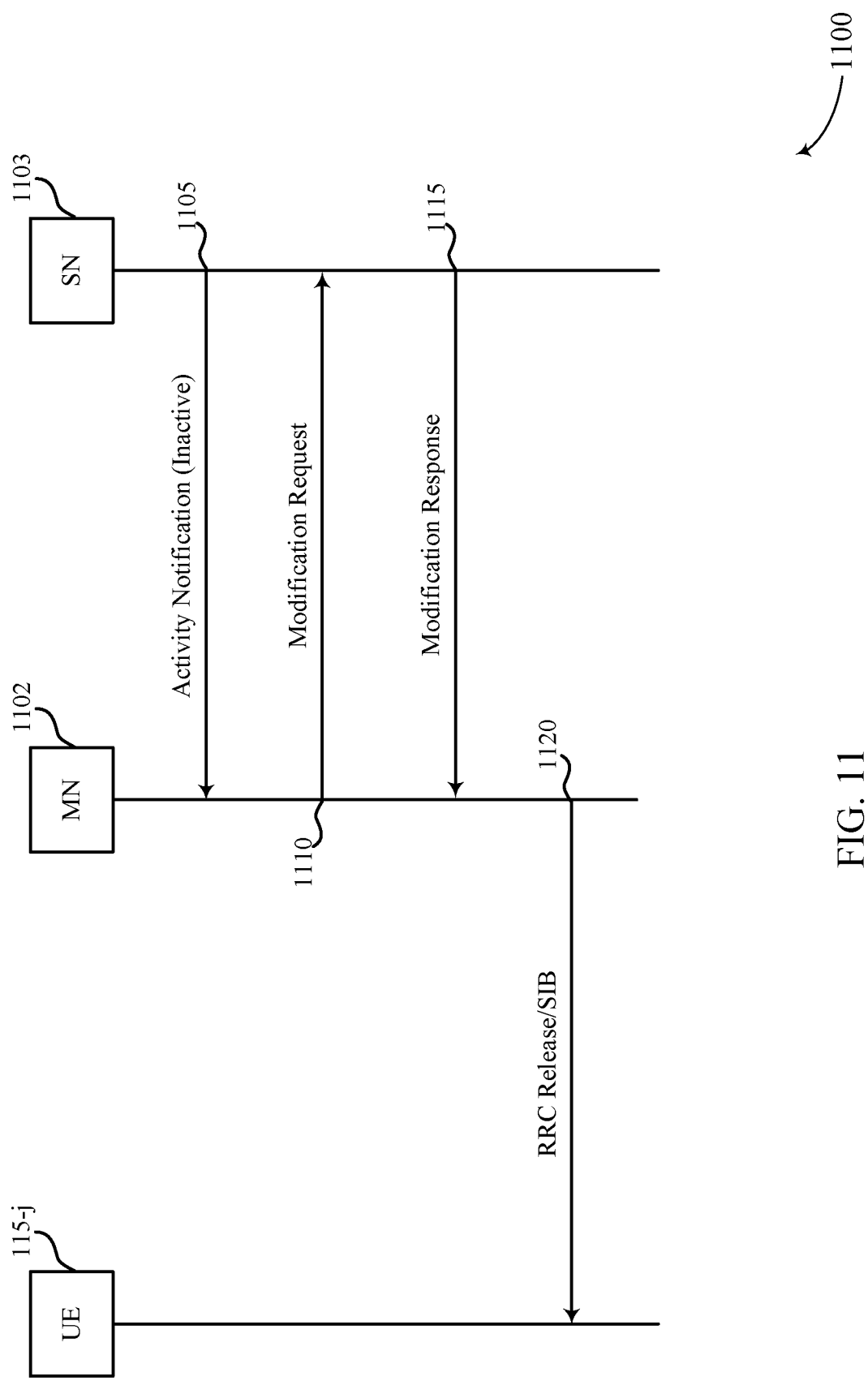

FIG. 11 illustrates an example of a process flow 1100 in a system that supports measurement-based DC and CA activation in accordance with aspects of the present disclosure. In some examples, process flow 1100 may implement aspects of wireless communications system 100. For example, process flow 1100 includes UE 115-*j*, which may be an example of a UE 115 described with reference to FIGS. 1 through 10. Further, process flow 1100 includes an MN 1102 and an SN 1103 which may be configured for operation in a DC deployment with UE 115-*j*. MN 1102 and SN 1103 may each be an example of a base station 105 as described with reference to FIGS. 1 and 2. Process flow 1100 may illustrate the configuration of measurement reporting for UE 115-*j* for use when operating in an inactive communication state (e.g., RRC inactive).

In process flow 1100, UE 115-*j* may operate in a DC configuration with MN 1102 providing an MCG and SN 1103 providing an SCG. At 1105, SN 1103 may transmit a message to MN 1102 that includes an activity notification. For instance, the activity notification may indicate an inactive status of communications with UE 115-*j*. At 1110, MN 1102 may transmit a message that may include an SN modification request to SN 1103. The SN modification request message may suspend SN 1103 as the network prepares for UE 115-*i* to move to an RRC inactive state. In some cases, the SN modification request may indicate an AS context for UE 115-*j*, which SN 1103 may save.

At 1115, SN 1103 may transmit a message to MN 1102 that may include an SN modification response and may indicate SN-configured measurements. For instance, SN 1103 may configure measurements on MN 1102 or another neighboring cell and include such measurement configurations for use by UE 115-*j* in the SN modification response at 1115. In such cases, UE 115-*j* may resume from an RRC inactive state using SN 1103 and indicate the availability of measurement reports. Thus, SN 1103 may know whether MN 1102 may also resume based on the measurement reporting configurations (and received measurements) for MN 1102. Likewise, MN 1102 may configure measurements on SN 1103 or one or more neighboring nodes. Should UE 115-*j* resume communications with MN 1102 upon exiting the RRC inactive state and signal an availability of measurements for SN 1103 (or the other nodes), MN 1102 may know whether to add or reconfigure SN 1103 or the other node(s) within the DC deployment.

At 1120, MN 1102 may transmit a message to UE 115-*j* that includes the measurement configurations. In some cases, the message at 1120 may be an RRC release message, a SIB, or a combination thereof. In some examples, an RRC release message may indicate a suspend configuration for UE 115-*j*, which may signal that UE 115-*j* may enter the RRC inactive state. Additionally, the RRC release message may include the measurement configurations for MN 1102 and/or SN 1103. Additionally or alternatively, an SIB sent at 1120 may indicate the measurement configuration for MN 1102 and SN 1103.

In some cases, the network and UE 115-*j* may store lower-layer configurations of MCG (e.g., corresponding to MN 1102) and SCG (e.g., corresponding to SN 1103) when UE 115-*j* is in the RRC inactive state. Additionally, depending on movement by UE 115-*j* during a time period when in the RRC inactive state, UE 115-*j* may resume in a cell provided by MN 1102 or a cell provided by SN 1103. The described configuration of the measurements UE 115-*j* may perform while in the RRC inactive state may serve to enhance operations when UE 115-*j* exits the RRC inactive state. For instance, an indication of whether measurement reporting is available when UE 115-*j* exits the RRC inactive state, based on the received measurement configuration at 1120, may signal to the network how to most efficiently enable communication resumption with various nodes for UE 115-*j*. When UE 115-*j* indicates measurement reports are available, the MN 1102 and/or SN 1103 (based on which node UE 115-*j* resumes in) may use the measurement reports to provide delta signaling that indicates a difference between a stored lower-layer configuration and a current lower-layer configuration. In such cases, the signaling may include changes between stored lower-layer configurations and current lower-layer configurations that may be based on the measurement reports provided by UE 115-*j*, as configured via the processes described herein. The described features of storing lower-layer configurations, and delta signaling, may also be applicable to resuming communications with a single base station 105, such as for CA.

Figure 12:
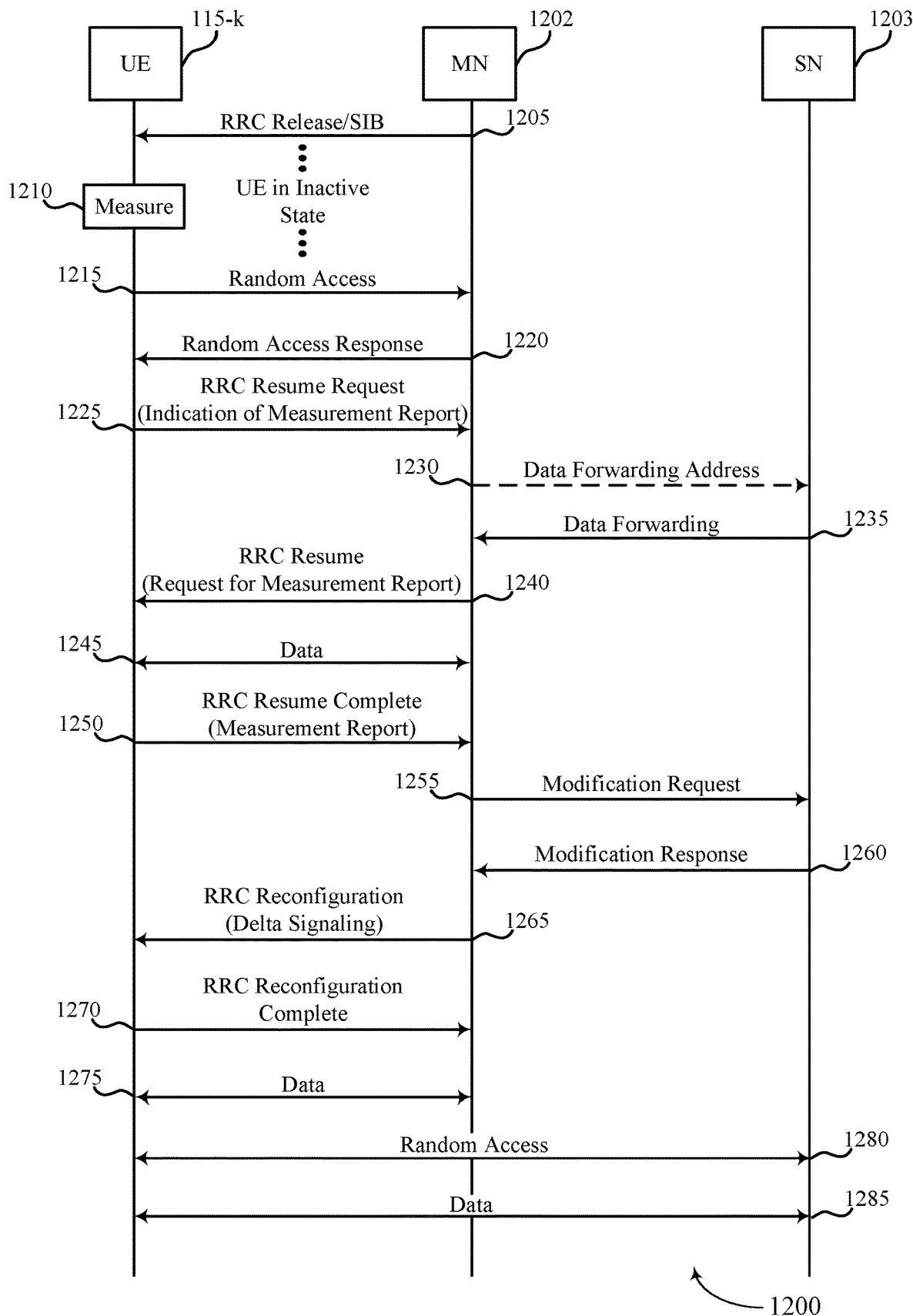

FIG. 12 illustrates an example of a process flow 1200 in a system that supports measurement-based DC and CA activation in accordance with aspects of the present disclosure. In some examples, process flow 1200 may implement aspects of wireless communications system 100. For example, process flow 1200 includes UE 115-*k*, which may be an example of a UE 115 described with reference to FIGS. 1 through 11. Further, process flow 1200 includes an MN 1202 and an SN 1203 which may be configured for operation in a DC deployment with UE 115-*k*. MN 1202 and SN 1203 may each be examples of a base station 105 as described with reference to FIGS. 1 and 2. Process flow 1200 may illustrate the use of saved lower-layer configurations when UE 115-*k* resumes from an RRC inactive state. Additionally, process flow 1200 may illustrate the modification of an SN configuration in a DC deployment through delta signaling, which may be based on measurements of the SN.

In process flow 1200, UE 115-*k* may operate in a DC configuration with MN 1202 providing an MCG (e.g., including a first cell) and SN providing an SCG (e.g., including a second cell). In some examples, UE 115-*k* may further support operation in the RRC inactive state and may receive signaling that enables the transition to the RRC inactive state. For example, at 1205, MN 1202 may transmit an RRC release message to UE 115-*k* that enables UE 115-*k* to transition to the RRC inactive state. Further, MN 1202 may signal an indication of one or more measurement configurations (e.g., such as the measurement configurations described with reference to FIG. 11). In some cases, MN

1202 may send the measurement configurations the RRC release message, an SIB, or a combination thereof.

UE 115-$k$ may transition into the RRC inactive state (e.g., from an RRC connected state) based on the received signaling from MN 1202. In some cases, at 1210, UE 115-$k$, may perform one or more measurements of nearby cells after entering the RRC inactive state. For example, UE 115-$k$ may perform measurements of SN 1203 (e.g., including downlink received signal strength measurements, carrier-to-interference ratio measurements, etc.), which may be based on measurement configurations received via the message received at 1205.

UE 115-$k$, MN 1202, and/or SN 1203 may store a set of lower-layer configurations (e.g., MSG or SCG configurations) used for communication between UE 115-$k$, MN 1202, and SN 1203 prior to UE 115-$k$ transitioning into the inactive state. The storage of the lower-layer configurations may enable UE 115-$k$ to resume from the RRC inactive state by obtaining a full configuration of MN 1202, SN 1203, or both, from stored lower-layer configurations and delta signaling from when UE 115-$k$ resumes communications in the previously established DC deployment.

As an example, UE 115-$k$ may resume from the RRC inactive state in a cell of MN 1202 (e.g., the last-serving MN in the DC deployment). At 1215, UE 115-$k$ may transmit a message (e.g., Msg1) to MN 1202 as part of a random access procedure. As such, MN 1202 may respond with a random access response (e.g., Msg2) at 1220, and UE 115-$k$ may transmit, to MN 1202, an RRC resume request (e.g., Msg3). Based on the measurements performed at 1210 (e.g., of SN 1203), UE 115-$k$ may include, in the RRC resume request, an indication of measurements available for the network. For instance, UE 115-$k$ may indicate that a measurement report for measurements performed for one or more cells of SN 1203 is available, which may further signal that communications with SN 1203 may resume (e.g., in addition to communications with MN 1202) as part of the DC deployment.

In some examples, at 1230, MN 1202 may transmit a message to SN 1203 that may include a data forwarding address indication, and SN 1203 may respond at 1235 with data to be forwarded to UE 115-$k$. In such cases, the forwarded data may be data buffered for UE 115-$k$ at SN 1203 while UE 115-$k$ was in the RRC inactive state.

At 1240, MN 1202 may transmit an RRC resume message (e.g., Msg4) to UE 115-$k$ that includes a request for the measurements indicated by UE 115-$k$ at 1225. In some cases, the RRC resume message at 1240 may enable communications to resume between UE 115-$k$ and MN 1202. For example, based on the stored lower-layer MCG configurations at both UE 115-$k$ and the network, and because MN 1202 operates as both the previously serving and currently-serving MN of the DC deployment, the stored lower-layer MCG configuration may enable UE 115-$k$ to communicate with MN 1202 without having to receive additional configuration signaling. As such, at 1245, UE 115-$k$ and MN 1202 may transmit and receive uplink and/or downlink data. In some examples, the data may include the data forwarded to MN 1202 from SN 1203.

At 1250, UE 115-$k$ may transmit an RRC resume complete message to MN 1202. The RRC resume complete message may include a measurement report of SN 1203 and the measurement reporting (in response to the request by MN 1202) for the measurements performed by UE 115-$k$ while in the RRC inactive state. Further, 1255 to 1270 illustrate the activation of SN 1203 by MN 1202. In such cases, MN 1202 may initialize an SN modification procedure based on the received measurement reporting from UE 115-$k$. For instance, at 1255, MN 1202 may transmit a modification request to SN 1203 on, for example, an Xn interface between MN 1202 and SN 1203. The modification request may include an SN modification request. At 1260, SN 1203 may transmit a modification response (e.g., an SN modification response) to MN 1202, for example, via the Xn interface to MN 1202.

At 1265, MN 1202 may transmit an RRC reconfiguration message to UE 115-$k$ that includes an indication of delta signaling of the lower-layer MCG configuration, the lower-layer SCG configuration, or a combination thereof. For example, the delta signaling may comprise a difference between the stored lower-layer MCG configuration and a current lower-layer MCG configuration. Additionally or alternatively, the delta signaling may comprise a difference between the stored lower-layer SCG configuration and a current lower-layer SCG configuration that is based on the measurements of SN 1203. In such cases, the differences indicated by the delta signaling may include a change in one or more parameters of a current lower-layer configuration as compared to the stored lower-layer configuration.

As an illustrative example, a current lower-layer SCG configuration may include a configuration of a set of time-frequency resources used to communicate with SN 1203. The resource configuration may change from the stored lower-layer SCG configuration (e.g., the lower layer SCG configuration used before UE 115-$k$ transitioned to the RRC inactive state), and the delta signaling may indicate the difference or change in the resource configuration. Additionally, a MAC configuration may remain the same between the current lower-layer SCG configuration and the stored lower-layer SCG configuration. As such, the delta signaling may not include an explicit indication of the MAC configuration, and UE 115-$k$ may apply MAC configuration from the stored lower-layer configuration (if the MAC configuration remains unchanged and the resource configuration changes). Accordingly, the delta signaling UE 115-$k$ receives at 1265 may indicate which parameters, fields, and/or aspects of a lower-layer configuration (e.g., MCG and/or SCG lower-layer configuration) were added, modified, or changed from a previous lower-layer configuration.

At 1270, UE 115-$k$ may transmit an RRC reconfiguration complete message to MN and may resume communications with MN 1202. For example, at 1275, UE 115-$k$ and MN 1202 may communicate uplink and downlink data (e.g., based on the delta signaling). Additionally, UE 115-$k$ may resume communications with SN 1203, where UE 115-$k$ may perform a random access procedure with SN 1203 at 1280. In some cases, the random access procedure may be based on the delta signaling received from MN 1202. Upon completion of the random access procedure, at 1285, SN 1203 may transmit any buffered downlink packets at SN 1203 to UE 115-$k$. UE 115-$k$ and SN 1203 may resume communications in the DC deployment. Thus, the various aspects of process flow 1200 may illustrate a case where both MN 1202 and SN 1203 remain unchanged after UE 115-$k$ exits the RRC inactive state based on early measurement reporting by UE 115-$k$. Such techniques may be applicable to other cases, including those not explicitly described herein.

Figure 13:
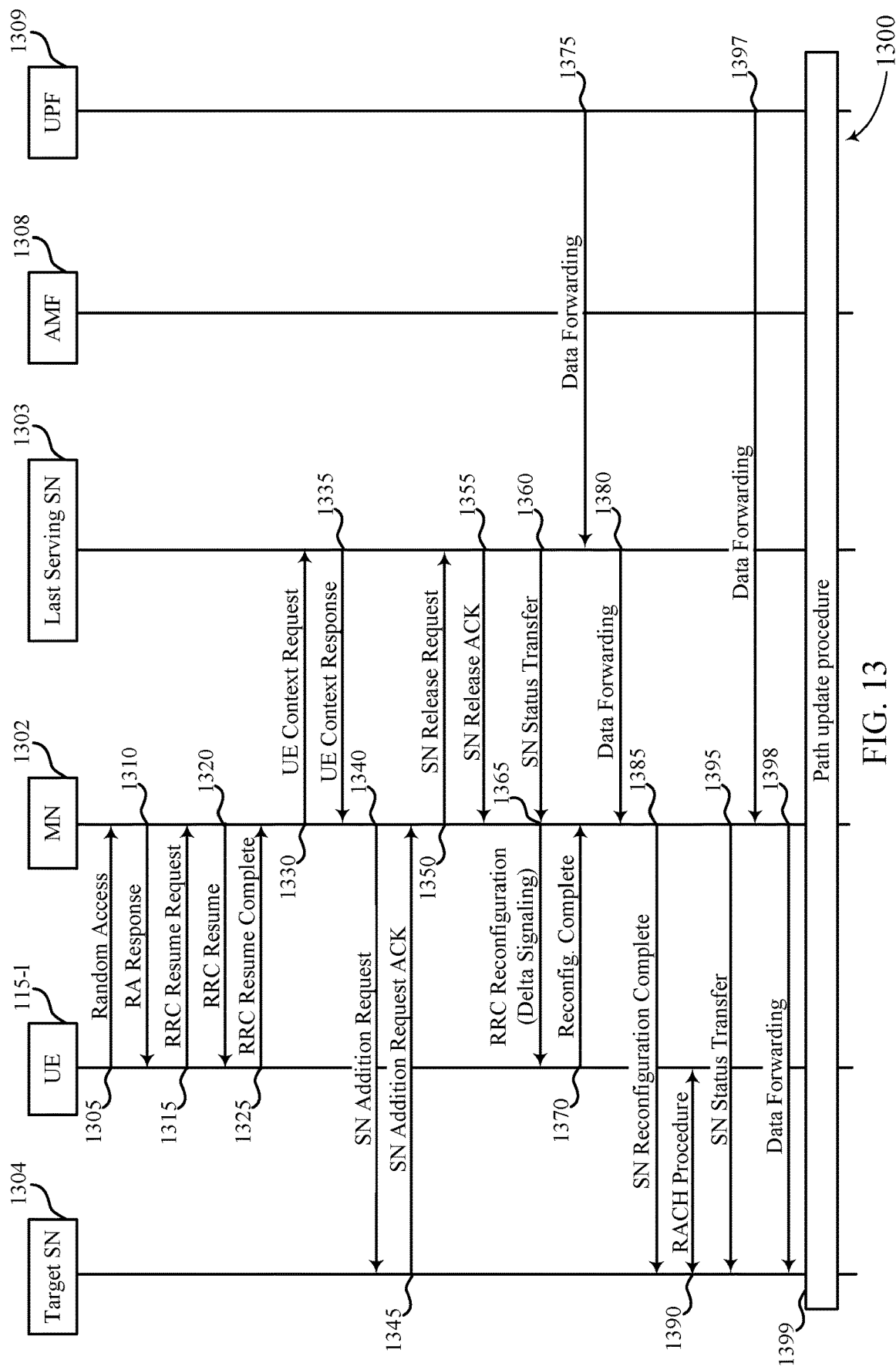

FIG. 13 illustrates an example of a process flow 1300 in a system that supports measurement-based DC and CA activation in accordance with aspects of the present disclosure. In some examples, process flow 1300 may implement aspects of wireless communications system 100. As an example, process flow 1300 includes UE 115-1, which may be an example of a UE 115 described with reference to FIGS. 1 through 12. Further, process flow 1300 includes an MN 1302, a previously serving SN 1303, and a target SN 1304, each of which may be configured to operate in a DC deployment with UE 115-1. MN 1302, previously serving SN 1303, and target SN 1304 may each be an example of a base station 105 as described with reference to FIGS. 1 and 2. Process flow 1300 may also include an access management function (AMF) 1308 and a user plane function (UPF) 1309 associated with a core network, where AMF 1308 and UPF 1309 may communicate with one or more nodes. Process flow 1300 may illustrate the use of stored lower-layer configurations when UE 115-1 resumes from an RRC inactive state, where UE 115-1 may resume in a previously serving MN. Additionally, process flow 1300 may illustrate the modification of SNs in the DC deployment, which may be based on measurements of the target SN 1304.

In some cases, UE 115-1 may operate in an RRC inactive state. Prior to transitioning into the RRC inactive state, UE 115-1 may communicate with a network in a DC deployment, including MN 1302 and previously serving SN 1303. UE 115-1 and the network (e.g., MN 1302 and previously serving SN 1303) may save lower-layer MCG/SCG configurations when UE 115-1 transitioned into the RRC inactive state. In some examples, UE 115-1 may perform one or more measurements of cells while in the RRC inactive state. For example, UE 115-1 may be mobile (e.g., moving through different geographic regions or areas) while in the RRC inactive state and may move near a cell provided by target SN 1304 that is different from a cell provided by MN 1302 and previously serving SN 1303. In such cases, based on the measurements of a target cell, UE 115-1 may resume communications with MN 1302 and target SN 1304 upon exiting the RRC inactive state.

Upon resuming from the RRC inactive state, at 1305, 1310, 1315, and 1320, UE 115-1 and MN 1302 may perform a random access procedure. In such cases, an RRC resume request sent by UE 115-1 at 1315 may include an indication that a measurement report for target SN 1304 is available based on the measurements UE 115-*k* completed while in the RRC inactive state. Accordingly, MN 1302 may transmit the RRC resume message to UE 115-1 at 1320, which may include a request for the indicated measurement report for target SN 1304. In such cases, when UE 115-1 resumes communications of the DC deployment with MN 1302 using a measurement report for target SN 1304, the SN of the DC deployment may change while the MN remains unchanged triggering an SN change procedure. For example, MN 1302 may initiate procedures to release previously serving SN 1303 from the DC deployment and add target SN 1304 to the DC deployment. At 1330, MN 1302 may transmit a message to previously serving SN 1303 that may request the retrieval of an AS context for UE 115-1. Previously serving SN 1303 may respond with the requested information, including a stored lower-layer SCG configuration (e.g., stored at the time UE 115-1 entered into the RRC inactive state). Then, MN 1302 may transmit an SN addition request to target SN 1304. The SN addition request may include information that conveys the lower-layer SCG configuration received from previously serving SN 1303. In such cases, delta signaling may configure UE 115-1 for communication with target SN 1304.

For example, after transmitting an SN release request (e.g., optionally including a data forwarding address) to previously serving SN 1303 (at 1350) and receiving an SN release ACK from previously serving SN 1303 (at 1355), MN 1302 may receive an indication of a status transfer at 1360. MN 1302 may also transmit an RRC reconfiguration to UE 115-1 at 1355, where the RRC reconfiguration may include delta signaling that indicates a difference between the stored lower-layer MCG/SCG configurations with respect to current lower-layer MCG/SCG configurations. In such cases, the delta signaling may be based on the measurement report for target SN 1304 provided by UE 115-1 (e.g., at 1325). As described herein, the delta signaling provided to UE 115-1 may reduce signaling overhead (e.g., as compared to cases where an RRC connection reconfiguration includes a full configuration for target SN 1304 and/or MN 1302).

In some cases, UPF 1309 may trigger the forwarding of data by previously serving SN 1303 (e.g., at 1375 and 1380). Additionally. MN 1302 may transmit an SN reconfiguration complete message to target SN 1304 at 1385. Thereafter, target SN 1304 and UE 115-1 may perform a random access procedure (e.g., a RACH procedure) to enable communications with target SN 1304 as a currently-serving SN of the DC deployment. For example, at 1395, MN 1302 may signal an SN status transfer to target SN 1304, which may enable the switch from previously serving SN 1303 to target SN 1304 for DC. UPF 1309, MN 1302, and target SN 1304 may perform additional data forwarding (e.g., at 1397 and 1398). In some cases, a path update procedure may be performed at 1399. Thus, the described techniques of process flow 1300 may illustrate a case where, in a DC deployment, an MN is unchanged and SNs change after UE 115-1 exits the RRC inactive state based on early measurement reporting by UE 115-1. However, such techniques may be applicable in other examples, including those not explicitly described herein.

Figure 14:
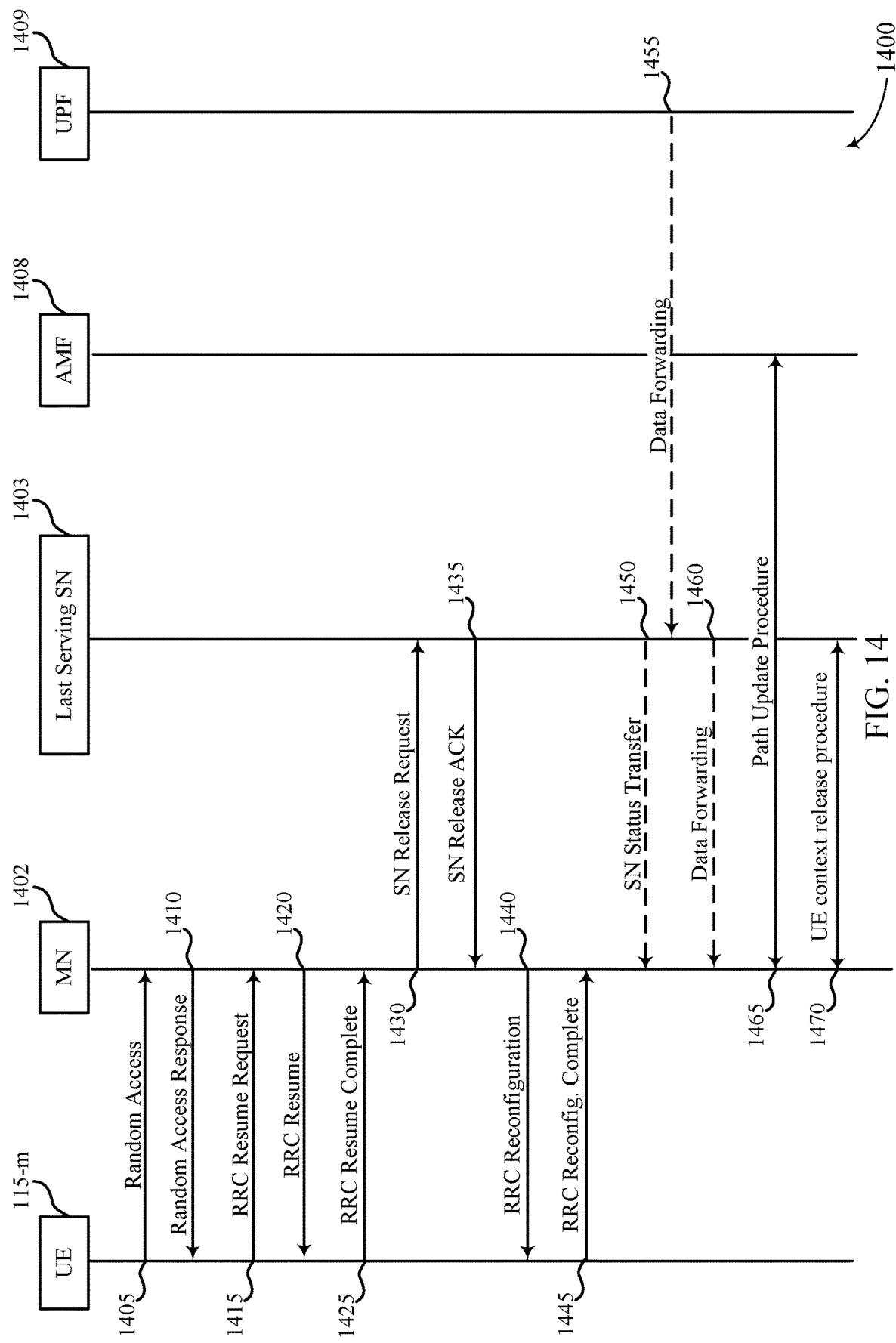

FIG. 14 illustrates an example of a process flow 1400 in a system that supports measurement-based DC and CA activation in accordance with aspects of the present disclosure. In some examples, process flow 1400 may implement aspects of wireless communications system 100. For example, process flow 1400 includes UE 115-M, which may be an example of a UE 115 described with reference to FIGS. 1 through 13. Further, process flow 1400 includes an MN 1402 and a previously serving SN 1403, each of which may be configured for operation in a DC deployment with UE 115-*m*. MN 1402 and previously serving SN 1403 may each be examples of a base station 105 as described with reference to FIGS. 1 and 2. Process flow 1400 may also include an AMF 1408 and UPF 1409 associated with a core network. Process flow 1400 may illustrate the use of saved lower-layer configurations when UE 115-*m* resumes from an RRC inactive state, where UE 115-*m* may resume in a previously serving MN (e.g., MN 1402). Additionally, process flow 1400 may illustrate the release of an SN in the DC deployment, which may be based on a lack of measurements obtained by UE 115-*m*.

In some cases, UE 115-*m* may operate in an RRC inactive state. Prior to transitioning into the RRC inactive state, UE 115-*m* may have communicated with a network in a DC deployment with MN 1402 and previously serving SN 1403. As described herein, UE 115-*m* and the network (e.g., MN 1402 and previously serving SN 1403) may save a UE context and higher-layer MCG/SCG configurations when UE 115-*m* transitions into the RRC inactive state. Additionally, UE 115-*m* and the network may save lower-layer MCG/SCG configurations when UE 115-*m* transitions into the RRC inactive state.

UE 115-*m* may perform one or more cell measurements while in the RRC inactive state. For example, UE 115-*m* may be mobile (e.g., moving through different geographic regions or areas) while in the RRC inactive state and may move into or near various cells. In some cases, UE 115-*m* may not be able to generate a measurement report for any cells while in the RRC inactive state. For instance, a signal quality for one or more nodes, including previously serving SN 1403, may not be sufficient for UE 115-*m* to generate a measurement report. In such cases, when UE 115-*m* resumes from the RRC inactive state, UE 115-*m* may indicate that no measurement reports are available, which may indicate to MN 1402 to release the previously serving SN 1403 from the DC deployment.

When UE 115-*m* transitions out of the RRC inactive state, UE 115-*m* may perform a random access procedures (e.g., at 1405 through 1420). In an RRC resume request message at 1415, UE 115-*m* may transmit an indication to MN 1402 that no measurement results are available. Accordingly, at 1420, MN 1202 may transmit an RRC resume message to UE 115-*m* that does not include a request for measurement reporting, based on the indication from UE 115-*m*.

At 1425, UE 115-*m* may transmit an RRC resume complete message to MN 1402 that may not include a measurement report (i.e., if no measurement report is available). Further, if UE 115-*m* resumes in MN 1402 without a measurement report on previously serving SN 1403 (or another node), then an SN release procedure may be triggered. That is, the radio link quality with the previously serving SN 1403 and/or another node may not be adequate for the DC deployment, and communications with UE 115-*m* may resume under a single-connectivity configuration/deployment with MN 1402.

As a result, at 1430, MN 1402 may transmit a message that indicates the SN release request to previously serving SN 1403. The message may optionally include a data forwarding address. At 1435, previously serving SN 1403 may transmit a message including an SN release ACK to MN 1402. At 1440, MN 1402 may transmit a message to UE 115-*m* that includes an RRC reconfiguration message, which may indicate the release of previously serving SN 1403 (e.g., through delta signaling). In some examples, MN 1402 may also indicate any changes in a lower-layer configuration used to communicate with UE 115-*m* via the RRC reconfiguration message at 1440. In other cases, UE 115-*m* and MN 1402 may rely on stored lower-layer configurations (e.g., used before UE 115-*m* operated in the RRC inactive state) for communications. At 1445, UE 115-*m* may respond to MN 1402 with an RRC reconfiguration complete message.

At 1450, previously serving SN 1403 may optionally transmit an SN status transfer message to MN 1402. Additionally or alternatively, any buffered downlink data (e.g., for previously serving SN 1403) may be forwarded to MN 1402, such as triggered by UPF 1409. As an example, at 1455, UPF may transmit a data forwarding indication to previously serving SN 1403, and previously serving SN 1403 may transmit a data forwarding message to MN 1402 at 1460.

In some examples, at 1465, MN 1402 and AMF 1408 may perform a path update procedure. Further, at 1470, MN 1402 and previously serving SN 1403 may perform a UE context release procedure. The described techniques of process flow 1400 may illustrate a DC deployment case in which an MN is unchanged and an SN is released based on measurement reporting by UE 115-*m*. Such techniques may be applicable to other cases, including those not explicitly described herein.

Figure 15:
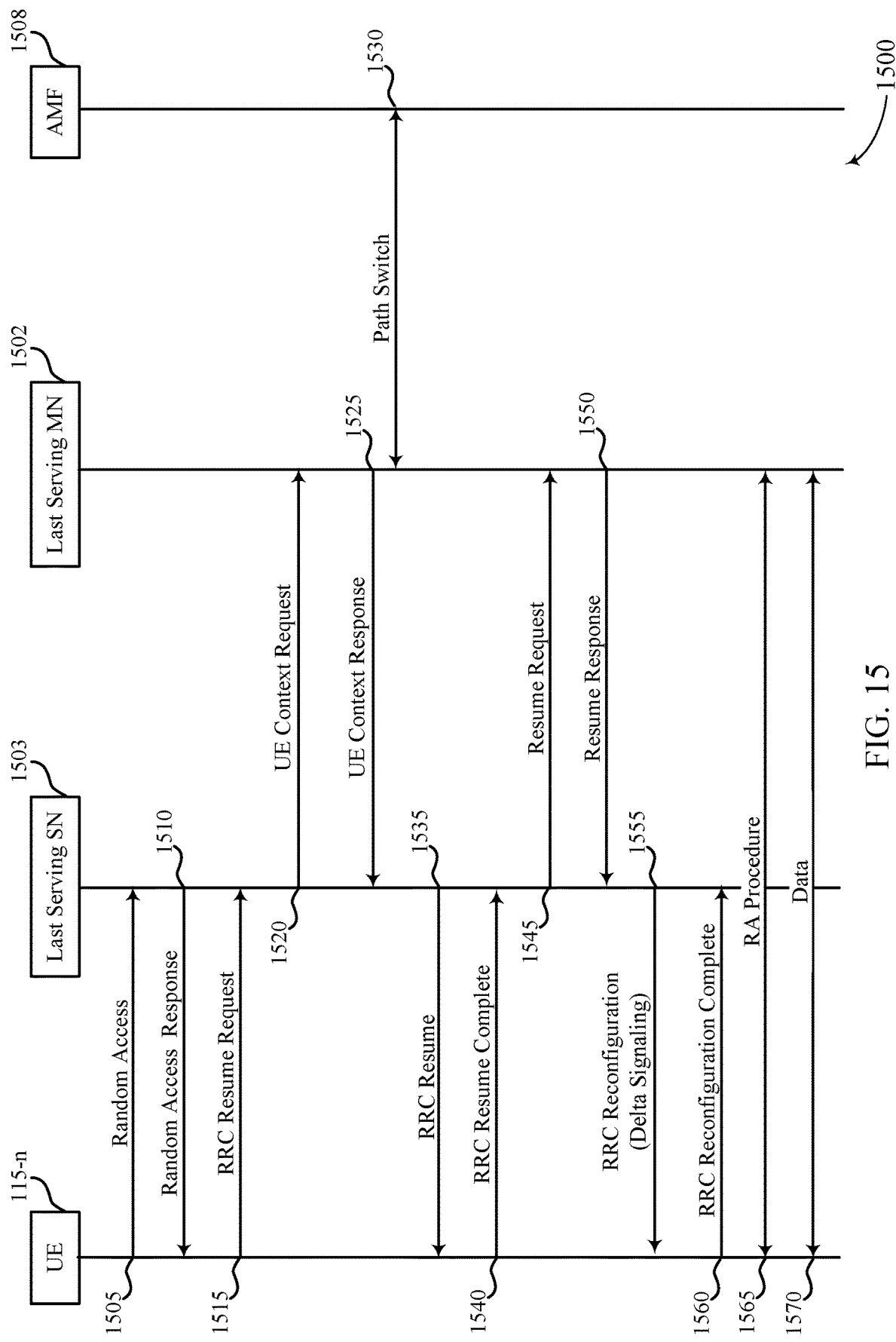

FIG. 15 illustrates an example of a process flow 1500 in a system that supports measurement-based DC and CA activation in accordance with aspects of the present disclosure. In some examples, process flow 1500 may implement aspects of wireless communications system 100. For example, process flow 1500 includes UE 115-*n*, which may be an example of a UE 115 described with reference to FIGS. 1 through 14. Process flow 1500 also includes a previously serving MN 1502 and a previously serving SN 1503 which may be configured for operation in a DC deployment with UE 115-*n* (e.g., prior to UE 115-*n* entering into an inactive communication state). Previously serving MN 1502 and previously serving SN 1503 may each be examples of a base station 105 as described with reference to FIGS. 1 and 2. Process flow 1500 may further include an AMF 1508, where the AMF 1508 may communicate with one or both of previously serving MN 1502 and previously serving SN 1503. Process flow 1500 may illustrate the use of stored lower-layer configurations when UE 115-*n* resumes communications from an RRC inactive state. Additionally, process flow 1500 may illustrate the exchange of an SN and an MN in a DC deployment based on measurements of the MN.

In process flow 1500, UE 115-*n* may initially operate in a DC configuration with previously serving MN 1502 providing an MCG (e.g., including a first cell) and previously serving SN 1503 providing an SCG (e.g., including a second cell). UE 115-*n* may transition into the RRC inactive state (e.g., from an RRC connected state) based on the received signaling from previously serving MN 1502. In some cases, UE 115-*n*, may perform one or more measurements of nearby cells after entering the RRC inactive state. For example, UE 115-*n* may perform measurements of previously serving MN 1502 (e.g., downlink received signal strength measurements, carrier-to-interference ratio measurements, etc.), which may be based on measurement configurations received from previously serving MN 1502 or previously serving SN 1503 prior to transitioning to RRC inactive.

As described herein, UE 115-*n*, previously serving MN 1502, and previously serving SN 1503 may store a set of lower-layer configurations. For instance, UE 115-*n* and the network may store the lower-laver MCG configuration (e.g., associated with previously serving MN 1502) and the lower-layer SCG configuration (e.g., associated with previously serving SN 1503). The storage of the lower-layer configurations may enable UE 115-*n* to resume from the RRC inactive state with reduced signaling overhead (e.g., as compared to when the lower-layer configurations are released). In such cases, a full configuration of previously serving MN 1502, previously serving SN 1503, or both, may be obtained from stored lower-layer configurations and delta signaling (e.g., indicating changes to the stored lower-layer configurations, if any) when UE 115-*n* resumes communications with one of the nodes of the previously-established DC deployment.

UE 115-*n* may resume communications with at least one of previously serving MN 1502 or previously serving SN 1503. In some cases, UE 115-*n* UE 115-*n* may determine to resume communications with previously serving SN 1503 (e.g., instead of previously serving MN 1502). In such cases, UE 115-*n* may perform a random access procedure, for example, transmitting a random access message (e.g., including a RACH preamble) to previously serving SN 1503 at 1505 and receiving a random access response from previously serving SN 1503 at 1510. Additionally, UE 115-*n* may transmit an RRC resume request to previously serving SN 1503 at 1515. That is, UE 115-*n* may send a resume request message to the node that last served as an SN in a DC configuration prior to UE 115-*n* operating in the RRC inactive state, while the previously serving MN 1502 may remain suspended. In such cases, the RRC resume request may indicate whether measurement reports are available at UE 115-*n*. Here, UE 115-*n* may indicate that the measurement report for previously serving MN 1502 is available. The RRC resume request message may include information such as a resume-identity, a cause-value, a resumeMAC-I, or the like. In some examples, the ResumeMAC-I may be protected with a master key. In some cases, according to the resume-identity, previously serving SN 1503 may determine that UE 115-*n* was configured with DC (e.g., MR-DC).

After receiving the indication of the available measurement report for previously serving MN 1502 previously serving SN 1503 may transmit a context request to previously serving MN 1502 at 1520. The context request may include an indication for the MN and SN to exchange roles. For instance, based on UE 115-*n* resuming communications in previously serving SN 1503, previously serving MN 1502 and previously serving SN 1503 may exchange roles in the DC deployment. In some examples, the context retrieval request at 1520 may be security protected with an updated key from an SRB (e.g., SRB1) of previously serving SN 1503 (e.g., operating as a currently serving MN after UE 115-*n* move out of the RRC inactive state). At 1525, previously serving MN 1502 may respond with a configuration for the MN/SN exchange. If UE 115-*n* is verified successfully, previously serving MN 1502 may accept the exchange of the MN and SN. In such cases, previously serving MN 1502 may remain suspended until receiving a measurement report (e.g., from UE 115-*n* via previously serving SN 1503). In some examples, one or both of the context request (at 1520) and the context response (at 1525) may be transmitted over an Xn interface between previously serving MN 1502 and previously serving SN 1503. In some cases AMF 15015 may transmit an indication of a path switch based on the exchange of the MN and the SN at 1530.

At 1535, previously serving SN 1503 may transmit an RRC resume message (e.g., Msg4 of the random access procedure) to UE 115-*n*. The RRC resume message may include the indication of the exchange of the SN and the MN in the DC deployment. Further, the RRC resume message may include a request for the measurement report(s) that UE 115-*n* indicated were available in the RRC resume request message received at previously serving SN 1503. At 1540, UE 115-*n* may transmit an RRC resume complete message (e.g., a random access acknowledgment) that includes the request measurement report(s) for previously serving MN 1502.

At 1545 and 1550, previously serving SN 1503 may activate previously serving MN 1502 (e.g., as a currently-serving SN). For example, previously serving SN 1503 may initialize an SN modification procedure based on the received measurement reporting from UE 115-*n*. As such previously serving SN 1503 may transmit a resume request to previously serving MN 1502 at 1545, for example, on an Xn interface between previously serving MN 1502 and previously serving SN 1503. In some cases, the request message may include an indication of the measurement report received from UE 115-*n*, which may enable previously serving MN 1502 to resume communications with UE 115-*n* as the currently serving SN. In response, previously serving MN 1502 may transmit a resume response to previously serving SN 1503 at 1550 via the Xn interface. In some cases, previously serving MN 1502 may provide an indication of the stored lower-layer MCG configuration that used before UE 115-*n* entered the RRC inactive state.

At 1555, previously serving SN 1503 may transmit an RRC reconfiguration message to UE 115-*n* that includes an indication of delta signaling of the lower-layer MCG configuration, the lower-layer SCG configuration, or a combination thereof. UE 115-*n* may use the delta signaling for configuration of the lower-layer MCG/SCG based on a UE context received from previously serving MN 1502. In some cases, the delta signaling may comprise a difference between the stored lower-layer MCG configuration and a current lower-layer MCG configuration (e.g., where previously serving SN 1503 is currently associated with a current MCG). Additionally or alternatively, the delta signaling may comprise a difference between the stored lower-layer SCG configuration and a current lower-layer SCG configuration that is based on the measurements of previously serving MN 1502. In such cases, the differences indicated by the delta signaling may include a change in one or more parameters of a current lower-layer configuration as compared to the stored lower-layer configuration.

At 1560, UE 115-*n* may transmit an RRC reconfiguration complete message to previously serving SN 1503 and may resume communications with previously serving MN 1502. For example, at 1565 and 1570, UE 115-*n* may perform a random access procedure (e.g., including the transmission of a PRACH preamble and subsequent exchange of messaging) with previously serving MN 1502 and may subsequently exchange data (e.g., uplink and downlink data) with previously serving MN 1502. Thus, the described techniques of process flow 1500 may illustrate a case in a DC deployment where an MN and an SN are exchanged based on early measurement reporting by UE 115-*n*. Such techniques may be applicable to other scenarios, including those not explicitly described herein.

Figure 16:
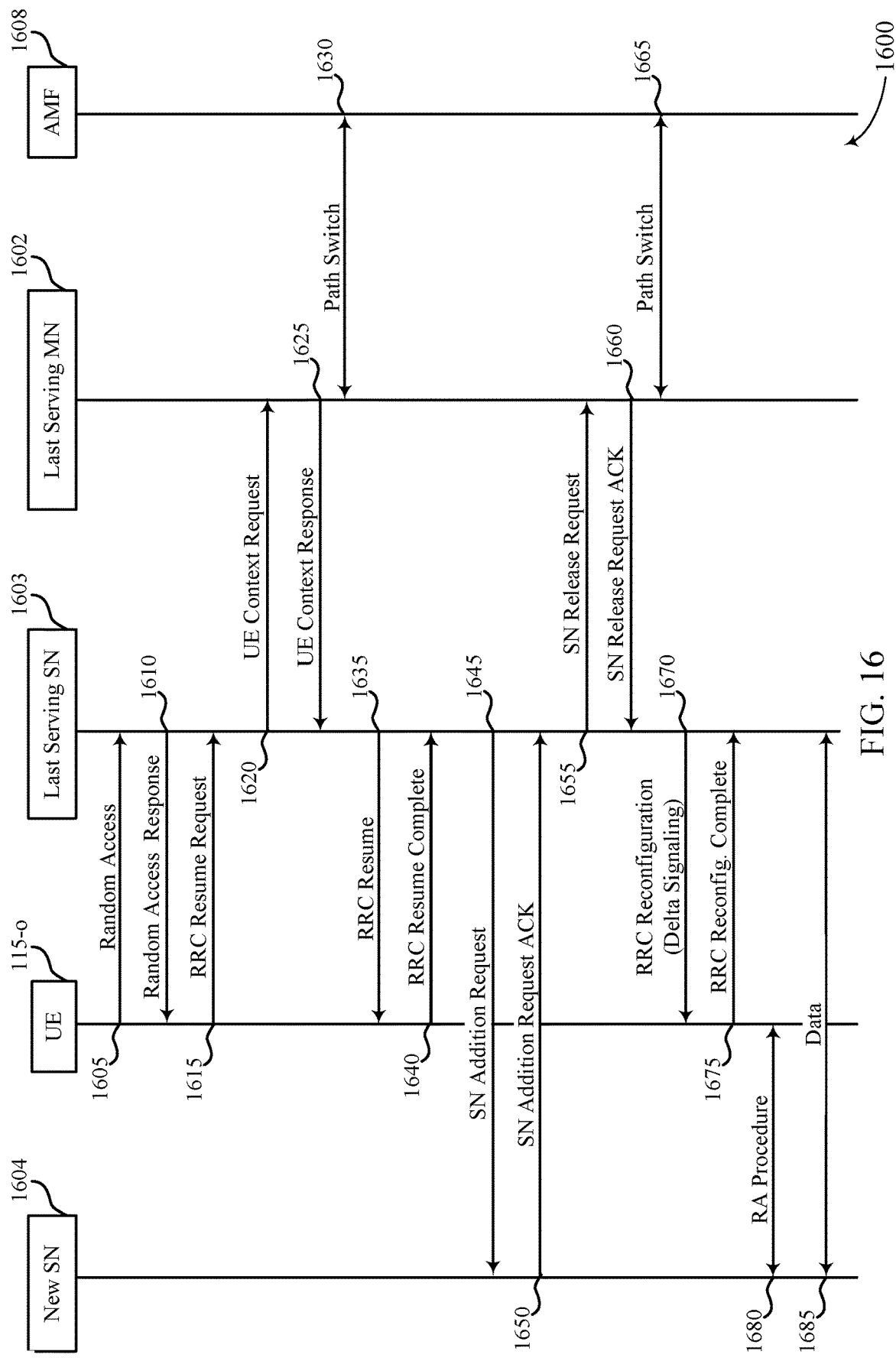

FIG. 16 illustrates an example of a process flow 1600 in a system that supports measurement-based DC and CA activation in accordance with aspects of the present disclosure. In some examples, process flow 1600 may implement aspects of wireless communications system 100. For example, process flow 1600 includes UE 115-*o*, which may be an example of a UE 115 described with reference to FIGS. 1 through 15. Process flow 1600 also includes a previously serving MN 1602 and a previously serving SN 1603 which may be configured for operation in a DC deployment with UE 115-*o* (e.g., prior to UE 115-*o* entering into an inactive communication state). Further, process flow 1600 may include a target node 1604. Previously serving MN 1602, previously serving SN 1603, and target node 1604 may each be examples of a base station 105 as described with reference to FIGS. 1 and 2. Process flow 1600 may further include an AMF 1608, where the AMF 1608 may communicate with one or both of previously serving MN 1602 and previously serving SN 1603. Process flow 1600 may illustrate the use of stored lower-layer configurations when UE 115-*o* resumes communications from an RRC inactive state. Additionally, process flow 1600 may illustrate the exchange of an SN and an MN in a DC deployment based on measurements of an additional node.

In process flow 1600, UE 115-*o* may initially operate in a DC configuration with previously serving MN 1602 providing an MCG (e.g., including a first cell) and previously serving SN 1603 providing an SCG (e.g., including a second cell). UE 115-*o* may transition into the RRC inactive state (e.g., from an RRC connected state) based on received signaling from previously serving MN 1602. In some cases, UE 115-*o*, may perform one or more measurements of nearby cells after entering the RRC inactive state. Additionally, UE 115-*o* may be mobile and may be in or near another cell provided by a node that is different from previously serving MN 1602 and previously serving SN 1603. In such cases, UE 115-*o* may perform measurements (e.g., downlink received signal strength measurements, carrier-to-interference ratio measurements, etc.) of target node 1604, which may be based on measurement configurations received from previously serving MN 1602 or previously serving SN 1603 prior to transitioning to RRC inactive.

Upon UE 115-*o* performing a state transition into the RRC inactive state, UE 115-*o*, previously serving MN 1602, and previously serving SN 1603 may store lower-layer MCG configuration (e.g., associated with previously serving MN 1602) and the lower-layer SCG configuration (e.g., associated with previously serving SN 1603). The storage of the lower-layer configurations may enable UE 115-*o* to resume from the RRC inactive state with reduced signaling overhead (e.g., as compared to when the lower-layer configurations are released).

UE 115-*o* may determine to resume communications with at least one of previously serving MN 1602 or previously serving SN 1603. As mentioned above, UE 115-*o* may have moved since transitioning into the RRC inactive state, and UE 115-*o* may resume communications with previously serving SN 1603 based on the location of UE 115-*o*. In such cases, UE 115-*o* may perform a random access procedure by transmitting a random access preamble (e.g., Msg1) to previously serving SN 1603 at 1605 and receiving a random access response (e.g., Msg2) from previously serving SN 1603 at 1610. Additionally, at 1615, UE 115-*o* may transmit an RRC resume request (e.g., Msg3) to previously serving SN 1603. In other words, UE 115-*o* may send a resume request message to the node that last served as an SN in a DC configuration prior to UE 115-*o* operating in the RRC inactive state, while suspending the previously serving MN 1602. In such cases, the RRC resume request may indicate whether measurement reports are available at UE 115-*o*. For example, UE 115-*o* may indicate the measurement report for target node 1604 is available. The availability of the measurement report for target node 1604 may signal to the network that target node 1604 may serve as a new SN in the DC deployment.

As a result, after receiving the indication of the available measurement report for target node 1604, previously serving SN 1603 may transmit a context request to previously serving MN 1602 at 1620. Is discussed with reference to FIG. 15, the context request may include an indication that previously serving MN 1602 and previously serving SN 1603 may exchange roles in the DC deployment.

At 1625, previously serving MN 1602 may respond with a configuration for the MN/SN exchange. If UE 115-*o* is verified successfully, previously serving MN 1602 may accept the exchange of the MN and SN. In some cases, at 1630, AMF 1608 may perform a path switch with previously serving MN 1602 based on the exchange of the MN and the SN.

At 1635, previously serving SN 1603 may transmit an RRC resume message (e.g., Msg4) to UE 115-*o*. The RRC resume message may include the indication of the exchange of the SN and the MN in the DC deployment. Further, the RRC resume message may include a request for the measurement report(s) that UE 115-*o* indicated were available in the RRC resume request message received at previously serving SN 1603. UE 115-*o* may then transmit, at 1640, an RRC resume complete message (e.g., a random access acknowledgment) that includes the request measurement report(s) for target node 1604.

At 1645 and 1650, previously serving SN 1603 may activate target node 1604 (e.g., as a currently serving SN). For example, previously serving SN 1603 may initialize an SN addition procedure based on the received measurement reporting for target node 1604 from UE 115-*o*. As a result, at 1645, previously serving SN 1603 may transmit an addition request to target node 1604. The addition request may include an indication of the SCG configuration stored at previously serving SN 1603. Further, at 1650, target node 1604 may transmit an addition request ACK to previously serving SN 1603.

Previously serving SN 1603 may initiate the release of previously serving MN 1602 from the DC deployment based on the addition request (and the measurement report for target node 1604). In such cases, previously serving SN 1603 may transmit an SN release request to previously serving MN 1602 at 1655. At 1660, previously serving MN 1602 may respond with a transmission of an ACK for the release request. In some examples, AMF 1608 may perform a path switch for previously serving MN 1602 based on the addition of target node 1604 and release of previously serving MN 1602.

At 1670, previously serving SN 1603 may transmit an RRC reconfiguration message to UE 115-*o* that includes an indication of delta signaling of the lower-layer MCG configuration, the lower-layer SCG configuration, or a combination thereof. UE 115-*o* may use the delta signaling for the configuration of the lower-layer MCG/SCG based on a UE context received from previously serving MN 1602. In some cases, the delta signaling may be similar to the delta signaling described with respect to FIG. 15. For example, the differences indicated by the delta signaling may include a change in one or more parameters of lower-layer configurations as compared to the stored lower-layer configuration at UE 115-*o*.

At 1675, UE 115-*o* may transmit an RRC reconfiguration complete message to previously serving SN 1603 and may subsequently initiate communications with target node 1604. For example, at 1680 and 1685, UE 115-*o* may perform a random access procedure with target node 1604 and may subsequently exchange data (e.g., uplink and downlink data) with target node 1604. Thus, the described techniques of process flow 1600 may illustrate a case in a DC deployment where an MN and an SN are exchanged and an additional node operates as an updated SN (e.g., due to UE mobility) based on early measurement reporting by UE 115-*o*. Such techniques may be applicable in other examples, including those not explicitly described herein.

Figure 17:
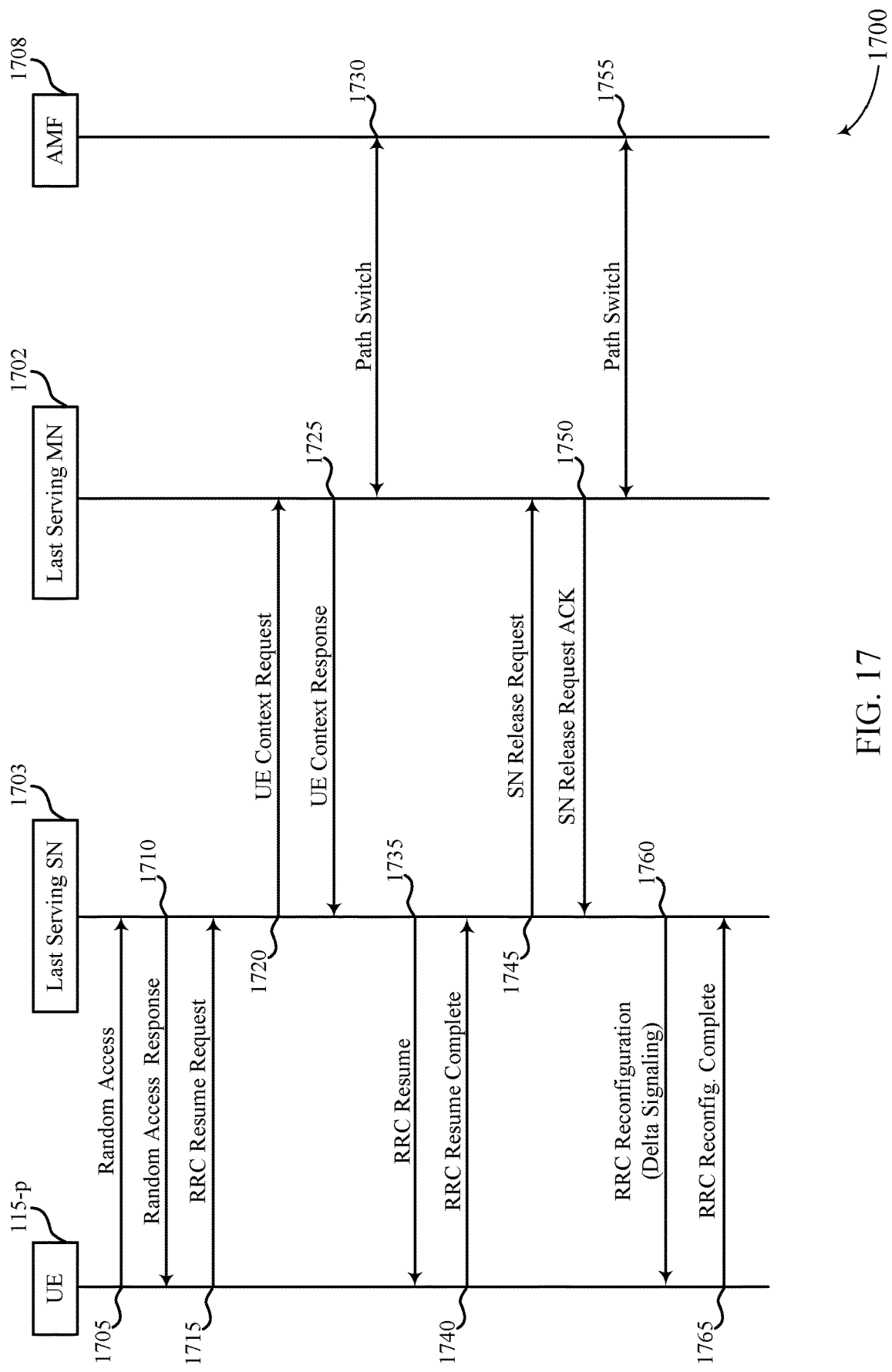

FIG. 17 illustrates an example of a process flow 1700 in a system that supports measurement-based DC and CA activation in accordance with aspects of the present disclosure. In some examples, process flow 1700 may implement aspects of wireless communications system 100. For example, process flow 1700 includes UE 115-*p*, which may be an example of a UE 115 described with reference to FIGS. 1 through 16. Process flow 1700 also includes a previously serving MN 1702 and a previously serving SN 1703 which may be configured for operation in a DC deployment with UE 115-*p* (e.g., prior to UE 115-*p* entering into an inactive communication state). Previously serving MN 1702 and previously serving SN 1703 may each be examples of a base station 105 as described with reference to FIGS. 1 and 2. Process flow 1700 may further include an AMF 1708, where the AMF 1708 may communicate with one or both of previously serving MN 1702 and previously serving SN 1703. Process flow 1700 may illustrate the use of stored lower-layer configurations when UE 115-*p* resumes communications from an RRC inactive state. Additionally, process flow 1700 may illustrate the exchange of an SN and an MN in a DC deployment based on measurements of the MN.

In process flow 1700, UE 115-p may operate in a DC configuration with previously serving MN 1702 providing an MCG (e.g., including a first cell) and previously serving SN 1703 providing an SCG (e.g., including a second cell). UE 115-p may transition into the RRC inactive state (e.g., from an RRC connected state), for example, based on signaling (e.g., an RRC release message) received from previously serving MN 1702. In some cases, at 1710, UE 115-p, may perform one or more measurements of nearby cells after entering the RRC inactive state. However, in some examples, UE 115-p may have insufficient measurements to generate a measurement report for cells. For instance, a signal quality for one or more nodes, including previously serving MN 1702, may be insufficient for UE 115-p to generate a measurement report. In such cases, when UE 115-p resumes from the RRC inactive state, UE 115-p may resume communications with previously serving SN 1703 and indicate that no measurement reports are available. In such cases, the lack of measurement reporting for other nodes, such as previously serving MN 1702, may indicate to previously serving SN 1703 to release previously serving MN 1702 from the DC deployment.

In some cases, UE 115-p may transition to the RRC inactive state, and UE 115-p, previously serving MN 1702, and previously serving SN 1703 may store lower-layer MCG configuration (e.g., associated with previously serving MN 1702) and the lower-layer SCG configuration (e.g., associated with previously serving SN 1703). The storage of the lower-layer configurations may enable UE 115-p to resume from the RRC inactive state with reduced signaling overhead (e.g., as compared to when the lower-layer configurations are released).

UE 115-p may determine to resume communications with at least one of previously serving MN 1702 or previously serving SN 1703. For example, and as mentioned above, UE 115-p may resume communications with previously serving SN 1703. In such cases, UE 115-p may perform a random access procedure, for example, transmitting, at 1705, a random access message (e.g., Msg1) including a PRACH preamble to previously serving SN 1703 and receiving, at 1710, a random access response (e.g., Msg2) from previously serving SN 1703. Additionally, at 1715, UE 115-p may transmit an RRC resume request (e.g., Msg3) to previously serving SN 1703, suspending previously serving MN 1702. The RRC resume request from UE 115-p may indicate whether measurement reports are available at UE 115-p. As such UE 115-p may indicate that there are no measurement reports available. The unavailability of the measurement reports may signal to the network that UE 115-p may resume communications using single connectivity (e.g., instead of DC).

In such cases, after receiving the indication of the unavailable measurement reporting, previously serving SN 1703 may transmit a context request to previously serving MN 1702 at 1720. The context request may include an indication that previously serving MN 1702 and previously serving SN 1703 may exchange roles based on the absence of measurement reporting. At 1725, previously serving MN 1702 may respond with a configuration for the MN/SN exchange. At 1730, AMF 1708 may perform a path switch for previously serving MN 1702 based on the exchange of the MN and the SN.

At 1735, previously serving SN 1703 may transmit an RRC resume message (e.g., Msg4) to UE 115-p. The RRC resume message may indicate the exchange of the MN and the SN to UE 115-p. Further, the RRC resume message may not include a request for the measurement report(s) based on the indication from UE 115-p at 1715 that measurement reports for other cells are unavailable. At 1740, UE 115-p may transmit an RRC resume complete message (e.g., a random access acknowledgment) to previously serving SN 1703.

At 1745 and 1750, previously serving SN 1703 may initiate the release of previously serving MN 1702 (which may be suspended since UE 115-p entered the RRC inactive state) from the DC deployment based on the unavailability of the measurements. In such cases, at 1755, previously serving SN 1703 may transmit an SN release request to previously serving MN 1702. In response, at 1760, previously serving MN 1702 may transmit an ACK of the release request. In some examples, AMF 1708 may perform a path switch for previously serving MN 1702 based on the release of previously serving MN 1702.

At 1770, previously serving SN 1703 may transmit an RRC reconfiguration message to UE 115-p that includes an indication of signaling of the lower-layer MCG configuration, the lower-layer SCG configuration, or a combination thereof. In some cases, the lower-layer MCG configuration may be based on the lower-layer SCG configuration stored by previously serving SN 1703. At 1775, UE 115-p may transmit an RRC reconfiguration ACK to previously serving SN 1703. UE 115-p and previously serving SN 1703 may communicate data (e.g., uplink and downlink data) in a single connectivity configuration. Thus, the described techniques of process flow 1700 may illustrate a case in a DC deployment where an MN and an SN are exchanged, and the former MN is released based on an unavailability of early measurement reporting by UE 115-p. Such techniques may be applicable in other examples, including those not explicitly described herein.

Figure 18:
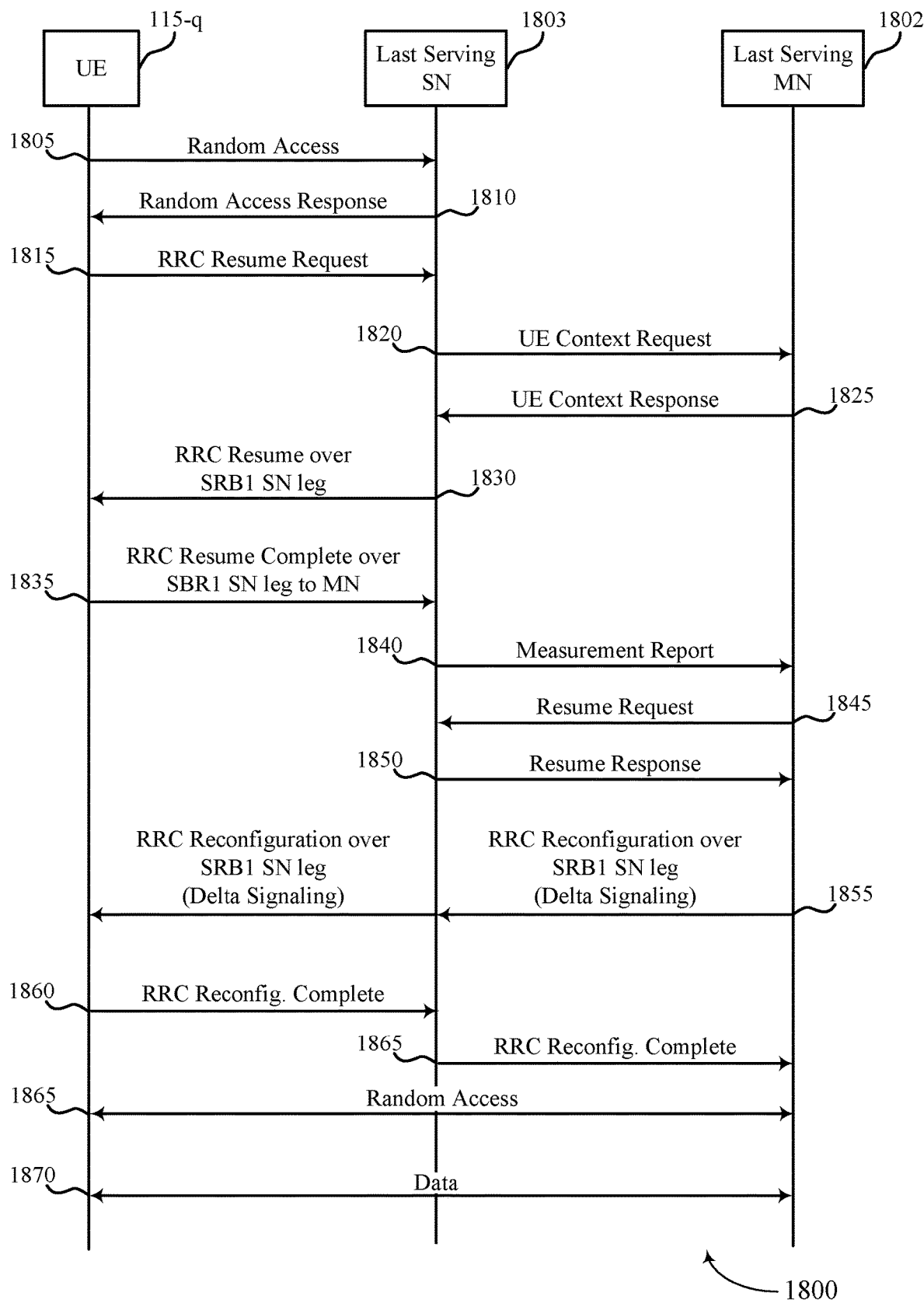

FIG. 18 illustrates an example of a process flow 1800 in a system that supports measurement-based DC and CA activation in accordance with aspects of the present disclosure. In some examples, process flow 1800 may implement aspects of wireless communications system 100. For example, process flow 1800 includes UE 115-q, which may be an example of a UE 185 described with reference to FIGS. 1 through 17. Process flow 1800 also includes a previously serving MN 1802 and a previously serving SN 1803 which may be configured for operation in a DC deployment with UE 115-q (e.g., prior to UE 115-q entering into an inactive communication state). Previously serving MN 1802 and previously serving SN 1803 may each be examples of a base station 105 as described with reference to FIGS. 1 and 2. Process flow 1800 may illustrate the use of stored lower-layer configurations when UE 115-q resumes communications from an RRC inactive state. Additionally, process flow 1800 may illustrate signaling using a split radio bearer configuration and the resumption of communications with a same MN and SN by UE 115-q.

In some cases, UE 115-q may operate using a split bearer configuration. For instance, SRBs of UE 115-q (e.g., SRB1/SRB2) may have been configured as split bearers prior to UE 115-q transitioning into the RRC inactive state. In such cases, the MN (e.g., previously serving MN 1802) may send downlink messages to UE 115-q via lower-layers (e.g., RLC, MAC, PHY, etc.) of the MN, the SN, or both. In the uplink, the SN (e.g., previously serving SN 1803) may transmit RRC messages from UE 115-q to the MN using the split bearer (e.g., via a "leg" associated with the SN). In such cases, UE 115-*q* may transmit messages (e.g., RRC signaling) to previously serving MN 1802 via previously serving SN 1803. As a result, and as described in further detail below, previously serving MN 1802 and previously serving SN 1803 may not change roles.

In some cases, UE 115-*q* may initially operate in a DC configuration with previously serving MN 1802 providing an MCG (e.g., including a first cell) and previously serving SN 1803 providing an SCG (e.g., including a second cell). UE 115-*q* may later transition into the RRC inactive state (e.g., from an RRC connected state) based on a level of communication with the network. In some cases, UE 115-*q*, may perform one or more measurements of nearby cells after entering the RRC inactive state. For example, UE 115-*q* may perform measurements of both previously serving MN 1802 (e.g., downlink received signal strength measurements, carrier-to-interference ratio measurements, etc.) and previously serving SN 1803, which may be based on measurement configurations received from previously serving MN 1802 or previously serving SN 1803 prior to transitioning to RRC inactive. As such, UE 115-*q* may generate corresponding measurement reports for the measurements performed.

In some examples, UE 115-*q*, previously serving MN 1802, and previously serving SN 1803 may store a set of lower-layer configurations when UE 115-*q* transitions to the RRC inactive state. For instance, UE 115-*q* and the network may store the lower-layer MCG configuration (e.g., associated with previously serving MN 1802) and the lower-layer SCG configuration (e.g., associated with previously serving SN 1803). Additionally or alternatively, previously serving SN 1803 may store a resume identity of UE 115-*q*.

UE 115-*q* may determine to resume communications with at least one of previously serving MN 1802 or previously serving SN 1803. In some cases, UE 115-*q* may determine, after exiting the RRC inactive state, to resume communications with previously serving SN 1803 (e.g., instead of previously serving MN 1802). In such cases, UE 115-*q* may perform a random access procedure, where UE 115-*q* may transmit, at 1805, a random access preamble to previously serving SN 1803 and receive, at 1810, a random access response from previously serving SN 1803. In such cases, previously serving MN 1802 may be in a suspended state. At 1815, UE 115-*q* may transmit an RRC resume request to previously serving SN 1803, and the RRC resume request may indicate whether measurement reports are available at UE 115-*q*. Here, UE 115-*q* may indicate that the measurement report for previously serving MN 1802 and previously serving SN 1803 are available. The RRC resume request message may include information such as a resume-identity, a cause-value, a resumeMAC-I, or the like. In some examples, the ResumeMAC-I may be protected with a master key. In some cases, according to the resume-identity, previously serving SN 1803 may determine that UE 115-*q* was configured with DC (e.g., MR-DC). In some examples, UE 115-*q* may expect to receive a response to the RRC resume request via an SN leg of an SRB (e.g., SRB1), which may be based on the split bearer configuration.

After receiving the indication of the available measurement report for previously serving MN 1802 and for previously serving SN 1803, at 1820, previously serving SN 1803 may transmit a context request to previously serving MN 1802. The context request may include an SN resumption configuration. At 1825, previously serving MN 1802 may respond with a configuration for the MN/SN resumption. If UE 115-*q* is verified successfully, previously serving MN 1802 may send an RRC resume message (e.g., Msg4) over the SN leg of SRB1. More specifically, at 1825, previously serving MN 1802 may transmit a context response that includes an RRC container over a leg of SRB1 that is associated with previously serving SN 1803. At 1830, the message may be routed through the lower-layers of previously serving SN 1803 in accordance with the split bearer configuration to UE 115-*q*. As a result, an SN configuration of the DC deployment may resume after the transmission of the RRC resume message at 1830.

In some aspects, previously serving MN 1802 may activate upon receipt of the available measurement report from UE 115-*q*. For example, previously serving MN 1802 may remain suspended until receiving a measurement report. As such, UE 115-*q* may transmit an RRC resume complete message to previously serving MN 1802. Thus, at 1840, the RRC resume complete message sent to previously serving MN 1802 may include the measurement report for previously serving MN 1802 and may be transmitted from UE 115-*q* via the leg of SRB1 that is associated with previously serving SN 1803. Upon receiving the measurement report at 1840, previously serving MN 1802 may transmit a resume request at 1845 to previously serving SN 1803. In response, at 1850, previously serving SN 1803 may transmit a resume response to previously serving MN 1802, for example, over an Xn interface between previously serving MN 1802 and previously serving SN 1803. In some cases, due to the established split bearer configuration, the DC deployment may not utilize a path switch.

At 1855, previously serving MN 1802 may transmit an RRC reconfiguration message to UE 115-*q* over the SN leg of the SRB. The RRC reconfiguration message may include delta signaling for the lower-layer MCG configuration, the lower-layer SCG configuration, or a combination thereof. In some cases, the delta signaling may be similar to the delta signaling described with respect to FIGS. 15 and 16.

At 1860, UE 115-*q* may transmit an RRC reconfiguration complete message to previously serving SN 1803, which may transmit the message to previously serving MN 1802. The RRC reconfiguration complete message may serve as an ACK to previously serving MN 1802 that DC configurations have been re-established using the delta signaling provided at 1855, where the delta signaling may serve to minimize signaling overhead in the system.

Communications may resume with previously serving MN 1802. For example, at 1865 and 1870, UE 115-*q* may perform a random access procedure with previously serving MN 1802 and subsequently exchange data (e.g., uplink and downlink data) with previously serving MN 1802. Thus, the described techniques of process flow 1800 may illustrate a case where, in a DC deployment, an MN and an SN remain the same based on early measurement reporting by UE 115-*q* and a split bearer configuration. That is, there may not be an exchange of MN and SN after a UE 115 resumes from an inactive communication state. Such techniques may be applicable to other scenarios, including those not explicitly described herein.

Figure 19:
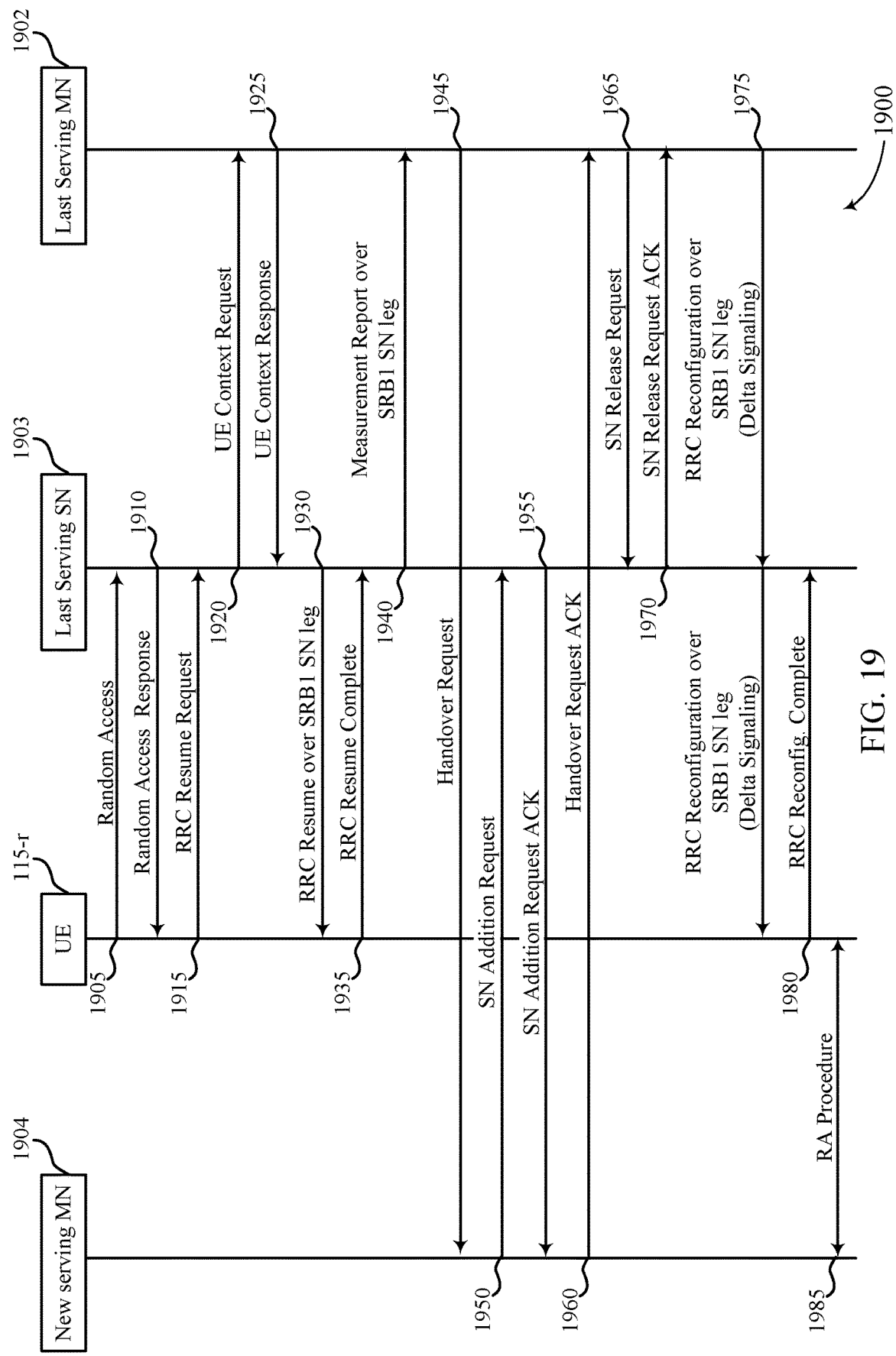

FIG. 19 illustrates an example of a process flow 1900 in a system that supports measurement-based DC and CA activation in accordance with aspects of the present disclosure. In some examples, process flow 1900 may implement aspects of wireless communications system 100. For example, process flow 1900 includes UE 115-*r*, which may be an example of a UE 115 described with reference to FIGS. 1 through 18. Process flow 1900 also includes a previously serving MN 1902 and a previously serving SN 1903 which may be configured for operation in a DC deployment with UE 115-*r* (e.g., prior to UE 115-*r* entering into an inactive communication state). In some cases, process flow 1900 may include a target MN 1904. Previously serving MN 1902, previously serving SN 1903, and target MN 1904 may each be examples of a base station 105 as described with reference to FIGS. 1 and 2. Process flow 1900 may illustrate the use of stored lower-layer configurations when UE 115-*r* resumes communications from an RRC inactive state. Additionally, process flow 1900 may illustrate signaling using a split radio bearer configuration and the resumption of communications with an updated MN.

In some cases, UE 115-*r* may operate using a split bearer configuration. For instance, SRBs of UE 115-*r* (e.g., SRB1/SRB2) and an MN terminated DRB may have been configured as split bearers prior to UE 115-*r* transitioning into the RRC inactive state. Additionally, UE 115-*r* may initially operate in a DC configuration with previously serving MN 1902 providing an MCG (e.g., including a first cell) and previously serving SN 1903 providing an SCG (e.g., including a second cell). UE 115-*r* may later transition into the RRC inactive state based on a level of communication with the network, for example, to save power. In some cases, UE 115-*r*, may perform one or more measurements of nearby cells after entering the RRC inactive state. For example, UE 115-*r* may perform measurements of one or more additional cells, which may include a cell provided by target MN 1904, which may be based on UE 115-*r* being mobile and moving near the cell of target MN 1904. As such, UE 115-*r* may generate a measurement reports for the measurements for target MN 1904.

In some examples, UE 115-*r*, previously serving MN 1902, and previously serving SN 1903 may store a set of lower-layer configurations when UE 115-*r* transitions to the RRC inactive state. For instance, UE 115-*r* and the network may store the lower-layer MCG configuration (e.g., associated with previously serving MN 1902) and the lower-layer SCG configuration (e.g., associated with previously serving SN 1903). Additionally or alternatively, previously serving SN 1903 may store a resume identity of UE 115-*r*.

UE 115-*r* may determine to resume communications with at least one of previously serving MN 1902 or previously serving SN 1903. In some cases, UE 115-*r* may determine, after exiting the RRC inactive state, to resume communications with previously serving SN 1903 (e.g., instead of previously serving MN 1902). In such cases, UE 115-*r* may perform a random access procedure, where at 1905, UE 115-*r* may transmit a random access preamble (e.g., a PRACH preamble) to previously serving SN 1903 and receive, at 1910, a random access response from previously serving SN 1903. In such cases, previously serving MN 1902 may be in a suspended state.

At 1915, UE 115-*r* may transmit an RRC resume request to previously serving SN 1903, and the RRC resume request may indicate whether measurement reports are available at UE 115-*r*. In some examples, after transmitting the RRC resume request at 1915, UE 115-*r* may expect to receive a response to the RRC resume request via an SN leg of an SRB (e.g., SRB1), which may be based on the split bearer configuration. Additionally, UE 115-*r* may indicate that the measurement report for target MN 1904 is available. In such cases, when UE 115-*r* resumes communications of the DC deployment with previously serving SN 1903, and using a measurement report for target MN 1904, the MN of the DC deployment may change while the SN remains unchanged. For example, the measurement report for target MN 1904 may indicate an improved signal quality provided by target MN 1904 (e.g., as compared to previously serving MN 1902).

After receiving the indication of the available measurement report for target MN 1904, at 1920, previously serving SN 1903 may transmit a context request to previously serving MN 1902. The context request may include an SN resumption configuration. At 1925, previously serving MN 1902 may respond with a configuration for the MN/SN resumption and send an RRC resume message (e.g., Msg4) over an SN leg of SRB1. More specifically, at 1925, previously serving MN 1902 may transmit an RRC resume message over a leg of SRB1 that is associated with previously serving SN 1903. The message may be routed, at 1930, through the lower-layers of previously serving SN 1903 in accordance with the split bearer configuration, and thus received at UE 115-*r*.

In some aspects, a handover of previously serving MN 1902 to target MN 1904 may be triggered upon receipt of the available measurement report for target MN 1940 from UE 115-*r*. As such, at 1940. UE 115-*r* may transmit an RRC resume complete message to previously serving MN 1902, which may include the measurement report for target MN 1904. UE 115-*r* may transmit the RRC resume complete message via the leg of SRB1 associated with previously serving SN 1903. Upon receiving the measurement report at 1940, previously serving MN 1902 may transmit a handover request at 1945 to previously serving SN 1903. The handover request may include the lower-layer MCG configuration that stored by previously serving MN 1902 when UE 115-*r* transitioned into the RRC inactive state. Thus, target MN 1904 may obtain the stored MCG configuration used by previously serving MN 1902.

Further, at 1950, target MN 1904 may transmit, to previously serving SN 1903, an SN addition request. In some examples, the addition request may enable previously serving SN 1903 to resume operating as an SN for UE 115-*r* in the DC deployment. At 1955, previously serving SN 1903 may transmit an ACK of the SN addition request received from target MN 1904. In some examples, at 1960, target MN 1904 may transmit a message including a handover request ACK to previously serving MN 1902.

At 1965, in some examples, previously serving MN 1902 may transmit an SN release request to previously serving SN 1903. At 1970, previously serving SN 1903 may respond with an acknowledgment of the SN release request.

Based on receiving the measurement report for target MN 1904 and the stored lower-layer configuration, previously serving MN 1902 may transmit an RRC reconfiguration message to UE 115-*r* that includes delta signaling for the lower-layer MCG configuration, the lower-layer SCG configuration, or a combination thereof. In some examples, and based on the split bearer configuration, the RRC reconfiguration message may be routed to UE 115-*r* over the SN leg of the SRB. The differences, changes, or additions to the lower-layer configurations indicated by the delta signaling may indicate a modification of one or more parameters of a current lower-layer configuration as compared to the stored lower-layer configurations. Here, target MN 1904 may operate as a currently serving MN associated with the MCG in the DC deployment, where previously serving SN 1903 may continue to operate as the SN associated with the SCG. The delta signaling may accordingly reflect the changes in the current lower-layer configurations with respect to the stored lower-layer configurations.

At 1980, UE 115-*r* may transmit an RRC reconfiguration complete message to previously serving SN 1903. Communications with target MN 1904 may then resume. For example, at 1985, UE 115-r may perform a random access procedure with target MN 1904, and data may be subsequently exchanged (e.g., uplink and downlink data) with target MN 1904. Thus, the described techniques of process flow 1900 may illustrate a case where, in a DC deployment, an MN may change while an SN remains the same based on early measurement reporting by UE 115-r and a split bearer configuration. That is, there may not be an exchange of an SN after a UE 115 resumes from an inactive communication state with an early measurement report for another node/cell. However, such techniques may be applicable to other scenarios, including those not explicitly described herein.

Figure 20:
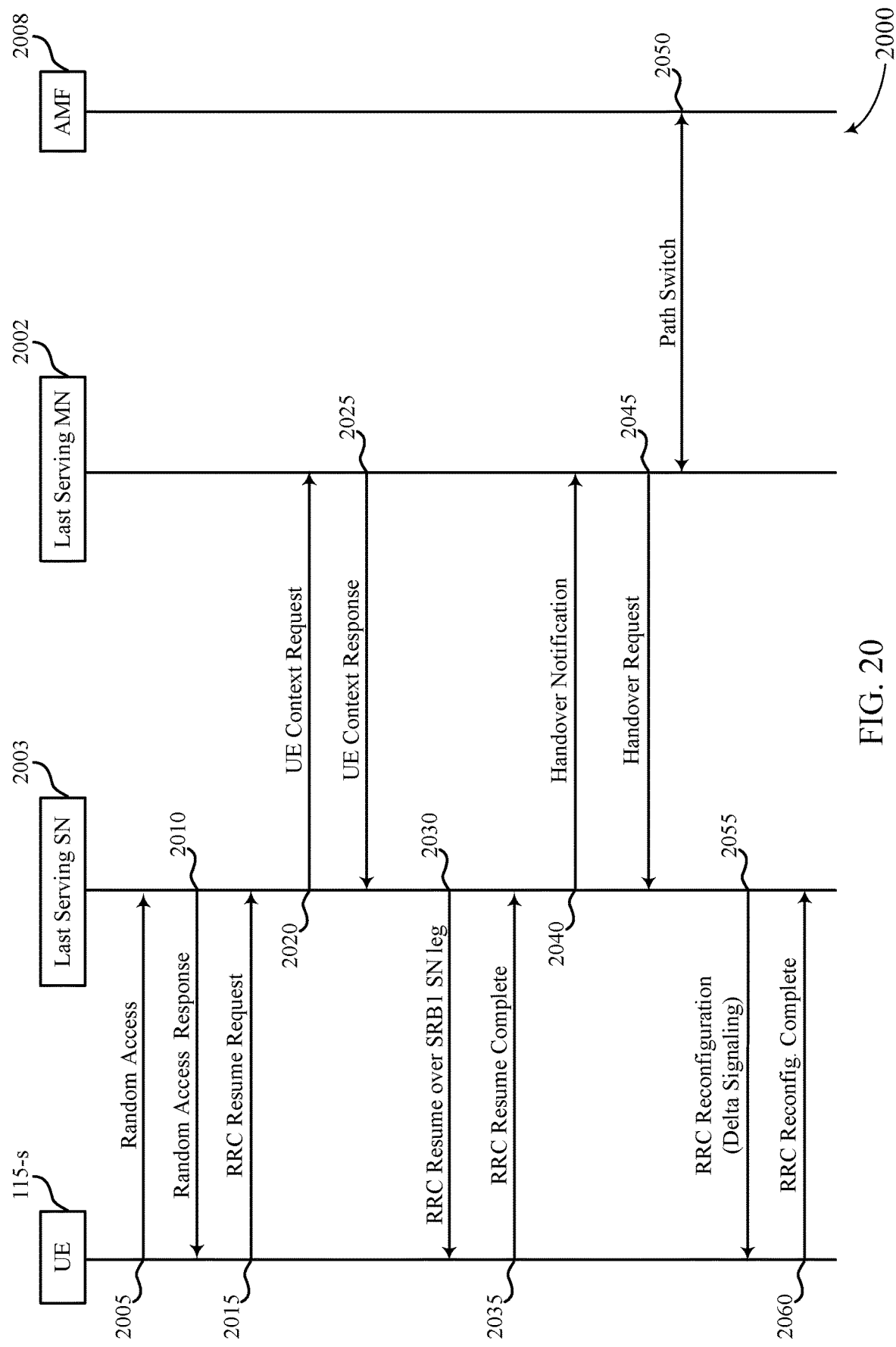

FIG. 20 illustrates an example of a process flow 2000 in a system that supports measurement-based DC and CA activation in accordance with aspects of the present disclosure. In some examples, process flow 2000 may implement aspects of wireless communications system 100. For instance, process flow 2000 includes UE 115-s, which may be an example of a UE 115 described with reference to FIGS. 1 through 19. Process flow 2000 also includes a previously serving MN 2002 and a previously serving SN 2003 which may be configured for operation in a DC deployment with UE 115-s (e.g., prior to UE 115-s entering into an RRC inactive state). Previously serving MN 2002 and previously serving SN 2003 may each be examples of a base station 105 as described with reference to FIGS. 1 and 2. Process flow 2000 may further include an AMF 2008, and AMF 2008 may communicate with one or both of previously serving MN 2002 and previously serving SN 2003. Process flow 2000 may illustrate the use of stored lower-layer configurations when UE 115-s resumes communications from an RRC inactive state. Process flow 2000 may illustrate resumption from the RRC inactive state using single connectivity with an SN.

In some cases, UE 115-s may operate using a split bearer configuration. For instance, SRBs of UE 115-s (e.g., SRB1/SRB2) may have been configured as split bearers prior to UE 115-s transitioning into the RRC inactive state. Additionally, UE 115-s may initially operate in a DC configuration with previously serving MN 2002 providing an MCG (e.g., including a first cell) and previously serving SN 2003 providing an SCG (e.g., including a second cell). UE 115-s may later transition into the RRC inactive state upon receiving messaging from the network.

In some examples, UE 115-s, previously serving MN 2002, and previously serving SN 2003 may store a set of lower-layer configurations when UE 115-s transitions to the RRC inactive state. For instance, UE 115-s and the network may store the lower-layer MCG configuration (e.g., associated with previously serving MN 2002) and the lower-layer SCG configuration (e.g., associated with previously serving SN 2003). Additionally or alternatively, previously serving SN 2003 may store a resume identity of UE 115-s.

UE 115-s may determine to resume communications with at least one of previously serving MN 2002 or previously serving SN 2003. Additionally, UE 115-s may have performed one or more measurements of nearby cells after entering the RRC inactive state. However, in some examples, UE 115-s may not generate a measurement report due to poor signal quality of one or more nodes (e.g., including previously serving MN 2002 and previously serving SN 2003).

As a result, upon transitioning out of the RRC inactive state and after initiating a random access procedure (e.g., transmitting a random access preamble (Msg1) at 2005 and receiving a random access response (Msg2) at 2010), UE 115-s may indicate, at 2015, that no measurement reports are available in an RRC resume request (e.g., Msg3). At 2020, upon receiving the RRC resume request from UE 115-s, previously serving SN 2003 may transmit a context request to previously serving MN 2002. The context request may include an SN resumption configuration. At 2025, previously serving MN 2002 may respond with a configuration for SN resumption, and UE 115-s may receive an RRC resume message (e.g., Msg4) sent over an SN leg of SRB1. For example, at 2025, previously serving MN 2002 may transmit an RRC resume message over a leg of SRB1 that is associated with previously serving SN 2003. At 2030, UE 115-s may receive the message routed through the lower-layers of previously serving SN 2003 in accordance with the split bearer configuration. In some examples, one or both of the context request (at 2020) and the context response (at 2025) may be transmitted over an Xn interface between previously serving MN 2002 and previously serving SN 2003.

At 2035, UE 115-s may transmit an acknowledgment to previously serving SN 2003 in an RRC resume complete message. In such cases, the RRC resume complete message may not include a measurement report based, at least in part, on the signal quality affecting measurements performed by UE 115-s while in the RRC inactive state. At 2040, previously serving SN 2003 may trigger a handover procedure (e.g., a forward handover procedure) by transmitting a handover notification to previously serving MN 2002. Due to the lack of measurement reporting from UE 115-s, previously serving SN may determine to perform a handover at UE 115-s so that UE 115-s may resume communications. Accordingly, the handover notification may indicate that previously serving SN 2003 may continue communicating with UE 115-s based on UE 115-s resuming communications with previously serving SN 2003 after exiting the RRC inactive state. Previously serving MN 2002 may respond at 2045, by transmitting a handover notification to previously serving SN 2003. Based on the handover request, previously serving MN 2002 may be released.

In some examples, at 2050, AMF 2008 may perform a path switch procedure with previously serving MN 2002 based on the completed handover with previously serving SN 2003. At 2055, previously serving SN 2003 may transmit an RRC reconfiguration message to UE 115-s. In some examples, the RRC reconfiguration message may include delta signaling for the lower-layer MCG configuration, the lower-layer SCG configuration, or a combination thereof. In some cases, the RRC reconfiguration message may enable UE 115-s to resume communications with previously serving SN 2003 in a single connectivity configuration. At 2060, after receiving the RRC reconfiguration message, UE 115-s may transmit a message that indicates that the RRC reconfiguration is complete. The described techniques of process flow 2000 may illustrate a case where, in a DC deployment, an MN may be released such that a UE 115 and base station resume communication in a single connectivity configuration after the UE 115 exits an RRC inactive state. However, such techniques may be applicable in other examples, including those not explicitly described herein.

Some aspects of signaling by a UE 115 and/or the various nodes may have been omitted from the above process flows for the sake of brevity and clarity of description. The described features, functions, and signaling of the above process flows may be combined or may be performed in a different order than the order shown.

Figure 21:
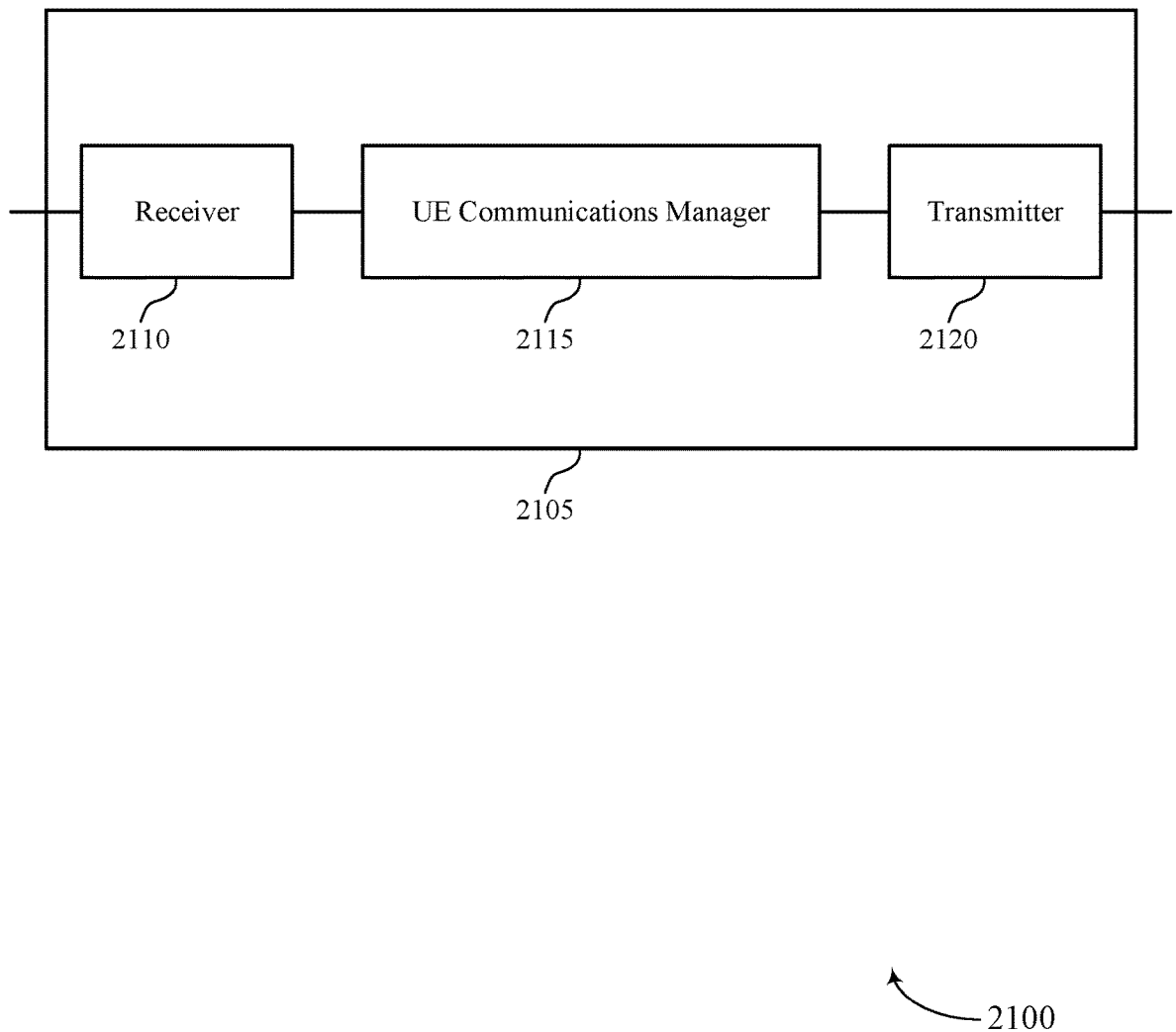
FIGS. 21 and 22 show block diagrams of devices that support SCG configuration in MR-DC in accordance with aspects of the present disclosure.

FIG. 21 shows a block diagram 2100 of a device 2105 that supports SCG configuration in MR-DC in accordance with aspects of the present disclosure. The device 2105 may be an example of aspects of a UE 115 as described herein. The device 2105 may include a receiver 2110, a UE communications manager 2115, and a transmitter 2120. The device 2105 may also include a processor. Each of these components may be in communication with one another (e.g., via one or more buses).

The receiver 2110 may receive information such as packets, user data, or control information associated with various information channels (e.g., control channels, data channels, and information related to blind SCG configuration in MR-DC, etc.). Information may be passed on to other components of the device 2105. The receiver 2110 may be an example of aspects of the transceiver 2420 described with reference to FIG. 24. The receiver 2110 may utilize a single antenna or a set of antennas.

The UE communications manager 2115 may identify that the UE is operating in a DC configuration with an MN and an SN, where the UE is in an inactive communications state with the SN. In some cases, the UE communications manager 2115 may determine that SN communications are to resume. Additionally, the UE communications manager 2115 may determine whether a previously stored lower-layer SCG configuration can be used for the resumption of SN communications. In some cases, the UE communications manager 2115 may transmit an indication to the MN indicating whether the previously stored lower-layer SCG configuration can be used to resume the SN communications.

Additionally or alternatively, the UE communications manager 2115 may perform a state transition to an inactive communication state with a first cell and a second cell. In some cases, the UE communications manager 2115 may determine that communications with at least one of the first cell or the second cell are to resume and store, based on the state transition to the inactive communication state, a first lower-layer configuration for the first cell and a second lower-layer configuration for the second cell. Additionally, the UE communications manager 2115 may receive a reconfiguration message that indicates a difference between a current lower-layer configuration and at least one of the stored first lower-layer configuration or the second lower-layer configuration and may transmit, based on the determination, an indication of whether one or more measurement reports are available. The UE communications manager 2115 may be an example of aspects of the UE communications manager 2410 described herein.

The UE communications manager 2115, or its sub-components, may be implemented in hardware, code (e.g., software or firmware) executed by a processor, or any combination thereof. If implemented in code executed by a processor, the functions of the UE communications manager 2115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 2115, or its sub-components, may be physically located at various positions, including being distributed such that portions of functions are implemented at different physical locations by one or more physical components. In some examples, the UE communications manager 2115, or its sub-components, may be a separate and distinct component in accordance with various aspects of the present disclosure. In some examples, the UE communications manager 2115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2120 may transmit signals generated by other components of the device 2105. In some examples, the transmitter 2120 may be collocated with a receiver 2110 in a transceiver module. For example, the transmitter 2120 may be an example of aspects of the transceiver 2420 described with reference to FIG. 24. The transmitter 2120 may utilize a single antenna or a set of antennas.

In some examples, the UE communications manager 2115 may be implemented as an integrated circuit or chipset for a mobile device modem, and the receiver 2110 and transmitter 2120 may be implemented as analog components (e.g., amplifiers, filters, antennas) coupled with the mobile device modem to enable wireless transmission and reception over one or more bands.

The UE communications manager 2115 as described herein may be implemented to realize one or more potential advantages. One implementation may allow the device 2105 to receive and store information related to measurement based and blind SCG configuration in MR-DC and CA. This information may increase reliability and reduce latency during feedback transmissions.

Based on techniques for implementing measurement based and blind SCG configuration in MR-DC and CA as described herein, a processor of a UE 115 (e.g., controlling the receiver 2110, the transmitter 2120, or the transceiver 2420 as described with reference to FIG. 24) may increase reliability and decrease signaling overhead in resuming connections because the UE 115 may avoid going through unnecessary configuration processes when leaving an inactive communication state.

Figure 22:
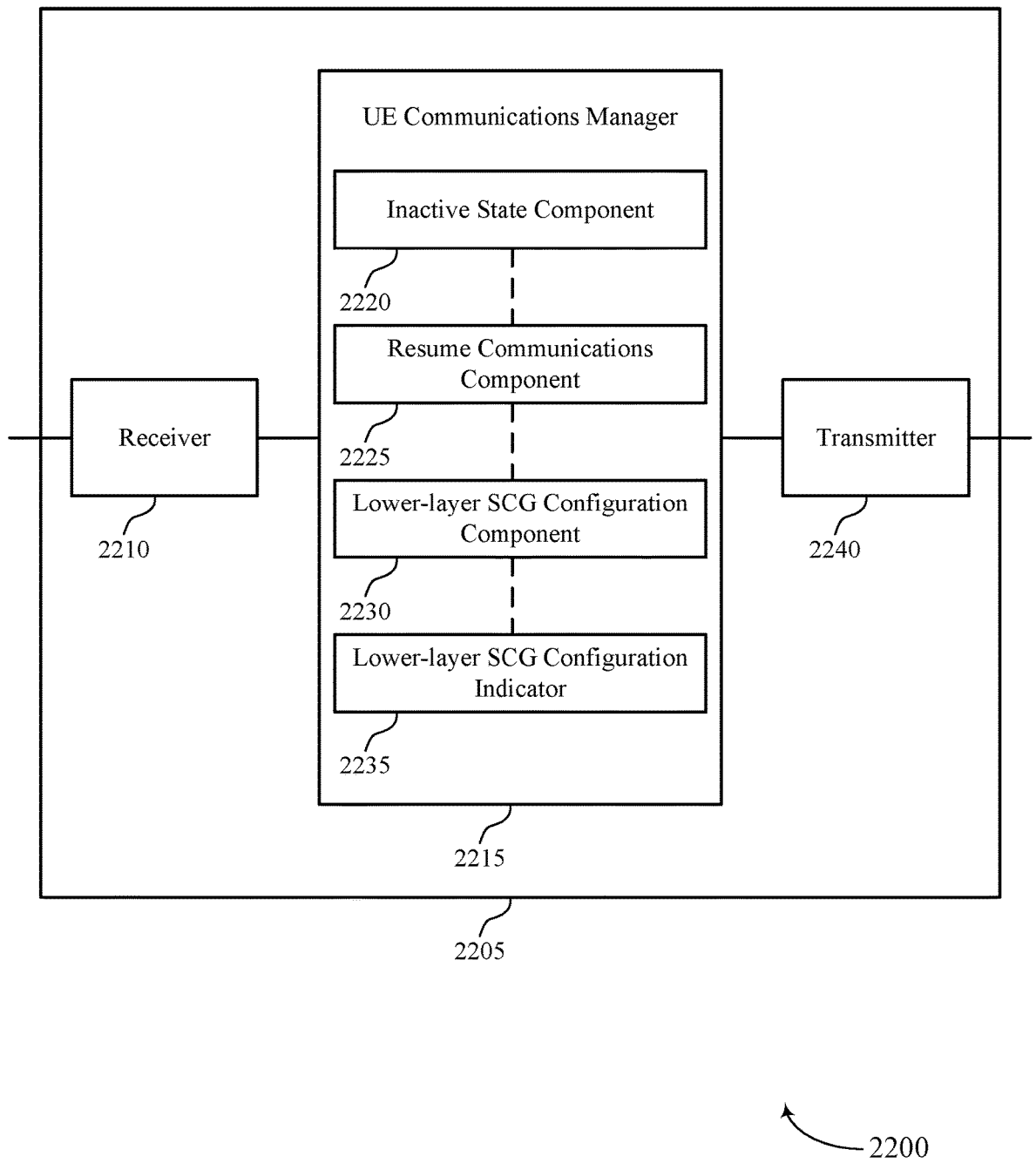

FIG. 22 shows a block diagram 2200 of a device 2205 that supports SCG configuration in MR-DC in accordance with aspects of the present disclosure. The device 2205 may be an example of aspects of a device 2105, or a UE 115 as described herein. The device 2205 may include a receiver 2210, a UE communications manager 2215, and a transmitter 2240. The device 2205 may also include a processor. Each of these components may be in communication with one another (e.g., via one or more buses).

The receiver 2210 may receive information such as packets, user data, or control information associated with various information channels (e.g., control channels, data channels, and information related to blind SCG configuration in MR-DC, etc.). Information may be passed on to other components of the device 2205. The receiver 2210 may be an example of aspects of the transceiver 2420 described with reference to FIG. 24. The receiver 2210 may utilize a single antenna or a set of antennas.

The UE communications manager 2215 may be an example of aspects of the UE communications manager 2115 as described herein. The UE communications manager 2215 may include an inactive state component 2220, a resume communications component 2225, a lower-layer SCG configuration component 2230, and a lower-layer SCG configuration indicator 2235. The UE communications manager 2215 may be an example of aspects of the UE communications manager 2410 described herein.

The inactive state component 2220 may identify that the UE is operating in a DC configuration with an MN and an SN, where the UE is in an inactive communications state with the SN.

The resume communications component 2225 may determine that SN communications are to resume.

The lower-layer SCG configuration component 2230 may determine whether a previously stored lower-layer SCG configuration can be used for the resumption of SN communications.

The lower-layer SCG configuration indicator 2235 may transmit an indication to the MN indicating whether the previously stored lower-layer SCG configuration can be used to resume the SN communications.

In some cases, the inactive state component 2220 may perform a state transition to an inactive communication state with a first cell and a second cell and determine that communications with at least one of the first cell or the second cell are to resume (e.g., in a connected communication state). Subsequently, the lower-layer SCG configuration component 2230 may store, based on the state transition to the inactive communication state, a first lower-layer configuration for the first cell and a second lower-layer configuration for the second cell and receive a reconfiguration message that indicates a difference between a current lower-layer configuration and at least one of the stored first lower-layer configuration or the second lower-layer configuration. Additionally, the lower-layer SCG configuration indicator 2235 may transmit, based on the determination, an indication of whether one or more measurement reports are available.

The transmitter 2240 may transmit signals generated by other components of the device 2205. In some examples, the transmitter 2240 may be collocated with a receiver 2210 in a transceiver module. For example, the transmitter 2240 may be an example of aspects of the transceiver 2420 described with reference to FIG. 24. The transmitter 2240 may utilize a single antenna or a set of antennas.

In some examples, the UE communications manager 2215 may be implemented as an integrated circuit or chipset for a mobile device modem, and the receiver 2210 and transmitter 2240 may be implemented as analog components (e.g., amplifiers, filters, antennas) coupled with the mobile device modem to enable wireless transmission and reception over one or more bands.

The UE communications manager 2215 as described herein may be implemented to realize one or more potential advantages. One implementation may allow the device 2205 to receive and store information related to measurement based and blind SCG configuration in MR-DC and CA. This information may increase reliability and reduce latency during feedback transmissions.

Based on techniques for implementing measurement based and blind SCG configuration in MR-DC and CA as described herein, a processor of a UE 115 (e.g., controlling the receiver 2210, the transmitter 2240, or the transceiver 2420 as described with reference to FIG. 24) may increase reliability and decrease signaling overhead in resuming connections because the UE 115 may avoid going through unnecessary configuration processes when leaving an inactive communication state.

Figure 23:
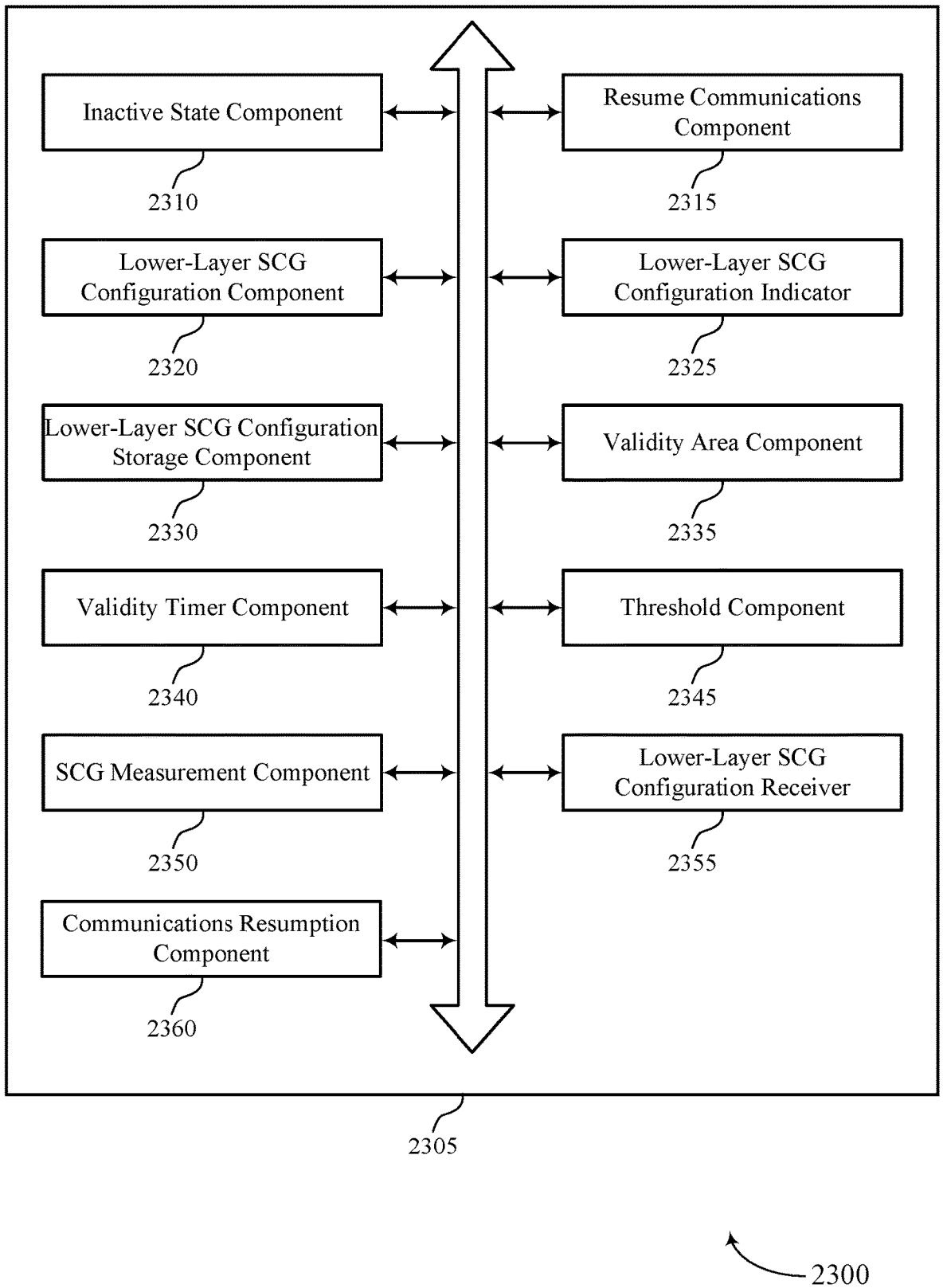
FIG. 23 shows a block diagram of a UE communications manager that supports SCG configuration in MR-DC in accordance with aspects of the present disclosure.

FIG. 23 shows a block diagram 2300 of a UE communications manager 2305 that supports SCG configuration in MR-DC in accordance with aspects of the present disclosure. The UE communications manager 2305 may be an example of aspects of a UE communications manager 2115, a UE communications manager 2215, or a UE communications manager 2410 described herein. The UE communications manager 2305 may include an inactive state component 2310, a resume communications component 2315, a lower-layer SCG configuration component 2320, a lower-layer SCG configuration indicator 2325, a lower-layer SCG configuration storage component 2330, a validity area component 2335, a validity timer component 2340, a threshold component 2345, an SCG measurement component 2350, a lower-layer SCG configuration receiver 2355, and a communications resumption component 2360. Each of these modules may communicate, directly or indirectly, with one another (e.g., via one or more buses).

The inactive state component 2310 may identify that the UE is operating in a DC configuration with an MN and an SN, where the UE is in an inactive communications state with the SN. In some cases, the MN may operate in a first RAT, and the SN may operate in a second RAT.

The resume communications component 2315 may determine that SN communications are to resume.

The lower-layer SCG configuration component 2320 may determine whether a previously stored lower-layer SCG configuration can be used for the resumption of SN communications. In some examples, the lower-layer SCG configuration component 2320 may discard the previously stored lower-layer SCG configuration based on determining that the SCG configuration not being valid. In some cases, the lower-layer SCG configuration may include at least one of an identifier for the SN of the DC configuration, parameters for the SN communications, or configuration information for one or more cells of the SCG.

The lower-layer SCG configuration indicator 2325 may transmit an indication to the MN indicating whether the previously stored lower-layer SCG configuration can be used to resume the SN communications.

The lower-layer SCG configuration storage component 2330 may receive, with a release message instructing the UE to enter the inactive communications state, an indication that the UE is to store a lower-layer SCG configuration. Accordingly, in some examples, the lower-layer SCG configuration storage component 2330 may store the lower-layer SCG configuration such that the lower-layer SCG configuration becomes the previously stored lower-layer SCG configuration. Additionally or alternatively, the lower-layer SCG configuration storage component 2330 may store a higher-layer SCG configuration based on receiving a release message.

The validity area component 2335 may identify, from information included with the release message, a validity area which defines one or more cells in which the previously stored lower-layer SCG configuration is valid for use. In some examples, the validity area component 2335 may determine whether the UE is within the one or more cells defined by the validity area. In some cases, the validity area may include a list of the one or more cells, a PCI list of the one or more cells, an RNA list of the one or more cells, a TA list of the one or more cells, or a combination thereof.

The validity timer component 2340 may identify, from information included with the release message, a validity time which defines a period in which the previously stored lower-layer SCG configuration is valid. In some examples, the validity timer component 2340 may determine whether the previously stored lower-layer SCG configuration is valid based on the validity time.

The threshold component 2345 may identify, from information included with the release message, a threshold measurement value. In some examples, the threshold component 2345 may measure signal reception conditions for comparison with the threshold measurement value and may determine whether the previously stored lower-layer SCG configuration is valid based on the UE measurements satisfying the threshold measurement value. In some cases, the threshold measurement value may include an RSRP measurement, an RSRQ measurement, or a combination thereof.

The SCG measurement component 2350 may receive, with a release message instructing the UE to enter the inactive communications state, a measurement configuration for an SCG including the SN of the DC configuration. In some examples, the SCG measurement component 2350 may perform measurements in accordance with the measurement configuration and may determine whether to include the indication that the previously stored lower-layer SCG configuration is available for resuming the SN communications based on the measurements. Additionally, in some examples, the SCG measurement component 2350 may transmit, to the MN and in addition to transmission of the indication, assistance information based on the measurements made in accordance with the measurement configuration, where the assistance information includes information to assist the MN in determining whether to apply the previously stored lower-layer SCG configuration or the updated lower-layer SCG configuration.

The lower-layer SCG configuration receiver 2355 may receive, from the MN and in response to the indication, a lower-layer SCell configuration to be used by the UE for SN communications, where the lower-layer SCell configuration is either the previously stored lower-layer SCG configuration, as stored by the MN, or an updated lower-layer SCG configuration. In some examples, the lower-layer SCG configuration receiver 2355 may receive the lower-layer SCell configuration in a resume communications message or a reconfiguration message.

In some cases, the inactive state component 2310 may perform a state transition to an inactive communication state with a first cell and a second cell and determine that communications with at least one of the first cell or the second cell are to resume (e.g., in a connected communication state). In some cases, the first cell includes a primary cell of a CA deployment and the second cell includes a secondary cell of the CA deployment. Subsequently, the lower-layer SCG configuration component 2320 may store, based on the state transition to the inactive communication state (e.g., being in the inactive communication state with the secondary node), a first lower-layer configuration for the first cell and a second lower-layer configuration for the second cell and receive, in response to the indication of whether the one or more measurement reports are available for the first cell or the second cell, a reconfiguration message that indicates a difference between a current lower-layer configuration and at least one of the stored first lower-layer configuration or the second lower-layer configuration. Additionally, the reconfiguration message is received via a signaling radio bearer associated with the second cell.

Additionally, the lower-layer SCG configuration indicator 2325 may transmit, based on the determination, an indication of whether one or more measurement reports are available. In some examples, the lower-layer SCG configuration indicator 2325 may transmit, via the first cell, an indication that a measurement report for the second cell is available based on measurements performed by the UE while in the inactive communication state, the method further including. In some cases, the lower-layer SCG configuration indicator 2325 may transmit, via the first cell, an indication that a measurement report for a third cell is available based on measurements performed by the UE while in the inactive communication state, the method further including.

In some examples, the lower-layer SCG configuration indicator 2325 may transmit, to the first cell, an indication that measurement reports for one or more cells are unavailable based on measurements performed by the UE while in the inactive communication state, the method further including. Additionally or alternatively, the lower-layer SCG configuration indicator 2325 may transmit, to the first cell and via a signaling radio bearer associated with the second cell, an indication that a measurement report for the first cell and the second cell is available based on measurements performed by the UE while in the inactive communication state. In some cases, the indication that the measurement report for the third cell is available may be transmitted via a signaling radio bearer associated with the second cell, where the reconfiguration message is received on the signaling radio bearer associated with the second cell.

The communications resumption component 2360 may resume communications on the first cell, where the first cell is from an MCG associated with a master node of a DC deployment, and where the second cell is from an SCG associated with a secondary node of the DC deployment. In some examples, the communications resumption component 2360 may resume communications on the first cell, where the first cell is from a previously-serving SCG associated with a previously-serving secondary node of a DC deployment, and where the second cell is from a previously-serving MCG associated with a previously-serving master node of the DC deployment.

In some examples, the communications resumption component 2360 may resume communications on the first cell, where the first cell is from an MCG associated with a master node of a DC deployment, and where the second cell is from a previously-serving SCG associated with a previously-serving secondary node of the DC deployment. In some examples, the communications resumption component 2360 may communicate on the third cell as part of a currently-serving SCG associated with a currently-serving secondary node of the DC deployment.

In some examples, the communications resumption component 2360 may resume communications on the first cell, where the first cell is from a currently-serving MCG associated with a currently-serving master node of a DC deployment, and where the second cell is from a previously-serving MCG associated with a previously-serving master node of the DC deployment. In some examples, the communications resumption component 2360 may communicate on the third cell as part of a currently-serving SCG associated with a secondary node of the DC deployment.

In some examples, the communications resumption component 2360 may resume communications on the first cell, where the first cell is from a previously-serving SCG associated with a previously-serving secondary node of a DC deployment, and where the first cell is from a previously-serving MCG associated with a previously-serving master node of the DC deployment. In some examples, the communications resumption component 2360 may communicate on the third cell as part of a currently-serving MCG of a currently-serving master node of the DC deployment.

In some examples, the communications resumption component 2360 may resume communications on the first cell, where the first cell is from an MCG associated with a master node of a DC deployment, and where the second cell is from a previously-serving SCG associated with a previously-serving secondary node of the DC deployment. In some examples, the communications resumption component 2360 may resume communications on the first cell, where the first cell is from a previously-serving SCG associated with a secondary node of a DC deployment, and where the second cell is from a previously-serving MCG associated with a previously-serving master node of the DC deployment.

In some examples, the communications resumption component 2360 may resume communications on the second cell based at least in part on the reconfiguration message indicating a difference between a current lower-layer configuration for the second cell and the stored second lower-layer configuration for the second cell, the difference being based at least in part on the measurement report for the second cell. Additionally or alternatively, the communications resumption component 2360 may communicate on the third cell based at least in part on the reconfiguration message indicating a difference between a current lower-layer configuration for the third cell and the stored second lower-layer configuration for the second cell, the difference being based at least in part on the measurement report for the third cell.

In some examples, the communications resumption component 2360 may refrain from communicating with the second cell based at least in part on the reconfiguration message, wherein the reconfiguration message indicates that the second cell has been released based at least in part on the unavailability of the measurement reports. In some cases, the communications resumption component 2360 may resume communications with the second cell based at least in part on the reconfiguration message indicating a difference between a current lower-layer configuration for the second cell and the stored second lower-layer configuration for the second cell, the difference being based at least in part on the measurement report for the second cell.

Figure 24:
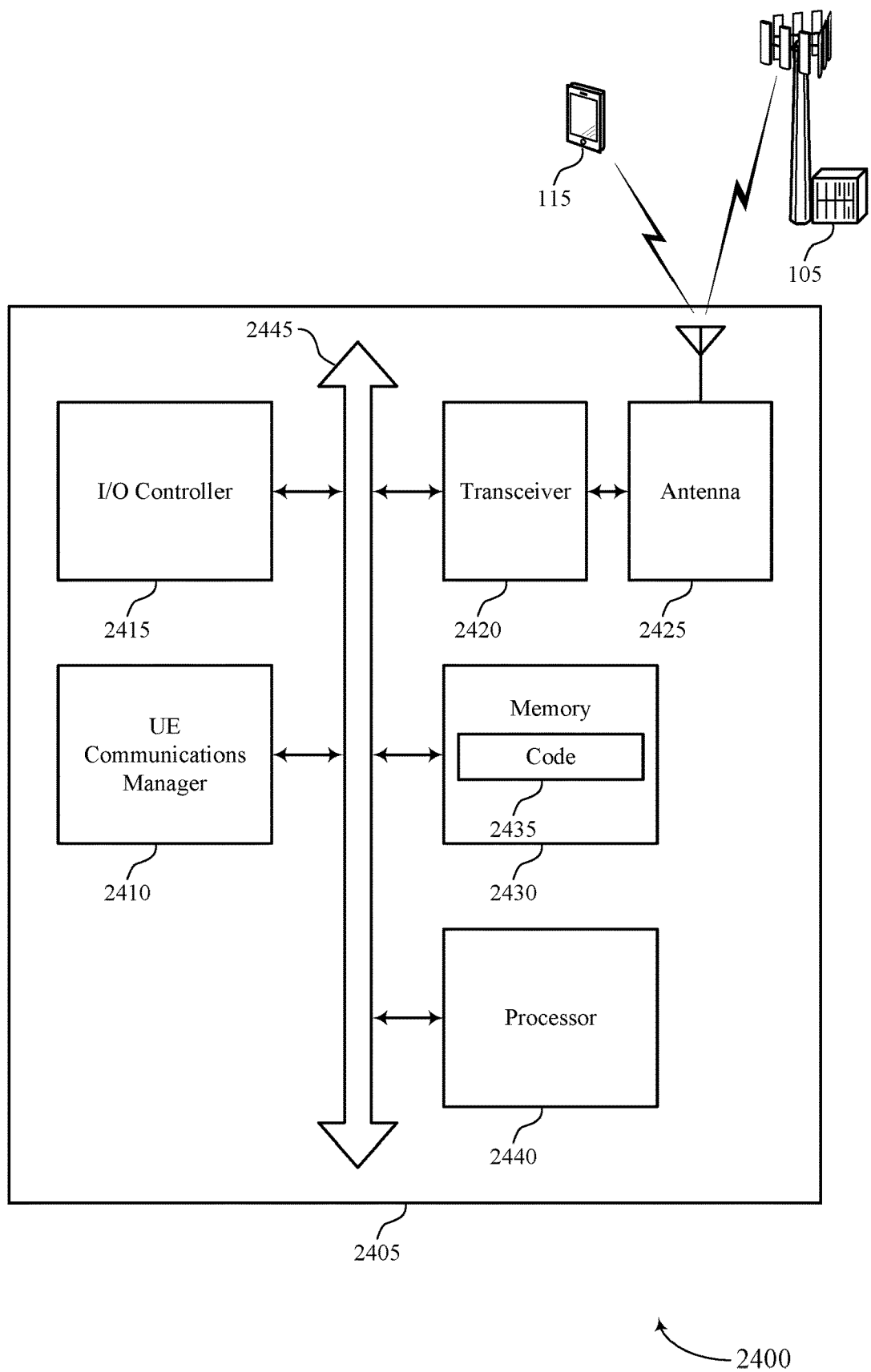
FIG. 24 shows a diagram of a system including a device that supports SCG configuration in MR-DC in accordance with aspects of the present disclosure.

FIG. 24 shows a diagram of a system 2400 including a device 2405 that supports SCG configuration in MR-DC in accordance with aspects of the present disclosure. The device 2405 may be an example of or include the components of device 2105, device 2205, or a UE 115 as described herein. The device 2405 may include components for bi-directional voice and data communications including components for transmitting and receiving communications, including a UE communications manager 2410, an I/O controller 2415, a transceiver 2420, an antenna 2425, memory 2430, and a processor 2440. These components may be in electronic communication via one or more buses (e.g., bus 2445).

The UE communications manager 2410 may identify that the UE is operating in a DC configuration with an MN and an SN, where the UE is in an inactive communications state with the SN. In some cases, the UE communications manager 2410 may determine that SN communications are to resume. Additionally, the UE communications manager 2410 may determine whether a previously stored lower-layer SCG configuration can be used for the resumption of SN communications. In some cases, the UE communications manager 2410 may transmit an indication to the MN indicating whether the previously stored lower-layer SCG configuration can be used to resume the SN communications.

Additionally or alternatively, the UE communications manager 2410 may perform a state transition to an inactive communication state with a first cell and a second cell. In some cases, the UE communications manager 2410 may determine that communications with at least one of the first cell or the second cell are to resume and store, based on the state transition to the inactive communication state, a first lower-layer configuration for the first cell and a second lower-layer configuration for the second cell. Additionally, the UE communications manager 2410 may receive a reconfiguration message that indicates a difference between a current lower-layer configuration and at least one of the stored first lower-layer configuration or the second lower-layer configuration and may transmit, based on the determination, an indication of whether one or more measurement reports are available.

The I/O controller 2415 may manage input and output signals for the device 2405. The I/O controller 2415 may also manage peripherals not integrated into the device 2405. In some cases, the I/O controller 2415 may represent a physical connection or port to an external peripheral. In some cases, the I/O controller 2415 may utilize an operating system such as iOS®, ANDROID®, MS-DOS®, MS-WINDOWS®, OS/2®, UNIX®, LINUX®, or another known operating system. In other cases, the I/O controller 2415 may represent or interact with a modem, a keyboard, a mouse, a touchscreen, or a similar device. In some cases, the I/O controller 2415 may be implemented as part of a processor. In some cases, a user may interact with the device 2405 via the I/O controller 2415 or via hardware components controlled by the I/O controller 2415.

The transceiver 2420 may communicate bi-directionally, via one or more antennas, wired, or wireless links as described above. For example, the transceiver 2420 may represent a wireless transceiver and may communicate bi-directionally with another wireless transceiver. The transceiver 2420 may also include a modem to modulate the packets and provide the modulated packets to the antennas for transmission, and to demodulate packets received from the antennas.

In some cases, the wireless device may include a single antenna 2425. However, in some cases the device may have more than one antenna 2425, which may be capable of concurrently transmitting or receiving multiple wireless transmissions.

The memory 2430 may include random-access memory (RAM) and read-only memory (ROM). The memory 2430 may store computer-readable, computer-executable code 2435 including instructions that, when executed, cause the processor to perform various functions described herein. In some cases, the memory 2430 may contain, among other things, a basic I/O system (BIOS) which may control basic hardware or software operation such as the interaction with peripheral components or devices.

The processor 2440 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 2440 may be configured to operate a memory array using a memory controller. In other cases, a memory controller may be integrated into the processor 2440. The processor 2440 may be configured to execute computer-readable instructions stored in a memory (e.g., the memory 2430) to cause the device 2405 to perform various functions (e.g., functions or tasks supporting blind SCG configuration in MR-DC).

The code 2435 may include instructions to implement aspects of the present disclosure, including instructions to support wireless communications. The code 2435 may be stored in a non-transitory computer-readable medium such as system memory or other type of memory. In some cases, the code 2435 may not be directly executable by the processor 2440 but may cause a computer (e.g., when compiled and executed) to perform functions described herein.

Figure 25:
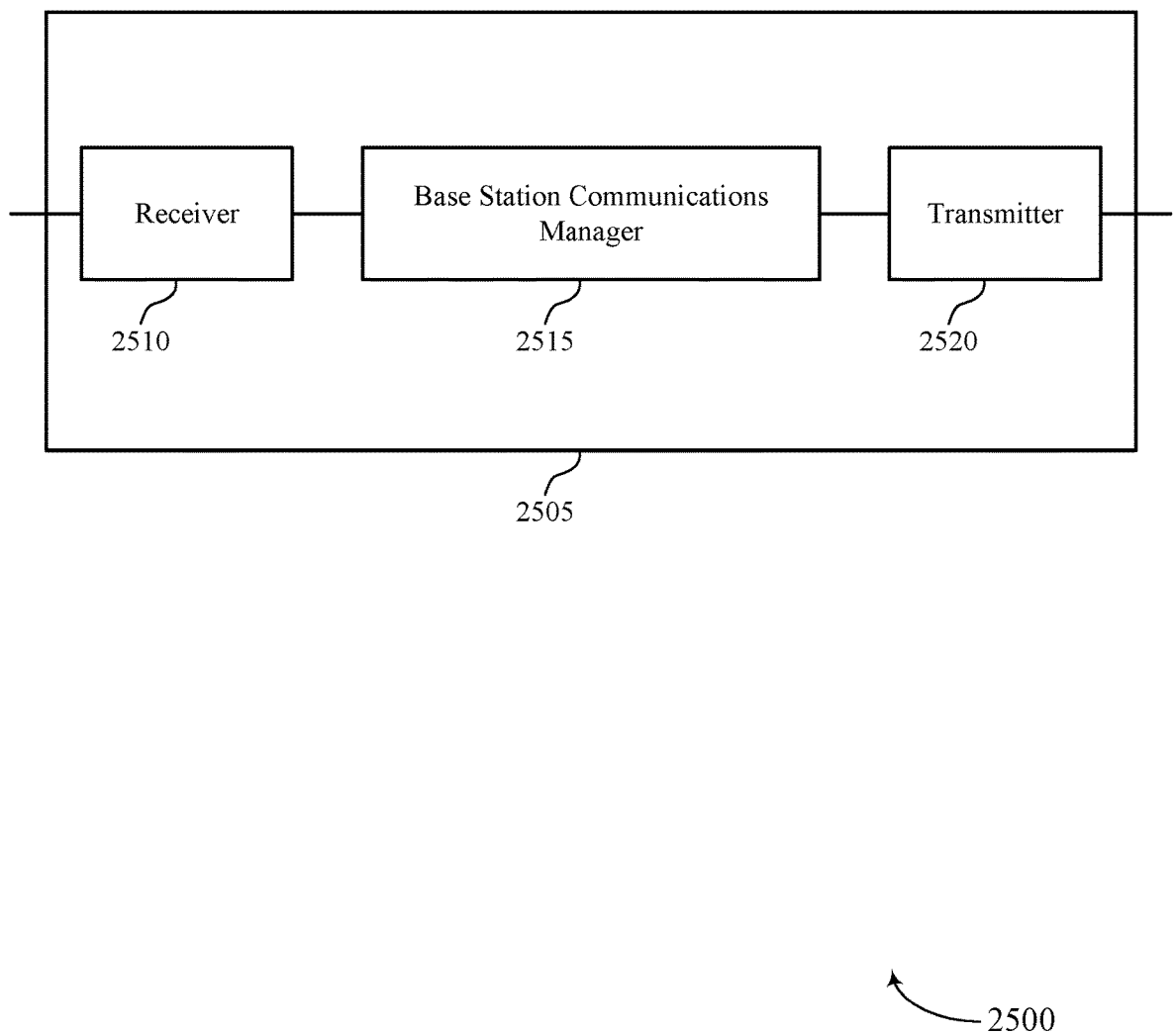
FIGS. 25 and 26 show block diagrams of devices that support SCG configuration in MR-DC in accordance with aspects of the present disclosure.

FIG. 25 shows a block diagram 2500 of a device 2505 that supports SCG configuration in MR-DC in accordance with aspects of the present disclosure. The device 2505 may be an example of aspects of a base station 105 as described herein. The device 2505 may include a receiver 2510, a base station communications manager 2515, and a transmitter 2520. The device 2505 may also include a processor. Each of these components may be in communication with one another (e.g., via one or more buses).

The receiver 2510 may receive information such as packets, user data, or control information associated with various information channels (e.g., control channels, data channels, and information related to blind SCG configuration in MR-DC, etc.). Information may be passed on to other components of the device 2505. The receiver 2510 may be an example of aspects of the transceiver 2820 described with reference to FIG. 28. The receiver 2510 may utilize a single antenna or a set of antennas.

The base station communications manager 2515 may identify that the base station is operating in a DC configuration with a UE, where the base station is an MN with respect to DC communications with the UE. In some cases, the base station communications manager 2515 may transmit, to the UE, a release message indicating a suspension of SN communications for the UE. Additionally, the base station communications manager 2515 may store, at the MN, a lower-layer SCG configuration used for the SN communications by the UE. In some cases, the base station communications manager 2515 may receive a message from the UE that the SN communications are to resume. Additionally, the base station communications manager 2515 may receive an indication from the UE whether the stored lower-layer SCG configuration is to be used for the SN communications.

In some cases, the base station communications manager 2515 may communicate with a UE using a first lower-layer configuration for a first cell of the base station and store the first lower-layer configuration based on a determination that the UE has transitioned to an inactive communication state. Additionally, the base station communications manager 2515 may determine a current lower-layer configuration for at least one of the first cell or a second cell. In some cases, the base station communications manager 2515 may receive, from the UE, a request to resume communications, the request including an indication of whether one or more measurement reports are available at the UE and may transmit, to the UE, a reconfiguration message that indicates a difference between a current lower-layer configuration and at least one of the stored first lower-layer configuration or a second lower-layer configuration for the second cell.

Additionally or alternatively, the base station communications manager 2515 may communicate with a UE using a lower-layer configuration for a cell of the base station, where the cell is from an SCG of a DC deployment. In some cases, the base station communications manager 2515 may store the first lower-layer configuration based on a determination that the UE has transitioned to an inactive communication state and receive, from the UE, a request to resume communications, the request including an indication of whether one or more measurement reports are available at the UE. The base station communications manager 2515 may be an example of aspects of the base station communications manager 2810 described herein.

The base station communications manager 2515, or its sub-components, may be implemented in hardware, code (e.g., software or firmware) executed by a processor, or any combination thereof. If implemented in code executed by a processor, the functions of the base station communications manager 2515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 2515, or its sub-components, may be physically located at various positions, including being distributed such that portions of functions are implemented at different physical locations by one or more physical components. In some examples, the base station communications manager 2515, or its sub-components, may be a separate and distinct component in accordance with various aspects of the present disclosure. In some examples, the base station communications manager 2515, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 2520 may transmit signals generated by other components of the device 2505. In some examples, the transmitter 2520 may be collocated with a receiver 2510 in a transceiver module. For example, the transmitter 2520 may be an example of aspects of the transceiver 2820 described with reference to FIG. 28. The transmitter 2520 may utilize a single antenna or a set of antennas.

Figure 26:
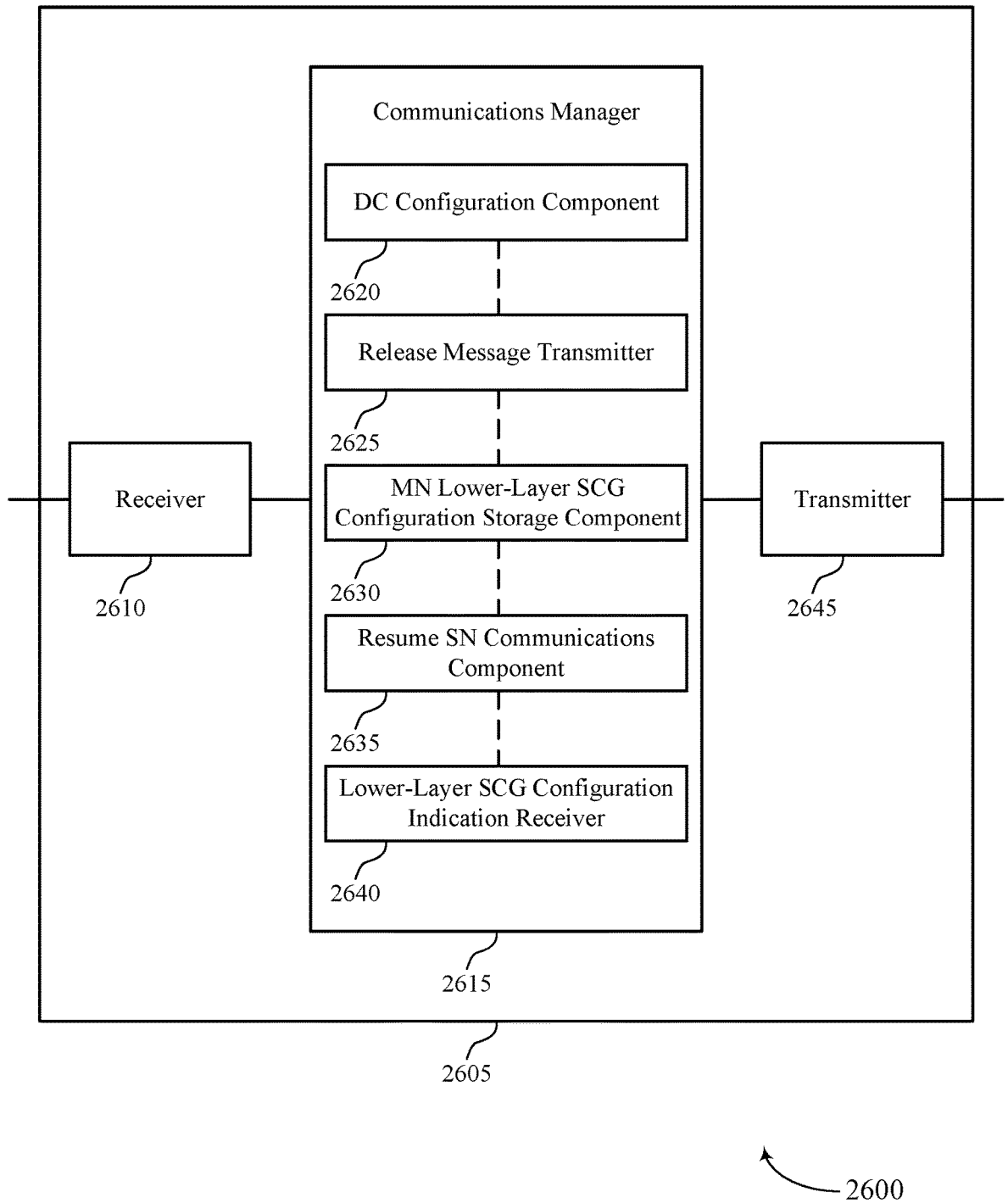

FIG. 26 shows a block diagram 2600 of a device 2605 that supports SCG configuration in MR-DC in accordance with aspects of the present disclosure. The device 2605 may be an example of aspects of a device 2505, or a base station 105 as described herein. The device 2605 may include a receiver 2610, a base station communications manager 2615, and a transmitter 2645. The device 2605 may also include a processor. Each of these components may be in communication with one another (e.g., via one or more buses).

The receiver 2610 may receive information such as packets, user data, or control information associated with various information channels (e.g., control channels, data channels, and information related to blind SCG configuration in MR-DC, etc.). Information may be passed on to other components of the device 2605. The receiver 2610 may be an example of aspects of the transceiver 2820 described with reference to FIG. 28. The receiver 2610 may utilize a single antenna or a set of antennas.

The base station communications manager 2615 may be an example of aspects of the base station communications manager 2515 as described herein. The base station communications manager 2615 may include a DC configuration component 2620, a release message transmitter 2625, an MN lower-layer SCG configuration storage component 2630, a resume SN communications component 2635, and a lower-layer SCG configuration indication receiver 2640. The base station communications manager 2615 may be an example of aspects of the base station communications manager 2810 described herein.

The DC configuration component 2620 may identify that the base station is operating in a DC configuration with a UE, where the base station is an MN with respect to DC communications with the UE.

The release message transmitter 2625 may transmit, to the UE, a release message indicating a suspension of SN communications for the UE.

The MN lower-layer SCG configuration storage component 2630 may store, at the MN, a lower-layer SCG configuration used for the SN communications by the UE.

The resume SN communications component 2635 may receive a message from the UE that the SN communications are to resume.

The lower-layer SCG configuration indication receiver 2640 may receive an indication from the UE whether the stored lower-layer SCG configuration is to be used for the SN communications.

In some cases, the DC configuration component 2620 may communicate with a UE using a first lower-layer configuration for a first cell of the base station. The release message transmitter 2625 may store the first lower-layer configuration based on a determination that the UE has transitioned to an inactive communication state and determine a current lower-layer configuration for at least one of the first cell or a second cell. In some cases, the resume SN communications component 2635 may receive, from the UE, a request to resume communications, the request including an indication of whether one or more measurement reports are available at the UE and may transmit, to the UE, a reconfiguration message that indicates a difference between a current lower-layer configuration and at least one of the stored first lower-layer configuration or a second lower-layer configuration for the second cell.

Additionally or alternatively, the DC configuration component 2620 may communicate with a UE using a lower-layer configuration for a cell of the base station, where the cell is from an SCG of a DC deployment. In some cases, MN lower-layer SCG configuration storage component 2630 may store the first lower-layer configuration based on a determination that the UE has transitioned to an inactive communication state.

The transmitter 2645 may transmit signals generated by other components of the device 2605. In some examples, the transmitter 2645 may be collocated with a receiver 2610 in a transceiver module. For example, the transmitter 2645 may be an example of aspects of the transceiver 2820 described with reference to FIG. 28. The transmitter 2645 may utilize a single antenna or a set of antennas.

Figure 27:
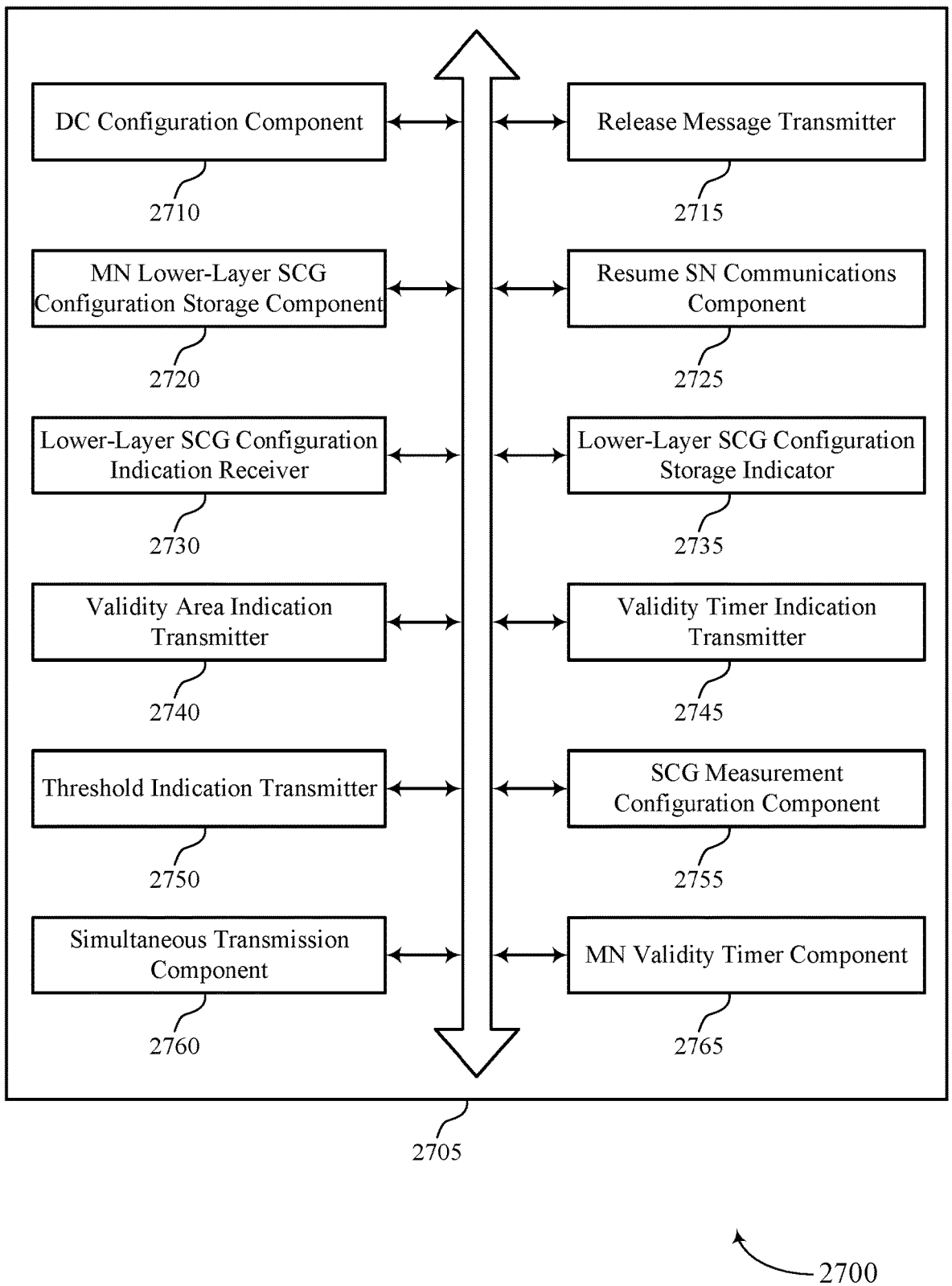
FIG. 27 shows a block diagram of a base station communications manager that supports SCG configuration in MR-DC in accordance with aspects of the present disclosure.

FIG. 27 shows a block diagram 2700 of a base station communications manager 2705 that supports SCG configuration in MR-DC in accordance with aspects of the present disclosure. The base station communications manager 2705 may be an example of aspects of a base station communications manager 2515, a base station communications manager 2615, or a base station communications manager 2810 described herein. The base station communications manager 2705 may include a DC configuration component 2710, a release message transmitter 2715, an MN lower-layer SCG configuration storage component 2720, a resume SN communications component 2725, a lower-layer SCG configuration indication receiver 2730, a lower-layer SCG configuration storage indicator 2735, a validity area indication transmitter 2740, a validity timer indication transmitter 2745, a threshold indication transmitter 2750, an SCG measurement configuration component 2755, a simultaneous transmission component 2760, and an MN validity timer component 2765. Each of these modules may communicate, directly or indirectly, with one another (e.g., via one or more buses).

The DC configuration component 2710 may identify that the base station is operating in a DC configuration with a UE, where the base station is an MN with respect to DC communications with the UE. In some cases, the MN may operate in a first RAT, and the SN may operate in a second RAT.

The release message transmitter 2715 may transmit, to the UE, a release message indicating a suspension of SN communications for the UE.

The MN lower-layer SCG configuration storage component 2720 may store, at the MN, a lower-layer SCG configuration used for the SN communications by the UE. In some examples, the MN lower-layer SCG configuration storage component 2720 may discard the stored lower-layer SCG configuration based on receiving the indication from the UE that the stored SCG configuration is not to be used.

The resume SN communications component 2725 may receive a message from the UE that the SN communications are to resume.

The lower-layer SCG configuration indication receiver 2730 may receive an indication from the UE whether the stored lower-layer SCG configuration is to be used for the SN communications.

The lower-layer SCG configuration storage indicator 2735 may transmit, to the UE, an indication to store the lower-layer SCG configuration.

The validity area indication transmitter 2740 may transmit with the indication to store the lower-layer SCG configuration, information including a validity area which defines one or more cells in which the UE is to be located if the stored lower-layer SCG configuration is to be valid. In some cases, the validity area of the one or more cells in the SCG may include a list of the one or more cells, a PCI list of the one or more cells, an RNA list of the one or more cells, a TA list of the one or more cells, or a combination thereof.

The validity timer indication transmitter 2745 may transmit with the indication to store the lower-layer SCG configuration, information including a validity timer which defines a timing for when the stored lower-layer SCG configuration is valid.

The threshold indication transmitter 2750 may transmit with the indication to store the lower-layer SCG configuration, information including a threshold measurement value to allow the UE to determine whether the stored lower-layer SCG configuration is to be applied. In some cases, the threshold measurement value may include an RSRP measurement, an RSRQ measurement, or a combination thereof.

The SCG measurement configuration component 2755 may transmit, to the UE, a measurement configuration for an SCG including an SN of the DC configuration, where the indication from the UE whether the stored lower-layer SCG configuration is to be used for the SN communications is received based on the measurement configuration. In some examples, the SCG measurement configuration component 2755 may receive, from the UE, assistance information based on transmitting the measurement configuration, where the assistance information includes an indication to apply the stored lower-layer SCG configuration for the UE to use for SN communications or an identifier of a primary secondary cell for the UE to use for the SN communications. Additionally or alternatively, the SCG measurement configuration component 2755 may transmit, to the UE, a lower-layer configuration for the SCG for the SN communications based on the assistance information. In some cases, the lower-layer configuration for the SCG may be transmitted in a resume communications message or a reconfiguration message.

The simultaneous transmission component 2760 may transmit, to an SN of the DC configuration, an activation request message for the SN communications based on receiving the message from the UE that the SN communications are to resume. Additionally, the simultaneous transmission component 2760 may transmit, to the UE, a resume communications message for the SN communications based on receiving the indication from the UE whether the stored lower-layer SCG configuration is to be used for the SN communications, where the resume communications message and the activation request message are transmitted simultaneously.

The MN validity timer component 2765 may initiate a validity timer based on transmitting the release message. In some examples, the MN validity timer component 2765 may determine that the validity timer expires prior to receiving the message from the UE that the SN communications are to resume and may discard the stored lower-layer SCG configuration used for the SN communications by the UE based on the validity timer expiring.

Additionally or alternatively, the DC configuration component 2710 may communicate with a UE using a first lower-layer configuration for a first cell of the base station. In some cases, the cell is from an MCG of a DC deployment and the second cell is from a previously-serving SCG of the DC deployment. In some examples, the DC configuration component 2710 may activate the second cell based at least in part on a measurement report for the second cell.

The release message transmitter 2715 may store, at the master node, a first lower-layer configuration for the first cell of the master node based on a determination that the UE has transitioned to an inactive communication state (e.g., based on the suspension of the secondary node communications by the UE) and determine a current lower-layer configuration for at least one of the first cell or a second cell of a secondary node used for the secondary node communications. In some examples, the release message transmitter 2715 may determine a current lower-layer configuration for at least one of the first cell or a second cell. In some examples, the release message transmitter 2715 may store the first lower-layer configuration based on a determination that the UE has transitioned to an inactive communication state. In some examples, the release message transmitter 2715 may determine a current lower-layer configuration for the cell.

In some cases, the resume SN communications component 2725 may receive, from the UE, a request to resume communications, the request including an indication of whether one or more measurement reports are available at the UE and may transmit, to the UE, a reconfiguration message that indicates a difference between a current lower-layer configuration and at least one of the stored first lower-layer configuration or a second lower-layer configuration for the second cell (e.g., the lower-layer secondary cell group configuration). In some examples, the resume SN communications component 2725 may receive, from the UE, a request to resume communications, the request including an indication of whether one or more measurement reports are available at the UE.

In some examples, the resume SN communications component 2725 may receive, from the second base station, an indication of the second lower-layer configuration for the second cell, where determining the current lower-layer configuration is based on the received indication. In some examples, the resume SN communications component 2725 may transmit, to the UE, a reconfiguration message that indicates a difference between the current lower-layer configuration and at least one of the stored lower-layer configuration or a second lower-layer configuration for a second cell provided by a second base station, where the second cell is from an MCG of the DC deployment. In some cases, the reconfiguration message is transmitted via the signaling radio bearer associated with the second cell.

The SCG measurement configuration component 2755 may receive an indication that a measurement report for the second cell is available based on measurements performed by the UE while in the inactive communication state, the method further including. In some examples, the SCG measurement configuration component 2755 may receive an indication that a measurement report for a third cell is available based on measurements performed by the UE while in the inactive communication state, the method further including.

In some examples, the SCG measurement configuration component 2755 may receive, via a signaling radio bearer associated with the second cell, an indication that a measurement report for a third cell is available based on measurements performed by the UE while in the inactive communication state. In some examples, the SCG measurement configuration component 2755 may receive an indication that measurement reports for one or more other cells are unavailable based on measurements performed by the UE while in the inactive communication state, the method further including.

In some examples, the SCG measurement configuration component 2755 may receive an indication that a measurement report for the second cell is available based on measurements performed by the UE while in the inactive communication state, the method further including. In some examples, the SCG measurement configuration component 2755 may receive an indication that a measurement report for a third cell is available based on measurements performed by the UE while in the inactive communication state, the method further including.

In some examples, the SCG measurement configuration component 2755 may receive an indication that measurement reports for one or more other cells are unavailable based on measurements performed by the UE while in the inactive communication state, the method further including. In some cases, the indication that the measurement report for the second cell is received via a signaling radio bearer associated with the second cell, and where the reconfiguration message is transmitted via the signaling radio bearer associated with the second cell.

The lower-layer SCG configuration storage indicator 2735 may transmit, as part of the secondary node addition request, an indication of the second lower-layer configuration to the target base station. In some examples, the lower-layer SCG configuration storage indicator 2735 may transmit, to a third base station providing the third cell, a handover request based on the measurement report for the third cell, where the handover request includes an indication of the stored first lower-layer configuration for the first cell.

In some examples, the lower-layer SCG configuration storage indicator 2735 may transmit, based at least in part on the measurement report for the second cell, a context request to the second base station, the context request comprising an indication to exchange a master node and the secondary node. In some examples, the lower-layer SCG configuration storage indicator 2735 may receive, from the second base station, an indication of the second lower-layer configuration, wherein the reconfiguration message indicates a difference between a current lower-layer configuration for the cell and the second lower-layer configuration for the second cell.

In some examples, the lower-layer SCG configuration storage indicator 2735 may transmit, to a third base station providing the third cell, an indication of the stored lower-layer configuration, wherein the reconfiguration message indicates a difference between a current lower-layer configuration for the cell and the second lower-layer configuration for the second cell. In some examples, the lower-layer SCG configuration storage indicator 2735 may transmit, to the second base station, a secondary node release request based at least in part on the unavailability of the measurement reports. In some examples, the lower-layer SCG configuration storage indicator 2735 may transmit, to the second base station, a handover request based at least in part on the unavailability of the measurement reports.

Additionally or alternatively, the DC configuration component 2710 may communicate with a UE using a lower-layer configuration for a cell of the base station, where the cell is from an SCG of a DC deployment. In some examples, the DC configuration component 2710 may transmit, to a target base station providing the third cell, a secondary node addition request based at least in part on the measurement report for the third cell. In some cases, the DC configuration component 2710 may transmit, to a second base station providing the second cell, a secondary node release request, wherein the second cell is from a previously-serving SCG of a DC deployment. Additionally or alternatively, the DC configuration component 2710 may transmit, to a second base station providing the second cell, a secondary node release request based at least in part on the unavailability of the measurement reports.

In some cases, MN lower-layer SCG configuration storage component 2720 may store the first lower-layer configuration based on a determination that the UE has transitioned to an inactive communication state.

Figure 28:
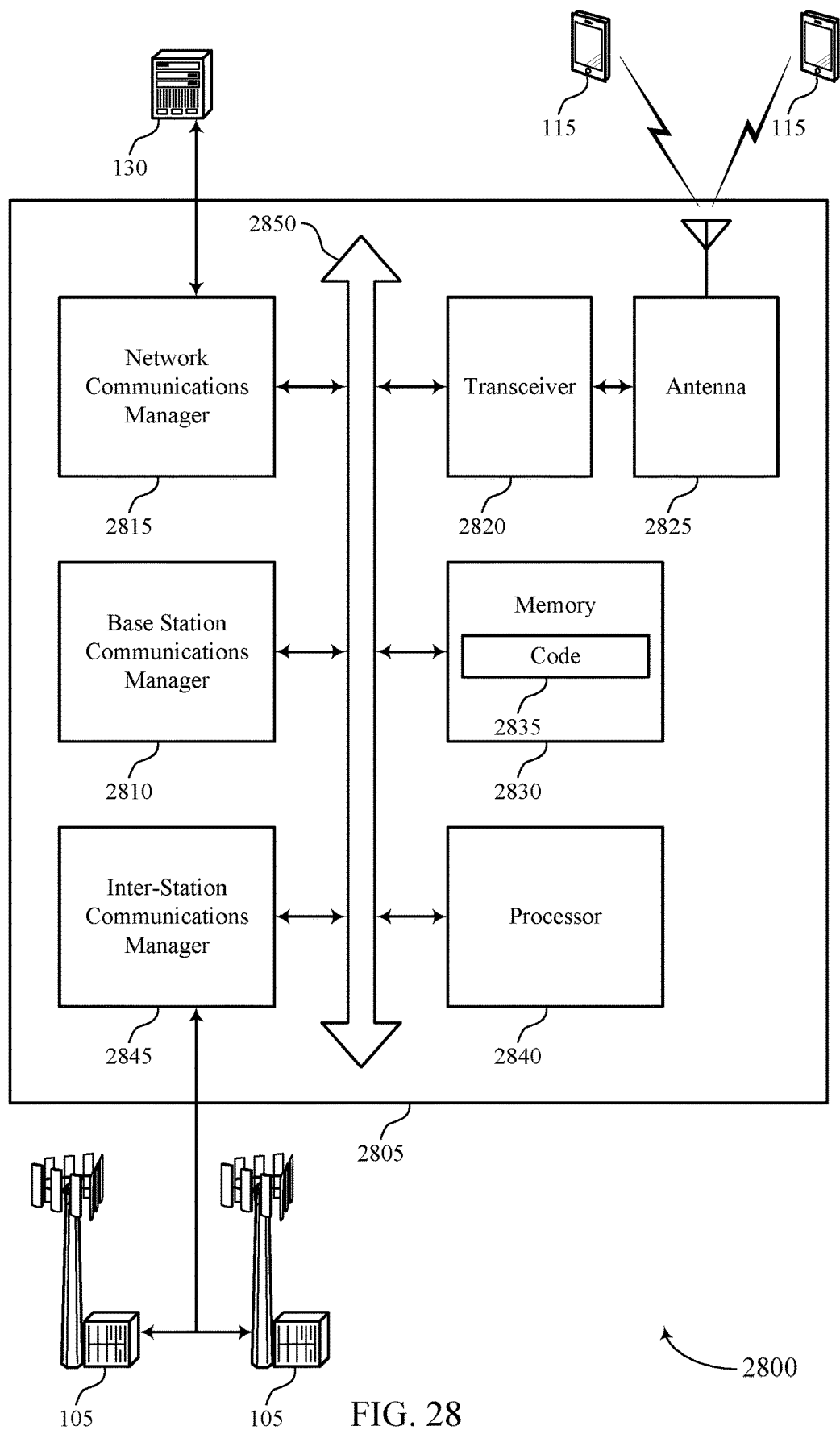
FIG. 28 shows a diagram of a system including a device that supports SCG configuration in MR-DC in accordance with aspects of the present disclosure.

FIG. 28 shows a diagram of a system 2800 including a device 2805 that supports SCG configuration in MR-DC in accordance with aspects of the present disclosure. The device 2805 may be an example of or include the components of device 2505, device 2605, or a base station 105 as described herein. The device 2805 may include components for bi-directional voice and data communications including components for transmitting and receiving communications, including a base station communications manager 2810, a network communications manager 2815, a transceiver 2820, an antenna 2825, memory 2830, a processor 2840, and an inter-station communications manager 2845. These components may be in electronic communication via one or more buses (e.g., bus 2850).

The base station communications manager 2810 may identify that the base station is operating in a DC configuration with a UE, where the base station is an MN with respect to DC communications with the UE. In some cases, the base station communications manager 2810 may transmit, to the UE, a release message indicating a suspension of SN communications for the UE. Additionally, the base station communications manager 2810 may store, at the MN, a lower-layer SCG configuration used for the SN communications by the UE. In some cases, the base station communications manager 2810 may receive a message from the UE that the SN communications are to resume. Additionally, the base station communications manager 2810 may receive an indication from the UE whether the stored lower-layer SCG configuration is to be used for the SN communications.

In some cases, the base station communications manager 2810 may communicate with a UE 115 using a first lower-layer configuration for a first cell of the base station 105 and store the first lower-layer configuration based on a determination that the UE 115 has transitioned to an inactive communication state. Additionally, the base station communications manager 2810 may determine a current lower-layer configuration for at least one of the first cell or a second cell. In some cases, the base station communications manager 2810 may receive, from the UE 115, a request to resume communications, the request including an indication of whether one or more measurement reports are available at the UE 115 and may transmit, to the UE 115, a reconfiguration message that indicates a difference between a current lower-layer configuration and at least one of the stored first lower-layer configuration or a second lower-layer configuration for the second cell.

Additionally or alternatively, the base station communications manager 2810 may communicate with a UE 115 using a lower-layer configuration for a cell of the base station 105, where the cell is from an SCG of a DC deployment. In some cases, the base station communications manager 2810 may store the first lower-layer configuration based on a determination that the UE 115 has transitioned to an inactive communication state and receive, from the UE 115, a request to resume communications, the request including an indication of whether one or more measurement reports are available at the UE 115.

The network communications manager 2815 may manage communications with the core network (e.g., via one or more wired backhaul links). For example, the network communications manager 2815 may manage the transfer of data communications for client devices, such as one or more UEs 115.

The transceiver 2820 may communicate bi-directionally, via one or more antennas, wired, or wireless links as described above. For example, the transceiver 2820 may represent a wireless transceiver and may communicate bi-directionally with another wireless transceiver. The transceiver 2820 may also include a modem to modulate the packets and provide the modulated packets to the antennas for transmission, and to demodulate packets received from the antennas.

In some cases, the wireless device may include a single antenna 2825. However, in some cases the device may have more than one antenna 2825, which may be capable of concurrently transmitting or receiving multiple wireless transmissions.

The memory 2830 may include RAM, ROM, or a combination thereof. The memory 2830 may store computer-readable code 2835 including instructions that, when executed by a processor (e.g., the processor 2840) cause the device to perform various functions described herein. In some cases, the memory 2830 may contain, among other things, a BIOS which may control basic hardware or software operation such as the interaction with peripheral components or devices.

The processor 2840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2840 may be configured to operate a memory array using a memory controller. In some cases, a memory controller may be integrated into processor 2840. The processor 2840 may be configured to execute computer-readable instructions stored in a memory (e.g., the memory 2830) to cause the device 2805 to perform various functions (e.g., functions or tasks supporting blind SCG configuration in MR-DC).

The inter-station communications manager 2845 may manage communications with other base station 105, and may include a controller or scheduler for controlling communications with UEs 115 in cooperation with other base stations 105. For example, the inter-station communications manager 2845 may coordinate scheduling for transmissions to UEs 115 for various interference mitigation techniques such as beamforming or joint transmission. In some examples, the inter-station communications manager 2845 may provide an X2 interface within an LTE/LTE-A wireless communication network technology to provide communication between base stations 105.

The code 2835 may include instructions to implement aspects of the present disclosure, including instructions to support wireless communications. The code 2835 may be stored in a non-transitory computer-readable medium such as system memory or other type of memory. In some cases, the code 2835 may not be directly executable by the processor 2840 but may cause a computer (e.g., when compiled and executed) to perform functions described herein.

Figure 29:
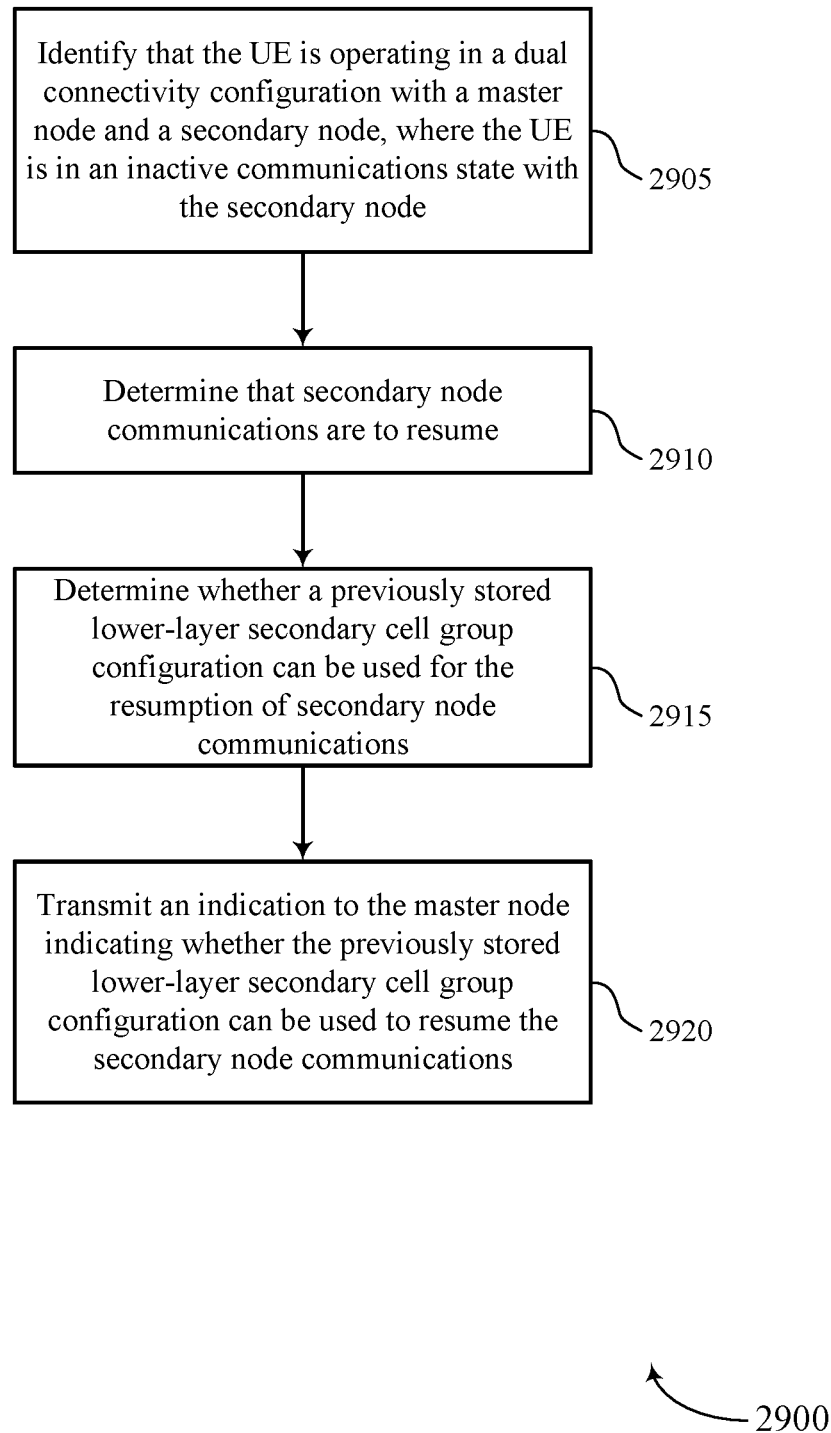
FIGS. 29 through 34 show flowcharts illustrating methods that support SCG configuration in MR-DC in accordance with aspects of the present disclosure.

FIG. 29 shows a flowchart illustrating a method 2900 that supports SCG configuration in MR-DC in accordance with aspects of the present disclosure. The operations of method 2900 may be implemented by a UE 115 or its components as described herein. For example, the operations of method 2900 may be performed by a UE communications manager as described with reference to FIGS. 21 through 24. In some examples, a UE may execute a set of instructions to control the functional elements of the UE to perform the functions described below. Additionally or alternatively, a UE may perform aspects of the functions described below using special-purpose hardware.

At 2905, the UE may identify that the UE is operating in a DC configuration with an MN and an SN, where the UE is in an inactive communications state with the SN. The operations of 2905 may be performed according to the methods described herein. In some examples, aspects of the operations of 2905 may be performed by an inactive state component as described with reference to FIGS. 21 through 24.

At 2910, the UE may determine that SN communications are to resume. The operations of 2910 may be performed according to the methods described herein. In some examples, aspects of the operations of 2910 may be performed by a resume communications component as described with reference to FIGS. 21 through 24.

At 2915, the UE may determine whether a previously stored lower-layer SCG configuration can be used for the resumption of SN communications. The operations of 2915 may be performed according to the methods described herein. In some examples, aspects of the operations of 2915 may be performed by a lower-layer SCG configuration component as described with reference to FIGS. 21 through 24.

At 2920, the UE may transmit an indication to the MN indicating whether the previously stored lower-layer SCG configuration can be used to resume the SN communications. The operations of 2920 may be performed according to the methods described herein. In some examples, aspects of the operations of 2920 may be performed by a lower-layer SCG configuration indicator as described with reference to FIGS. 21 through 24.

Figure 30:
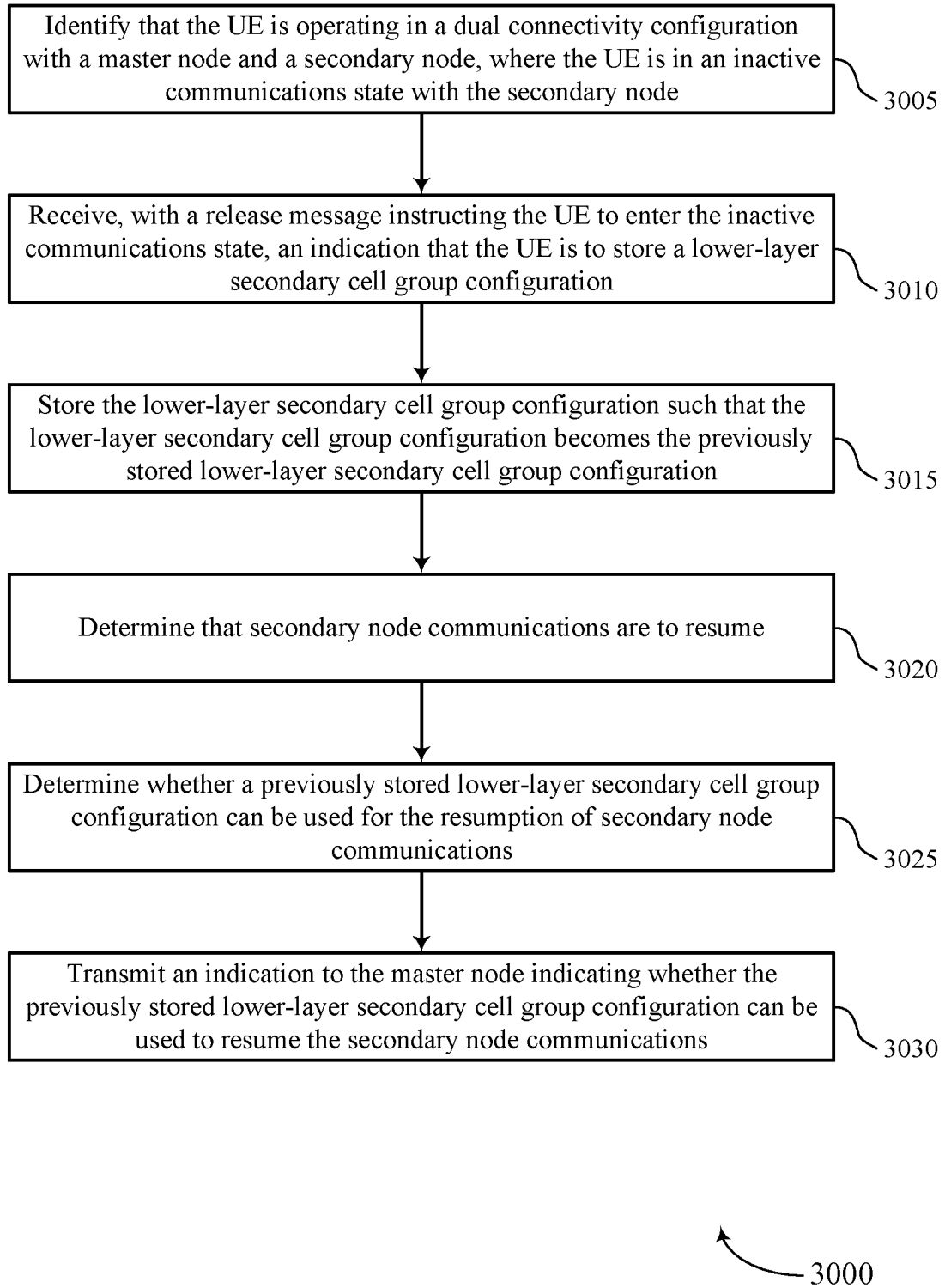

FIG. 30 shows a flowchart illustrating a method 3000 that supports SCG configuration in MR-DC in accordance with aspects of the present disclosure. The operations of method 3000 may be implemented by a UE 115 or its components as described herein. For example, the operations of method 3000 may be performed by a UE communications manager as described with reference to FIGS. 21 through 24. In some examples, a UE may execute a set of instructions to control the functional elements of the UE to perform the functions described below. Additionally or alternatively, a UE may perform aspects of the functions described below using special-purpose hardware.

At 3005, the UE may identify, that the UE is operating in a DC configuration with an MN and an SN, where the UE is in an inactive communications state with the SN. The operations of 3005 may be performed according to the methods described herein. In some examples, aspects of the operations of 3005 may be performed by an inactive state component as described with reference to FIGS. 21 through 24.

At 3010, the UE may receive, with a release message instructing the UE to enter the inactive communications state, an indication that the UE is to store a lower-layer SCG configuration. The operations of 3010 may be performed according to the methods described herein. In some examples, aspects of the operations of 3010 may be performed by a lower-layer SCG configuration storage component as described with reference to FIGS. 21 through 24.

At 3015, the UE may store the lower-layer SCG configuration such that the lower-layer SCG configuration becomes the previously stored lower-layer SCG configuration. The operations of 3015 may be performed according to the methods described herein. In some examples, aspects of the operations of 3015 may be performed by a lower-layer SCG configuration storage component as described with reference to FIGS. 21 through 24.

At 3020, the UE may determine that SN communications are to resume. The operations of 3020 may be performed according to the methods described herein. In some examples, aspects of the operations of 3020 may be performed by a resume communications component as described with reference to FIGS. 21 through 24.

At 3025, the UE may determine whether a previously stored lower-layer SCG configuration can be used for the resumption of SN communications. The operations of 3025 may be performed according to the methods described herein. In some examples, aspects of the operations of 3025 may be performed by a lower-layer SCG configuration component as described with reference to FIGS. 21 through 24.

At 3030, the UE may transmit an indication to the MN indicating whether the previously stored lower-layer SCG configuration can be used to resume the SN communications. The operations of 3030 may be performed according to the methods described herein. In some examples, aspects of the operations of 3030 may be performed by a lower-layer SCG configuration indicator as described with reference to FIGS. 21 through 24.

Figure 31:
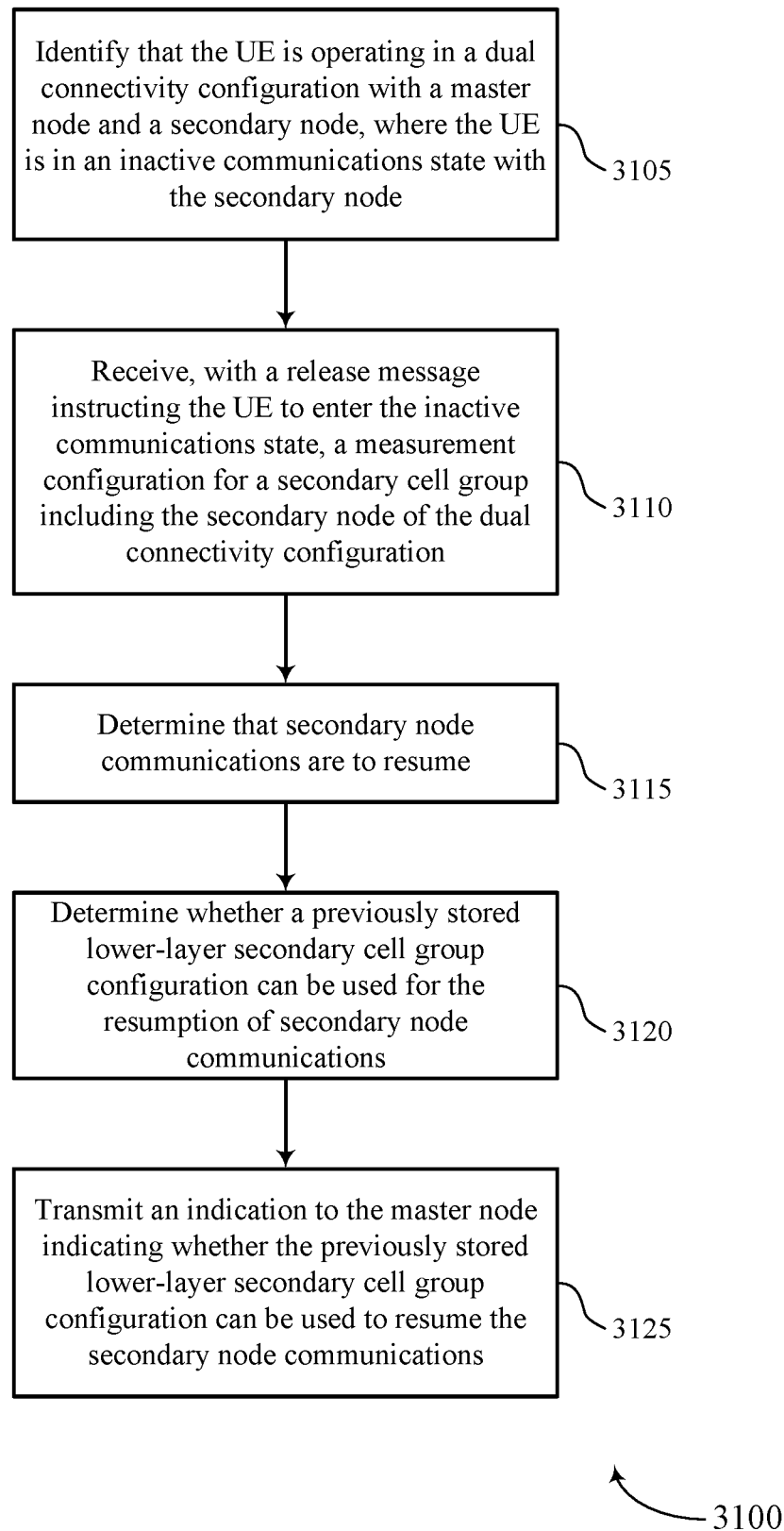

FIG. 31 shows a flowchart illustrating a method 3100 that supports SCG configuration in MR-DC in accordance with aspects of the present disclosure. The operations of method 3100 may be implemented by a UE 115 or its components as described herein. For example, the operations of method 3100 may be performed by a UE communications manager as described with reference to FIGS. 21 through 24. In some examples, a UE may execute a set of instructions to control the functional elements of the UE to perform the functions described below. Additionally or alternatively, a UE may perform aspects of the functions described below using special-purpose hardware.

At 3105, the UE may identify that the UE is operating in a DC configuration with an MN and an SN, where the UE is in an inactive communications state with the SN. The operations of 3105 may be performed according to the methods described herein. In some examples, aspects of the operations of 3105 may be performed by an inactive state component as described with reference to FIGS. 21 through 24.

At 3110, the UE may receive, with a release message instructing the UE to enter the inactive communications state, a measurement configuration for an SCG including the SN of the DC configuration. The operations of 3110 may be performed according to the methods described herein. In some examples, aspects of the operations of 3110 may be performed by an SCG measurement component as described with reference to FIGS. 21 through 24.

At 3115, the UE may determine that SN communications are to resume. The operations of 3115 may be performed according to the methods described herein. In some examples, aspects of the operations of 3115 may be performed by a resume communications component as described with reference to FIGS. 21 through 24.

At 3120, the UE may determine whether a previously stored lower-layer SCG configuration can be used for the resumption of SN communications. The operations of 3120 may be performed according to the methods described herein. In some examples, aspects of the operations of 3120 may be performed by a lower-layer SCG configuration component as described with reference to FIGS. 21 through 24.

At 3125, the UE may transmit an indication to the MN indicating whether the previously stored lower-layer SCG configuration can be used to resume the SN communications. The operations of 3125 may be performed according to the methods described herein. In some examples, aspects of the operations of 3125 may be performed by a lower-layer SCG configuration indicator as described with reference to FIGS. 21 through 24.

Figure 32:
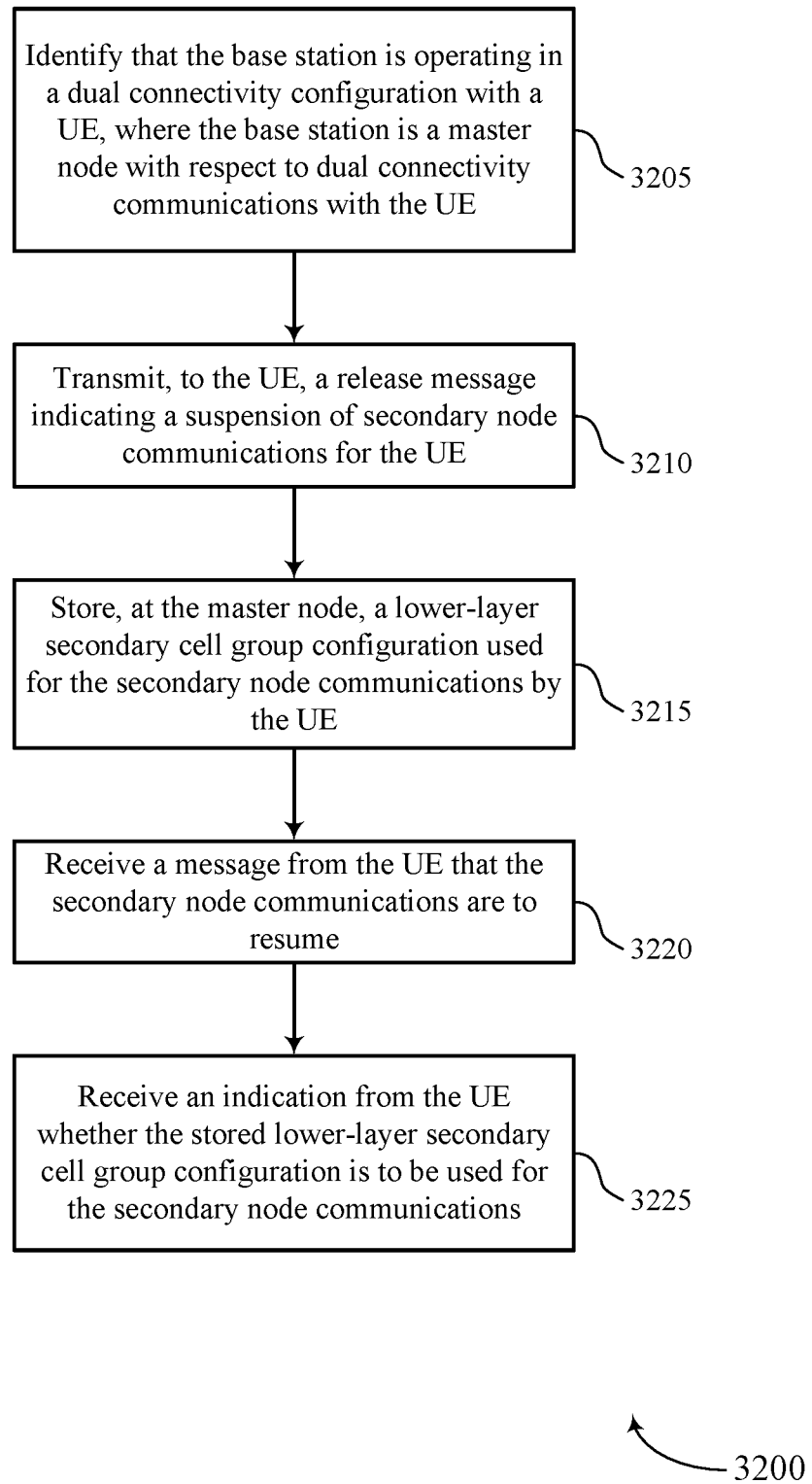

FIG. 32 shows a flowchart illustrating a method 3200 that supports SCG configuration in MR-DC in accordance with aspects of the present disclosure. The operations of method 3200 may be implemented by a base station 105 or its components as described herein. For example, the operations of method 3200 may be performed by a base station communications manager as described with reference to FIGS. 25 through 28. In some examples, a base station may execute a set of instructions to control the functional elements of the base station to perform the functions described below. Additionally or alternatively, a base station may perform aspects of the functions described below using special-purpose hardware.

At 3205, the base station may identify that the base station is operating in a DC configuration with a UE, where the base station is an MN with respect to DC communications with the UE. The operations of 3205 may be performed according to the methods described herein. In some examples, aspects of the operations of 3205 may be performed by a DC configuration component as described with reference to FIGS. 25 through 28.

At 3210, the base station may transmit, to the UE, a release message indicating a suspension of SN communications for the UE. The operations of 3210 may be performed according to the methods described herein. In some examples, aspects of the operations of 3210 may be performed by a release message transmitter as described with reference to FIGS. 25 through 28.

At 3215, the base station may store, at the MN, a lower-layer SCG configuration used for the SN communications by the UE. The operations of 3215 may be performed according to the methods described herein. In some examples, aspects of the operations of 3215 may be performed by an MN lower-layer SCG configuration storage component as described with reference to FIGS. 25 through 28.

At 3220, the base station may receive a message from the UE that the SN communications are to resume. The operations of 3220 may be performed according to the methods described herein. In some examples, aspects of the operations of 3220 may be performed by a resume SN communications component as described with reference to FIGS. 25 through 28.

At 3225, the base station may receive an indication from the UE whether the stored lower-layer SCG configuration is to be used for the SN communications. The operations of 3225 may be performed according to the methods described herein. In some examples, aspects of the operations of 3225 may be performed by a lower-layer SCG configuration indication receiver as described with reference to FIGS. 25 through 28.

Figure 33:
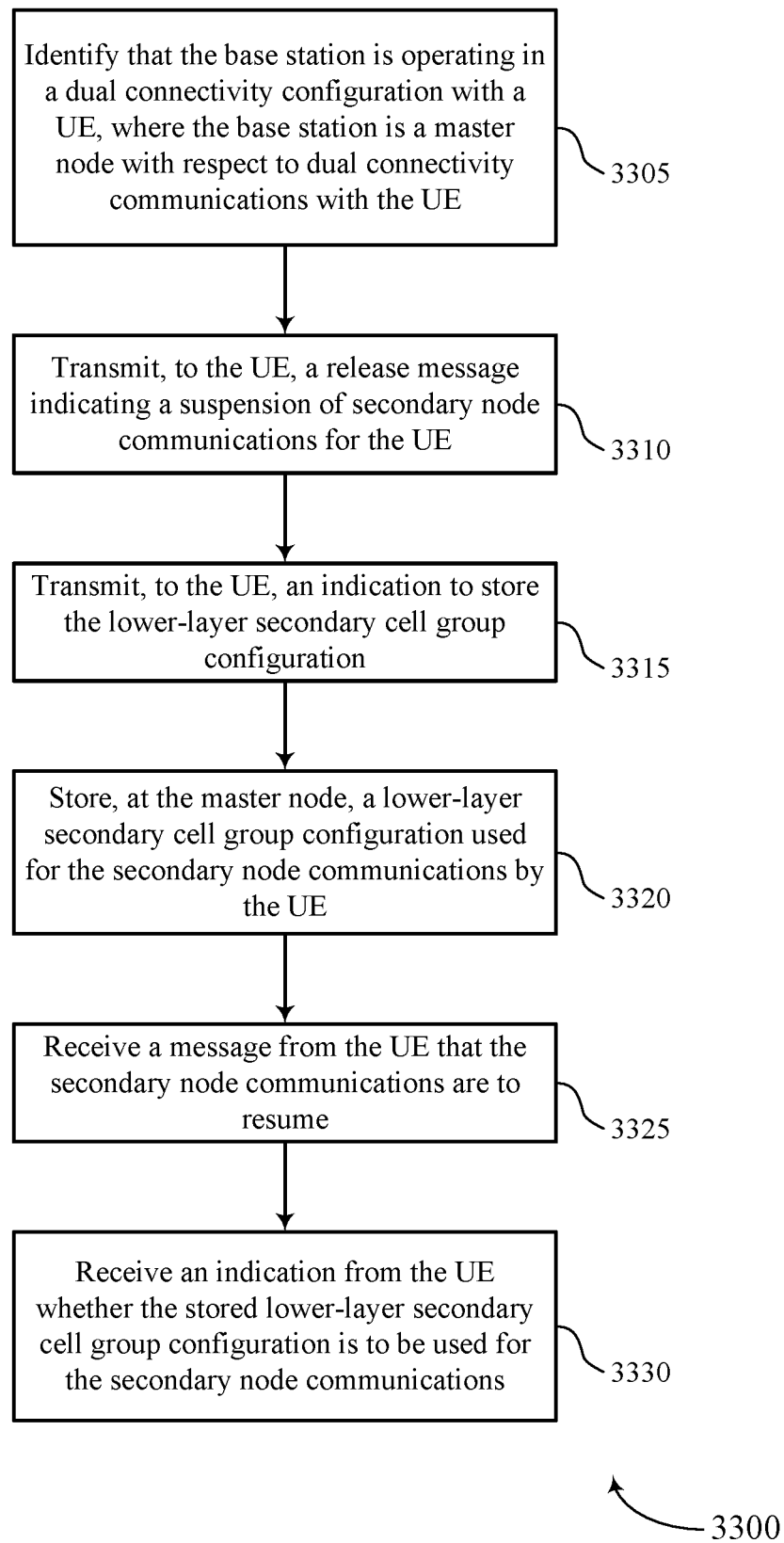

FIG. 33 shows a flowchart illustrating a method 3300 that supports SCG configuration in MR-DC in accordance with aspects of the present disclosure. The operations of method 3300 may be implemented by a base station 105 or its components as described herein. For example, the operations of method 3300 may be performed by a base station communications manager as described with reference to FIGS. 25 through 28. In some examples, a base station may execute a set of instructions to control the functional elements of the base station to perform the functions described below. Additionally or alternatively, a base station may perform aspects of the functions described below using special-purpose hardware.

At 3305, the base station may identify that the base station is operating in a DC configuration with a UE, where the base station is an MN with respect to DC communications with the UE. The operations of 3305 may be performed according to the methods described herein. In some examples, aspects of the operations of 3305 may be performed by a DC configuration component as described with reference to FIGS. 25 through 28.

At 3310, the base station may transmit, to the UE, a release message indicating a suspension of SN communications for the UE. The operations of 3310 may be performed according to the methods described herein. In some examples, aspects of the operations of 3310 may be performed by a release message transmitter as described with reference to FIGS. 25 through 28.

At 3315, the base station may transmit, to the UE, an indication to store the lower-layer SCG configuration. The operations of 3315 may be performed according to the methods described herein. In some examples, aspects of the operations of 3315 may be performed by a lower-layer SCG configuration storage indicator as described with reference to FIGS. 25 through 28.

At 3320, the base station may store, at the MN, a lower-layer SCG configuration used for the SN communications by the UE. The operations of 3320 may be performed according to the methods described herein. In some examples, aspects of the operations of 3320 may be performed by an MN lower-layer SCG configuration storage component as described with reference to FIGS. 25 through 28.

At 3325, the base station may receive a message from the UE that the SN communications are to resume. The operations of 3325 may be performed according to the methods described herein. In some examples, aspects of the operations of 3325 may be performed by a resume SN communications component as described with reference to FIGS. 25 through 28.

At 3330, the base station may receive an indication from the UE whether the stored lower-layer SCG configuration is to be used for the SN communications. The operations of 3330 may be performed according to the methods described herein. In some examples, aspects of the operations of 3330 may be performed by a lower-layer SCG configuration indication receiver as described with reference to FIGS. 25 through 28.

Figure 34:
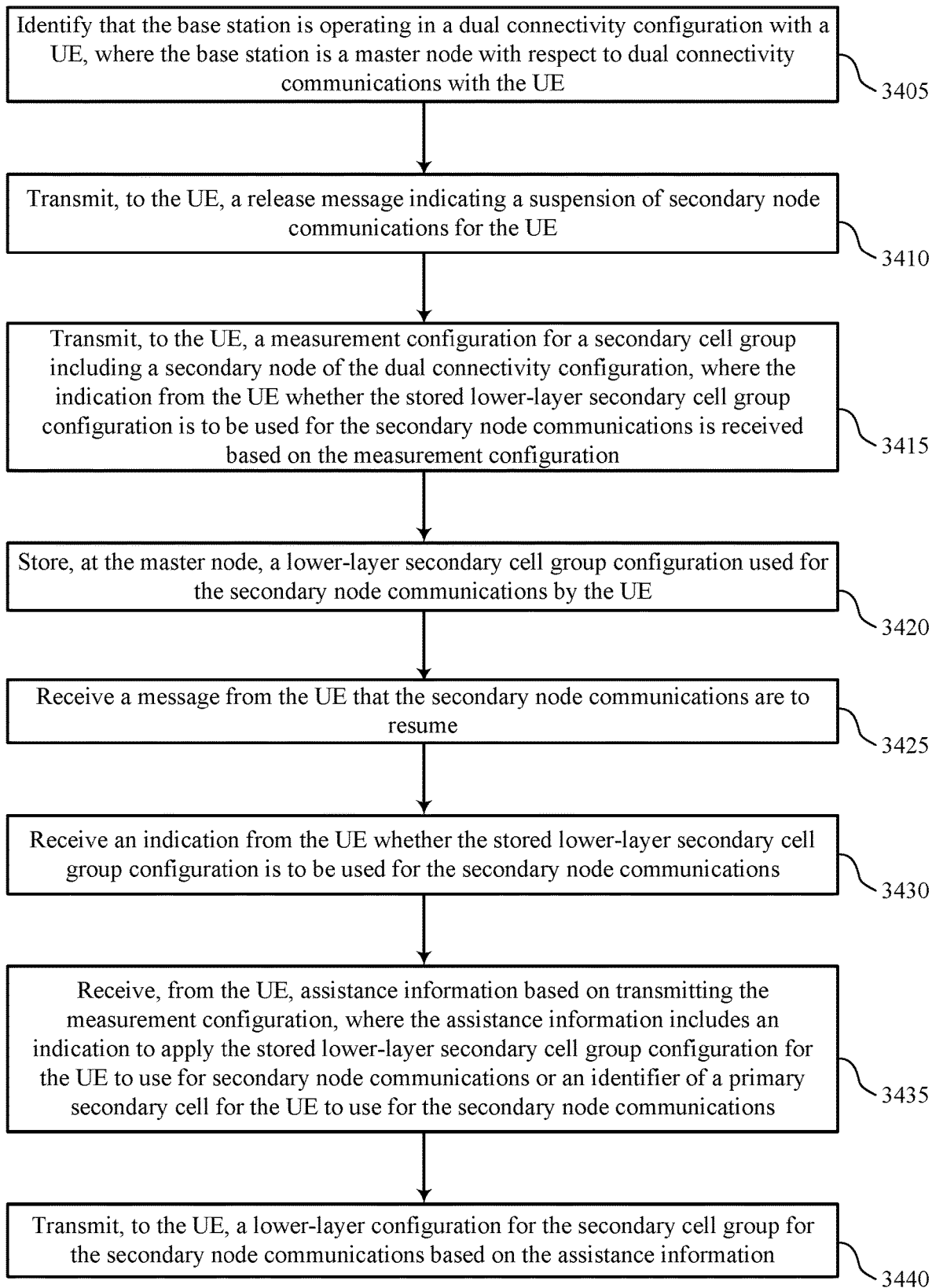

FIG. 34 shows a flowchart illustrating a method 3400 that supports SCG configuration in MR-DC in accordance with aspects of the present disclosure. The operations of method 3400 may be implemented by a base station 105 or its components as described herein. For example, the operations of method 3400 may be performed by a base station communications manager as described with reference to FIGS. 25 through 28. In some examples, a base station may execute a set of instructions to control the functional elements of the base station to perform the functions described below. Additionally or alternatively, a base station may perform aspects of the functions described below using special-purpose hardware.

At 3405, the base station may identify that the base station is operating in a DC configuration with a UE, where the base station is an MN with respect to DC communications with the UE. The operations of 3405 may be performed according to the methods described herein. In some examples, aspects of the operations of 3405 may be performed by a DC configuration component as described with reference to FIGS. 25 through 28.

At 3410, the base station may transmit, to the UE, a release message indicating a suspension of SN communications for the UE. The operations of 3410 may be performed according to the methods described herein. In some examples, aspects of the operations of 3410 may be performed by a release message transmitter as described with reference to FIGS. 25 through 28.

At 3415, the base station may transmit, to the UE, a measurement configuration for an SCG including an SN of the DC configuration, where the indication from the UE whether the stored lower-layer SCG configuration is to be used for the SN communications is received based on the measurement configuration. The operations of 3415 may be performed according to the methods described herein. In some examples, aspects of the operations of 3415 may be performed by an SCG measurement configuration component as described with reference to FIGS. 25 through 28.

At 3420, the base station may store, at the MN, a lower-layer SCG configuration used for the SN communications by the UE. The operations of 3420 may be performed according to the methods described herein. In some examples, aspects of the operations of 3420 may be performed by an MN lower-layer SCG configuration storage component as described with reference to FIGS. 25 through 28.

At 3425, the base station may receive a message from the UE that the SN communications are to resume. The operations of 3425 may be performed according to the methods described herein. In some examples, aspects of the operations of 3425 may be performed by a resume SN communications component as described with reference to FIGS. 25 through 28.

At 3430, the base station may receive an indication from the UE whether the stored lower-layer SCG configuration is to be used for the SN communications. The operations of 3430 may be performed according to the methods described herein. In some examples, aspects of the operations of 3430 may be performed by a lower-layer SCG configuration indication receiver as described with reference to FIGS. 25 through 28.

At 3435, the base station may receive, from the UE, assistance information based on transmitting the measurement configuration, where the assistance information includes an indication to apply the stored lower-layer SCG configuration for the UE to use for SN communications or an identifier of a primary secondary cell for the UE to use for the SN communications. The operations of 3435 may be performed according to the methods described herein. In some examples, aspects of the operations of 3435 may be performed by an SCG measurement configuration component as described with reference to FIGS. 25 through 28.

At 3440, the base station may transmit, to the UE, a lower-layer configuration for the SCG for the SN communications based on the assistance information. The operations of 3440 may be performed according to the methods described herein. In some examples, aspects of the operations of 3440 may be performed by an SCG measurement configuration component as described with reference to FIGS. 25 through 28.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

identifying that the UE is operating in a dual connectivity configuration with a master node and a secondary node, wherein the UE is in an inactive communications state with the secondary node;

receiving, with a release message instructing the UE to enter the inactive communications state, a measurement configuration for a secondary cell group comprising the secondary node of the dual connectivity configuration;

determining that secondary node communications are to resume;

determining whether a previously stored lower-layer secondary cell group configuration can be used for the resumption of secondary node communications; and transmitting an indication to the master node indicating whether the previously stored lower-layer secondary cell group configuration can be used to resume the secondary node communications.

2. The method of claim 1, further comprising:
storing, based at least in part on being in the inactive communications state with the secondary node, a first lower-layer configuration for a first cell of the master node and a second lower-layer configuration for a second cell of the secondary node, the second lower-layer configuration comprising the previously stored lower-layer secondary cell group configuration;

transmitting, based at least in part on the determination that secondary node communications are to resume, an indication of whether one or more measurement reports are available for the first cell or the second cell; and receiving, in response to the indication of whether the one or more measurement reports are available for the first cell or the second cell, a reconfiguration message that indicates a difference between a current lower-layer configuration and at least one of the stored first lower-layer configuration or the second lower-layer configuration.

3. The method of claim 1, further comprising:
receiving, with a release message instructing the UE to enter the inactive communications state, an indication that the UE is to store a lower-layer secondary cell group configuration; and storing the lower-layer secondary cell group configuration such that the lower-layer secondary cell group configuration becomes the previously stored lower-layer secondary cell group configuration.

4. The method of claim 3, wherein determining whether the previously stored lower-layer secondary cell group configuration can be used for the resumption of secondary node communications comprises:
identifying, from information included with the release message, a validity area which defines one or more cells in which the previously stored lower-layer secondary cell group configuration is valid for use, wherein the validity area comprises a list of the one or more cells, a physical cell identifier (PCI) list of the one or more cells, a radio access network (RAN) notification area (RNA) list of the one or more cells, a timing advance (TA) list of the one or more cells, or a combination thereof; and determining whether the UE is within the one or more cells defined by the validity area.

5. The method of claim 3, wherein determining whether the previously stored lower-layer secondary cell group configuration can be used for the resumption of secondary node communications comprises:

identifying, from information included with the release message, a validity time which defines a period in which the previously stored lower-layer secondary cell group configuration is valid; and determining whether the previously stored lower-layer secondary cell group configuration is valid based at least in part on the validity time.

6. The method of claim 3, wherein determining whether the previously stored lower-layer secondary cell group configuration can be used for the resumption of secondary node communications comprises:
identifying, from information included with the release message, a threshold measurement value, wherein the threshold measurement value comprises a reference signal received power (RSRP) measurement, a reference signal received quality (RSRQ) measurement, or a combination thereof;

measuring signal reception conditions for comparison with the threshold measurement value; and determining whether the previously stored lower-layer secondary cell group configuration is valid based at least in part on the signal reception condition measurements satisfying the threshold measurement value.

7. The method of claim 3, further comprising:
discarding the previously stored lower-layer secondary cell group configuration based at least in part on determining the previously stored lower-layer secondary cell group configuration not being valid.

8. The method of claim 1, wherein determining whether the previously stored lower-layer secondary cell group configuration can be used for the resumption of secondary node communications comprises:
performing measurements in accordance with the measurement configuration; and determining whether to include the indication that the previously stored lower-layer secondary cell group configuration is available for resuming the secondary node communications based at least in part on the measurements.

9. The method of claim 8, further comprising:
receiving, from the master node in a resume communications message or a reconfiguration message in response to the indication, a lower-layer secondary cell configuration to be used by the UE for the secondary node communications, wherein the lower-layer secondary cell configuration is either the previously stored lower-layer secondary cell group configuration, as stored by the master node, or an updated lower-layer secondary cell group configuration.

10. The method of claim 9, further comprising:
transmitting, to the master node and in addition to transmission of the indication, assistance information based at least in part on the measurements made in accordance with the measurement configuration, wherein the assistance information includes information to assist the master node in determining whether to apply the previously stored lower-layer secondary cell group configuration or the updated lower-layer secondary cell group configuration.

11. The method of claim 1, further comprising:
storing a higher-layer secondary cell group configuration based at least in part on receiving a release message.

12. The method of claim 1, wherein the master node operates in a first radio access technology and the secondary node operates in a second radio access technology.

13. The method of claim 1, wherein the previously stored lower-layer secondary cell group configuration comprises at least one of an identifier for the secondary node of the dual connectivity configuration, parameters for the secondary node communications, or configuration information for one or more cells of a secondary cell group for the secondary node communications.

14. A method for wireless communications at a network entity, comprising:
identifying that the network entity is operating in a dual connectivity configuration with a user equipment (UE), wherein the network entity is a master node with respect to dual connectivity communications with the UE;
transmitting, to the UE, a release message indicating a suspension of secondary node communications for the UE;
transmitting, to the UE, a measurement configuration for a secondary cell group comprising a secondary node of the dual connectivity configuration;
storing, at the master node, a lower-layer secondary cell group configuration used for the secondary node communications by the UE;
receiving a message from the UE that the secondary node communications are to resume; and
receiving an indication from the UE whether the stored lower-layer secondary cell group configuration is to be used for the secondary node communications, wherein the indication from the UE is received based at least in part on the measurement configuration.

15. The method of claim 14, further comprising:
storing, at the master node, a first lower-layer configuration for a first cell of the master node based at least in part on the suspension of the secondary node communications by the UE;
receiving, from the UE, a request to resume the secondary node communications, the request comprising an indication of whether one or more measurement reports are available at the UE;
determining a current lower-layer configuration for at least one of the first cell or a second cell of a secondary node used for the secondary node communications; and
transmitting, to the UE, a reconfiguration message that indicates a difference between the current lower-layer configuration and at least one of the stored first lower-layer configuration or the lower-layer secondary cell group configuration.

16. The method of claim 14, wherein transmitting the release message comprises:
transmitting, to the UE, an indication to store the lower-layer secondary cell group configuration.

17. The method of claim 16, further comprising:
transmitting with the indication to store the lower-layer secondary cell group configuration, information comprising a validity area which defines one or more cells in which the UE is to be located if the stored lower-layer secondary cell group configuration is to be valid, wherein the validity area of the one or more cells comprises a list of the one or more cells, a physical cell identifier (PCI) list of the one or more cells, a radio access network (RAN) notification area (RNA) list of the one or more cells, a timing advance (TA) list of the one or more cells, or a combination thereof.

18. The method of claim 16, further comprising:
transmitting with the indication to store the lower-layer secondary cell group configuration, information comprising a validity timer which defines a timing for when the stored lower-layer secondary cell group configuration is valid.

19. The method of claim 16, further comprising:
transmitting with the indication to store the lower-layer secondary cell group configuration, information comprising a threshold measurement value to allow the UE to determine whether the stored lower-layer secondary cell group configuration is to be applied, wherein the threshold measurement value comprises a reference signal received power (RSRP) measurement, a reference signal received quality (RSRQ) measurement, or a combination thereof.

20. The method of claim 14, further comprising:
transmitting, to a secondary node of the dual connectivity configuration, an activation request message for the secondary node communications based at least in part on receiving the message from the UE that the secondary node communications are to resume; and
transmitting, to the UE, a resume communications message for the secondary node communications based at least in part on receiving the indication from the UE whether the stored lower-layer secondary cell group configuration is to be used for the secondary node communications, wherein the resume communications message and the activation request message are transmitted simultaneously.

21. The method of claim 14, further comprising:
discarding the stored lower-layer secondary cell group configuration based at least in part on receiving the indication from the UE that the stored lower-layer secondary cell group configuration is not to be used.

22. The method of claim 14, further comprising:
receiving, from the UE, assistance information based at least in part on transmitting the measurement configuration, wherein the assistance information comprises an indication to apply the stored lower-layer secondary cell group configuration for the UE to use for secondary node communications or an identifier of a primary secondary cell for the UE to use for the secondary node communications; and
transmitting, to the UE, a lower-layer configuration for the secondary cell group for the secondary node communications based at least in part on the assistance information, wherein the lower-layer configuration for the secondary cell group is transmitted in a resume communications message or a reconfiguration message.

23. The method of claim 14, further comprising:
initiating a validity timer based at least in part on transmitting the release message;
determining that the validity timer expires prior to receiving the message from the UE that the secondary node communications are to resume; and
discarding the stored lower-layer secondary cell group configuration used for the secondary node communications by the UE based at least in part on the validity timer expiring.

24. The method of claim 14, wherein the master node operates in a first radio access technology and a secondary node operates in a second radio access technology.

25. An apparatus for wireless communications at a user equipment (UE), comprising:
means for identifying that the UE is operating in a dual connectivity configuration with a master node and a secondary node, wherein the UE is in an inactive communications state with the secondary node;
means for receiving, with a release message instructing the UE to enter the inactive communications state, a measurement configuration for a secondary cell group comprising the secondary node of the dual connectivity configuration;

means for determining that secondary node communications are to resume;

means for determining whether a previously stored lower-layer secondary cell group configuration can be used for the resumption of secondary node communications; and means for transmitting an indication to the master node indicating whether the previously stored lower-layer secondary cell group configuration can be used to resume the secondary node communications.

26. The apparatus of claim 25, further comprising:

means for storing, based at least in part on being in the inactive communications state with the secondary node, a first lower-layer configuration for a first cell of the master node and a second lower-layer configuration for a second cell of the secondary node, the second lower-layer configuration comprising the previously stored lower-layer secondary cell group configuration;

means for transmitting, based at least in part on the determination that secondary node communications are to resume, an indication of whether one or more measurement reports are available for the first cell or the second cell; and means for receiving, in response to the indication of whether the one or more measurement reports are available for the first cell or the second cell, a reconfiguration message that indicates a difference between a current lower-layer configuration and at least one of the stored first lower-layer configuration or the second lower-layer configuration.

27. The apparatus of claim 25, further comprising:

means for receiving, with a release message instructing the UE to enter the inactive communications state, an indication that the UE is to store a lower-layer secondary cell group configuration; and means for storing the lower-layer secondary cell group configuration such that the lower-layer secondary cell group configuration becomes the previously stored lower-layer secondary cell group configuration.

28. An apparatus for wireless communications at a network entity, comprising:

means for identifying that the network entity is operating in a dual connectivity configuration with a user equipment (UE), wherein the network entity is a master node with respect to dual connectivity communications with the UE;

means for transmitting, to the UE, a release message indicating a suspension of secondary node communications for the UE;

means for transmitting, to the UE, a measurement configuration for a secondary cell group comprising a secondary node of the dual connectivity configuration;

means for storing, at the master node, a lower-layer secondary cell group configuration used for the secondary node communications by the UE;

means for receiving a message from the UE that the secondary node communications are to resume; and means for receiving an indication from the UE whether the stored lower-layer secondary cell group configuration is to be used for the secondary node communications, wherein the indication from the UE is received based at least in part on the measurement configuration.

* * * * *